(12) United States Patent
Yang et al.

(10) Patent No.: US 7,029,574 B2
(45) Date of Patent: *Apr. 18, 2006

(54) SELECTIVE SORBENTS FOR PURIFICATION OF HYDROCARBONS

(75) Inventors: Ralph T. Yang, Ann Arbor, MI (US);
Frances H. Yang, Ann Arbor, MI (US);
Akira Takahashi, Yoko-Machi (JP);
Arturo J. Hernandez-Maldonado, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/393,962

(22) Filed: Mar. 21, 2003

(65) Prior Publication Data

US 2004/0040891 A1   Mar. 4, 2004

Related U.S. Application Data

(63) Continuation-in-part of application No. 10/234,681, filed on Sep. 4, 2002.

(51) Int. Cl.
*C10G 29/10* (2006.01)

(52) U.S. Cl. ...................... 208/250; 208/213
(58) Field of Classification Search ............... 208/250, 208/213

See application file for complete search history.

(56) References Cited

U.S. PATENT DOCUMENTS

| | | | |
|---|---|---|---|
| 2,882,244 A * | 4/1959 | Milton | 423/718 |
| 3,410,794 A | 11/1968 | Li | |
| 3,960,703 A | 6/1976 | Dielacher et al. | |
| 4,179,361 A | 12/1979 | Michlmayr | |
| 4,188,285 A | 2/1980 | Michlmayr | |
| 5,730,860 A | 3/1998 | Irvine | |
| 6,118,037 A | 9/2000 | Piccoli et al. | |
| 6,215,037 B1 | 4/2001 | Padin et al. | |
| 6,402,939 B1 | 6/2002 | Yen et al. | |
| 6,423,881 B1 | 7/2002 | Yang et al. | |
| 2001/0014304 A1* | 8/2001 | Satokawa et al. | 423/244.11 |
| 2002/0009404 A1* | 1/2002 | Tsybulevskiy et al. | 423/244.04 |

FOREIGN PATENT DOCUMENTS

| | | |
|---|---|---|
| DE | 208628 | 4/1984 |
| DE | 39 40 428 A1 | 6/1991 |
| GB | 2005299 | 4/1979 |
| JP | 54041844 | 3/1979 |
| JP | 55098123 | 7/1980 |
| WO | WO 98/56875 | 12/1998 |

OTHER PUBLICATIONS

Barthomeuf, D., and B.-H. Ha, "Adsorption of Benzene and Cyclohexane on Faujasite-Type Zeolites," *J. Chem. Soc. Faraday Trans.*, 69, 2147-2157 (1973), Abstract only.

Chen, N., and R. T. Yang, "*Ab Initio* Molecular Orbital Study of Adsorption of Oxygen, Nitrogen, and Ethylene on Silver-Zeolite and Silver Halides," *Ind. Eng. Chem. Res.*, 35, 4020-4027 (1996).

Cheng, L. S., and R. T. Yang, "Improved Horvath-Kawazoe Equations Including Spherical Pore Models for Calculating Micropore Size Distribution," *Chem. Eng. Sci.*, 49, 2599-2609 (1994), Abstract only.

Dermontis, P., S. Yashonath, and M. L. Klein, "Localization and Mobility of Benzene in Sodium-Y Zeolite by Molecular Dynamics Calculations," *J. Phys. Chem.*, 93, 5016-5019 (1989).

Doong, S. J., and R. T. Yang, "A Simple Potential-Theory Model for Predicting Mixed-Gas Adsorption," *Ind. Eng. Chem. Res.*, 27, 630-635 (1988).

Eldridge, R. B., "Olefin/Paraffin Separation Technology: A Review," *Ind. Eng. Chem. Res.*, 32, 2208-2212 (1993).

Fitch, A. N., H. Jobic, and A. Renourez, "Localization of Benzene in Sodium-Y Zeolite by Powder Neutron Diffraction," *J. Phys. Chem.*, 90, 1311-1318 (1986).

(Continued)

*Primary Examiner*—Thuan D Dang
(74) *Attorney, Agent, or Firm*—Dierker and Associates, P.C.

(57) ABSTRACT

A method for removing thiophene and thiophene compounds from liquid fuel includes contacting the liquid fuel with an adsorbent which preferentially adsorbs the thiophene and thiophene compounds. The adsorption takes place at a selected temperature and pressure, thereby producing a non-adsorbed component and a thiophene/thiophene compound-rich adsorbed component. The adsorbent includes either a metal or a metal ion that is adapted to form π-complexation bonds with the thiophene and/or thiophene compounds, and the preferential adsorption occurs by π-complexation. A further method includes selective removal of aromatic compounds from a mixture of aromatic and aliphatic compounds.

13 Claims, 23 Drawing Sheets

OTHER PUBLICATIONS

Hao, J., T. Tanaka, H. Kita, and K. Okamoto, "The Pervaporation Properties of Sulfonyl-Containing Polyimide Membranes to Aromatic/Aliphatic Hydrocarbon Mixtures," *J. Membr. Sci.*, 132, 97-108 (1997).

Ho, W. S., G. Doyle, D. W. Savage, and R. L. Pruett, "Olefin Separations via Complexation with Cuprous Diketonate," *Ind. Eng. Chem. Res.*, 27, 334-337 (1988).

Huang, H. Y., R. T. Yang, and N. Chen, "Anion Effects on the Adsorption of Acetylene by Nickel Halides," *Langmuir*, 15, 7647-7652 (1999).

Hutson, N. D., B. A. Reisner, R. T. Yang, and B. H. Toby, "Silver Ion-Exchanged Zeolites Y, X and Low Silica X: Observations of Thermally Induced Cation/Cluster Migration and the Resulting Effects on Equilibrium Adsorption of Nitrogen," *Chem. Mater.*, 12, 3020-3031 (2000).

Kitagawa, T., T. Tsunekawa, and K. Iwayama, "Monte Carlo Simulation on Adsorptions of Benzene and Xylenes in Sodium-Y Zeolites," *Microporous Mater.*, 7, 227-233 (1996).

Klemm, E., J. Wang, and G. A. Emig, "A Comparative Study of the Sorption of Benzene and Phenol in Silicalite, HAlZSM-5 and NaAlZSM-5 by Computer Simulation," *Microporous Mater.*, 26, 11-21 (1998).

Laboy, M. M., I. Santiago, and G. E. Lopez, "Computing Adsorption Isotherms for Benzene, Toluene, and p-Xylene in Heulandite Zeolite," *Ind. Eng. Chem. Res.*, 38, 4938-4945 (1999).

Lewis, W. K., E. R. Gilliland, B. Chertow, and W. P. Cardogan, "Adsorption Equilibria—Hydrocarbon Gas Mixtures," *Ind. Eng. Chem.*, 42, 1319-1326 (1950).

Li, Norman N., "Separation of Hydrocarbons by Liquid Membrane Permeation," *Ind. Eng. Chem. Process Des. Dev.*, 10, 215-221 (1971).

Li, Y., and J. N. Armor, "Catalytic Combustion of Methane over Palladium Exchanged Zeolites," *Appl. Catal.*, B3, Issue 4, 275-282 (1994), Abstract only.

O'Malley, P. J., and C. J. Braithwaite, "*Ab Initio* Molecular Orbital and Molecular Graphics Studies of Benzene Adsorption in NaY Zeolite," *Zeolites*, 15, 198-201 (1995).

Padin, J., and R. T. Yang, "Tailoring New Adsorbents Based on π-Complexation: Cation and Substrate Effects on Selective Acetylene Adsorption," *Ind. Eng. Chem. Res.*, 36, 4224-4230 (1997).

Pellenq, R. J.-M., and D. Nicholson, "In-Framework Ion Dipole Polarizabilities in Non-Porous and Porous Silicalites and Aluminosilicates, Determined from Auger Electron Spectroscopy Data," *J. Chem. Soc. Faraday Trans.*, 89, 2499-2508 (1993), Abstract only.

Safarik, D. J., and R. B. Eldridge, "Olefin/Paraffin Separations by Reactive Adsorption: A Review," *Ind. Eng. Chem. Res.*, 37, 2571-2581 (1998).

Snurr, R. Q., A. T. Bell, and D. N. Theodorou, "A Hierarchical Atomistic/Lattice Simulation Approach for the Prediction of Adsorption Thermodynamics of Benzene in Silicalite," *J. Phys. Chem.*, 98, 5111-5119 (1994).

Spencer, C. F., and S. B. Adler, "A Critical Review of Equations for Predicting Saturated Liquid Density," *J. Chem. Eng. Data*, 23, 82-89 (1978).

Viruela-Martin, P., C. M. Zicovich-Wilson, and A. Corma, "*Ab Initio* Molecular Orbital Calculations of the Protonation Reaction of Propylene and Isobutene by Acidic OH Groups of Isomorphously Substituted Zeolites," *J. Phys. Chem.*, 97, 13713-13719 (1993).

Williams, D. E., and S. R. Cox, "Nonbonded Potentials for Azahydrocarbons: The Importance of the Coutombic Interaction," *Acta Crystallogr.*, B40, 404-417 (1984).

Woods, G. B., and J. S. Rowlinson, "Computer Simulation of Fluids in Zeolite X and Y," *J. Chem. Soc., Faraday Trans.*, 85, 765-781 (1989), Abstract only.

Wu, Z., S. S. Han, S. H. Cho, J. N. Kim, K. T. Chue, and R. T. Yang, "Modification of Resin-Type Adsorbents for Ethane/Ethylene Separation," *Ind. Eng. Chem. Res.*, 36, 2749-2756 (1997).

Parkinson, G., *Diesel Desulfurization Puts Refiners in a Quandary*, Chemical Engineering, Feb. 2001, vol. 37: pp. 39-41.

Weitkamp, J., M. Schwark and S. Ernest, *Removal of Thiophene Impurities from Benzene by Selective Adsorption in Zeolite ZSM-5*, J. Chem. Soc. Chem. Commun., 1991: pp. 1133-1134.

King, D. L, C. Faz and T. Flynn, *Desulfurization of Gasoline Feedstocks for Application in Fuel Reforming*, SAE Paper 2000-01-0002, Soc. Automotive Engineers, 2000, pp. 9-13.

Salem, A. S. H. and H. S. Hamid, *Removal of Sulfur Compounds from Naphtha Solutions Using Solid Adsorbents*, Chem. Eng. Tech., 1997, vol. 20: pp. 342-347.

Yang, R. T. and E. S. Kikkinides, *New Sorbents for Olefin/Paraffin Separations by Adsorption via π- Complexation*, AIChE J., Mar. 1995, vol. 41, No. 3: pp. 509-517.

Rage, S. U., J. Padin and R. T. Yang, *Olefin/Paraffin Separations by Adsorption: π- Complexation vs. Kinetic Separation*, AIChE J., Apr. 1998, vol. 44, No. 4: pp. 799-809.

Huang, H. Y., J. Padin and R. T. Yang, *Anion and Cation Effects on Selective Olefin Adsorption on Silver and Copper Halides: Ab Initio Effective Core Potential Study of π-Complexation:*, J. Phys. Chem. B., 1999, vol. 103: pp. 3206-3212.

Huang, H. Y., J. Padin and R. T. Yang, *Comparison of π-Complexations of Ethylene and Carbon Monoxide and $Cu^+$ and $Ag^+$*, Ind. Eng. Chem. Res., 1999, vol. 38: pp. 2720-2725.

Padin, J. and R. T. Yang *New Sorbents for olefin/paraffin separations by absorption via π-complexation: synthesis and effects of substrates*, Chem. Eng. Sci., 2000, vol. 55: pp. 2607-2616.

Padin, J., R. T. Yang and C. L. Munson, *New Sorbents for Olefin/Paraffin Separations and Olefin Purification for $C_4$ Hydrocarbons*, Ind. Eng. Chem. Res., 1999, vol. 38: pp. 3614-3621.

Jarayaman, A, R. T. Yang, C. L. Munson and D. Chinn, *Deactivation of π-Complexation Adsorbents by Hydrogen and Rejuvenation by Oxidation*, Ind. Eng. Chem. Res., 2001, vol. 40: pp. 4370-4376.

Takahashi, A., R. T. Yang, C. L. Munson and D. Chinn, *Cu(I)-Y Zeolite as a Superior Adsorbent for Diene/Olefin Separation*, Langmuir, 2001, vol. 17: pp. 8405-8413.

Takahashi, A., F. H. Yang and R. T. Yang, *Aromatics/Aliphatics Separation by Adsorption: New Sorbents for Selective Aromatics Adsorption by π-Complexation*, Ind. Eng. Chem. Res., 2000, vol. 39: pp. 3856-3867.

Larsen, S. C. A. Aylor, A. T. Bell and J. A. Reimer, *Electron Patamagnetic Resonance Studies of Copper Ion-Exchanged ZSM-5*, J. Phys. Chem., 1994, vol. 98: pp. 11533-11540.

Hay, P. J. and W. R. Wadt, *Ab initio effective core potentials for molecular calculations. Potentials for the transition metals atoms Sc to Hg*, J. Chem. Phys., Jan. 1, 1985, vol. 82: pp. 270-283.

Reed, A. E., Weinstock, R.B. and Weinhold, F., *Natural population analysis*, J. Chem. Phys., Jul. 15, 1985, vol. 83, No. 2: pp. 735-746.

Yang, R. T., *Gas Separation by Adsorption Processes*, Butterworths Series in Chemical Engineering, 1987, Chapter I-II: pp:1-48.

Luo, Guohua et al., *Removal of thiophene from coke-oven benzene by selective adsorption on zeolites*, Database CA [Online] Abstract No. 132:110289, Chemical Abstracts Service, Ranliao Huaxue Xuebao, 1999.

Takahashi, A., Yang, F. H., and R. T. Yang, "New Sorbents for Desulfurization by Pi-Complexation: Thiophene/Benzene Adsorption," *Ind. Eng. Chem. Res.*, 41, 2487 (2002).

Hernandez-Maldonado, A. J., and R. T. Yang, "Desulfurization of Liquid Fuels by Adsorption via Pi-Complexation with Cu(I)-Y and Ag-Y Zeolites," *Ind. Eng. Chem. Res.*, 42, 123 (2003).

Hernandez-Maldonado, A. J., and R. T. Yang, "Desulfurization of Diesel Fuels by Adsorption via Pi-Complexation with Vapor-Phase Exchanged Cu(I)-Y Zeolites," *J. Am. Chem. Soc.*, 126, 992 (2004).

Yang, R. T., Hernandez-Maldonado, A. J., and F. H. Yang, "Desulfurization of Transportation Fuels with Zeolites under Ambient Conditions," *Science*, 301, 79 (2003).

* cited by examiner

SELECTIVE SORBENTS FOR PURIFICATION OF HYDROCARBONS

CROSS REFERENCE TO RELATED APPLICATIONS

This application is a continuation-in-part of U.S. application Ser. No. 10/234,681, filed Sep. 4, 2002.

STATEMENT REGARDING FEDERALLY SPONSORED RESEARCH OR DEVELOPMENT

This invention was made in the course of research partially supported by a grant from the National Science Foundation (NSF) (Grant No. CTS-9819008 and Grant No. CTS-0138190); and by a grant from the Department of Energy (DOE) (Fuel Cell Grant No. DE-FC04-02AL67630). The U.S. government has certain rights in the invention.

BACKGROUND OF THE INVENTION

The present invention relates generally to processes for purification of hydrocarbons and, more particularly, to adsorption processes using sorbents selective to sulfur compounds and to aromatic compounds.

Petroleum is an extremely complex mixture and consists predominantly of hydrocarbons, as well as compounds containing nitrogen, oxygen, and sulfur. Most petroleums also contain minor amounts of nickel and vanadium. The chemical and physical properties of petroleum vary considerably because of the variations in composition.

The ultimate analysis (elemental composition) of petroleum tends to vary over relatively narrow limits—carbon: 83.0 to 87.0 percent; hydrogen: 10.0 to 14.0 percent; nitrogen: 0.1 to 1.5 percent; oxygen: 0.1 to 1.5 percent; sulfur: 0.1 to 5.0 percent; metals (nickel plus vanadium): 10 to 500 ppm.

Crude oils are seldom used as fuel because they are more valuable when refined to petroleum products. Distillation separates the crude oil into fractions equivalent in boiling range to gasoline, kerosene, gas oil, lubricating oil, and residual. Thermal or catalytic cracking is used to convert kerosene, gas oil, or residual to gasoline, lower-boiling fractions, and a residual coke. Petrochemical intermediates such as ethylene and propylene are primarily produced by the thermal cracking of light hydrocarbon feedstocks in the presence of steam. Catalytic reforming, isomerization, alkylation, polymerization, hydrogenation, and combinations of these catalytic processes are used to upgrade the various refinery intermediates into improved gasoline stocks or distillates. The major finished products are usually blends of a number of stocks, plus additives.

Gasoline is a complex mixture of hydrocarbons that distills within the range 100 to 400° F. Commercial gasolines are blends of straight-run, cracked, reformed, and natural gasolines. Straight-run gasoline is recovered from crude petroleum by distillation and contains a large proportion of normal hydrocarbons of the paraffin series. Cracked gasoline is manufactured by heating crude-petroleum distillation fractions or residues under pressure, or by heating with or without pressure in the presence of a catalyst. Heavier hydrocarbons are broken into smaller molecules, some of which distill in the gasoline range. Reformed gasoline is made by passing gasoline fractions over catalysts in such a manner that low-octane-number hydrocarbons are molecularly rearranged to high-octane-number components. Many of the catalysts use platinum and other metals deposited on a silica and/or alumina support. Natural gasoline is obtained from natural gas by liquefying those constituents which boil in the gasoline range either by compression and cooling or by absorption in oil.

Removal of the sulfur-containing compounds is an important operation in petroleum refining, and is achieved by catalytic processes at elevated temperatures and pressures. See, Farrauto, R. J.; Bartholomew, C. H. *Fundamentals of Industrial Catalytic Processes*, Chapman and Hall, New York (1997). The hydrodesulfurization (HDS) process is efficient in removing thiols and sulfides, but much less effective for heterocyclic diunsaturated sulfur compounds, such as thiophenes and thiophene compounds/derivatives (e.g., benzothiophene and dibenzothiophene).

In 1998, the U.S. largest automakers pledged to put clean-burning cars on the road by 2001, beating the Clean Air Act Amendments mandate by five years. They proposed the use of internal combustion (IC) engines capable of emitting 50% fewer nitrogen oxides ($NO_x$) and 70% fewer hydrocarbons, thanks to advanced catalytic converters. Shortly after this low-emission vehicle concept was announced, the U.S. Environmental Protection Agency (EPA) revealed concerns that these reductions might not be achievable if high-sulfur gasoline and diesel fuel continue to be used. Studies involving the EPA and the automobile and oil industries showed that fuel sulfur atoms can bond with reactive sites on the catalyst surface, preventing catalyzed reactions needed to break down $NO_x$ and hydrocarbons. Since high-sulfur gasoline may perhaps decrease the effectiveness of advanced catalytic converters, the EPA mandates a reduction in gasoline and diesel sulfur levels to 30 and 15 ppm, respectively, down from the current levels of 300–500 ppm. Krause, C. An Emissions Mission: Solving the Sulfur Problem. *Oak Ridge National Lab Review* (2000), 33, 3. This should be attained by the year 2006. Faced with the severely high costs of compliance, a surprising number of refiners are seriously considering reducing or eliminating production of on-board fuels. See Parkinson, G., "Diesel Desulfurization Puts Refiners in a Quandary," *Chemical Engineering* (2001), February issue, 37.

Ultra-clean fuel may also be desirable for use with a fuel cell system. For the automotive fuel cells, liquid hydrocarbons may be ideal fuels due to their higher energy density, availability, and safety for transportation and storage. However, liquid hydrocarbons usually contain certain sulfur compounds that are poisonous to both the shift catalysts in the hydrocarbon fuel processors and the electrode catalysts in fuel cell processes. Thus, the sulfur content in the liquid hydrocarbons would desirably be generally less than about 0.1 ppm.

During the last decade, there have been several published accounts on using adsorption for liquid fuel desulfurization. Commercially available sorbents (i.e., zeolites, activated carbon and activated alumina) were used in all of these studies. Weitkamp et al. reported that thiophene adsorbed more selectively than benzene on ZSM-5 zeolite. See Weitkamp, J.; Schwark, M.; Ernest, S. "Removal of Thiophene Impurities from Benzene by Selective Adsorption in Zeolite ZSM-5," *J. Chem. Soc. Chem. Commun.* (1991), 1133. Without being bound to any theory, it is believed that this is because thiophene ($C_4H_4S$, also known as thiofuran) has a higher dipole moment (0.55 debye) than benzene (nonpolar), although their polarizabilities are similar. Based on this study, King et al. studied selective adsorption of thiophene, methyl- and dimethyl-thiophenes (all with one ring) over toluene and p-xylene, also using ZSM-5. See King, D. L.; Faz, C.; Flynn, T. "Desulfurization of Gasoline Feedstocks for Application in Fuel Reforming," *SAE Paper 2000-01-0002*, Soc. Automotive Engineers, Detroit (2000). They showed that thiophene was more selectively adsorbed, both based on fixed bed breakthrough experiments. However, the capacities for thiophene were unfortunately quite low (only 1–2% wt. adsorbed at 1% thiophene concentration). Both vapor phase and liquid phase breakthrough experiments were done in these studies, and the results from two phases were consistent.

The pore dimensions of ZSM-5 are 5.2–5.6 Å. Hence, organic sulfur compounds with more than one ring will be sterically hindered or excluded. Zeolites with larger pores, as well as larger pore volumes, would appear to be more desirable than ZSM-5 as the selective sorbents. Indeed, results of Salem and Hamid indicated that 13X zeolite as well as activated carbon had much higher sorption capacities for sulfur compounds. See Salem, A. S. H.; Hamid, H. S. "Removal of Sulfur Compounds from Naphtha Solutions Using Solid Adsorbents," *Chem. Eng. Tech.* (1997), 20, 342. Based on the data of Salem and Hamid, Id., the capacity for sulfur compounds by 13X zeolite was approximately an order of magnitude higher than that of ZSM-5, when compared with the data of King et al. (cited above) extrapolated to the same conditions.

Activated alumina (Alcoa Selexsorb) has been used in an adsorption process by Irvine. See, for example, U.S. Pat. No. 5,730,860 issued to R. L. Irvine in 1998, entitled "Process for Desulfurizing Gasoline and Hydrocarbon Feedstocks."

No direct comparison has been made among these commercial sorbents. Their experiments were mostly done in fixed bed adsorbers, by measuring the breakthrough capacities. Based on the literature, the large pore zeolites (NaX or NaY) are about the same as activated carbon and alumina, in terms of adsorption of thiophene.

As mentioned hereinabove, current sulfur levels found in commercial liquid fuels are commonly obtained by Hydrodesulfurization (HDS) treatment. As further mentioned above, this method is very effective in removing thiols and sulfides, but it is generally not adequate for the removal of thiophenic compounds. For instance, the $H_2S$ produced during reaction of some thiophene derivatives is one of the main inhibitors for deep HDS of unreactive species. Ma, X.; Sakanishi, K.; Mochida, I. Hydrodesulfurization Reactivities of Various Sulfur Compounds in Diesel Fuel. *Ind. Eng. Chem. Res.* (1994), 33, 218 and Knudsen, K. G.; Cooper, B. H.; Topsøe, H. Catalyst and Process Technologies for Ultra Low Sulfur-Diesel. *Appl. Catal. A-Gen.* (1999), 189, 205. For HDS to meet the new federal government mandates, it is believed that reactors with volumes 5–15 times larger (depending on the $H_2$ pressure) than those currently used may be needed.

Ma et al. studied fixed-bed adsorption of thiophene compounds from jet fuels and diesel using an undisclosed transition metal compound (5 wt % loading) supported in silica gel. Ma, X.; Sun, L.; Song, C. A New Approach to Deep Desulfurization of Gasoline, Diesel Fuel and Jet Fuel by Selective Adsorption for Ultra-Clean Fuels and for Fuel Cell Applications. *Catal. Today* (2002), 77, 107 and Ma, X.; Sprague, M.; Sun, L.; Song, C. Deep Desulfurization of Liquid Hydrocarbons by Selective Adsorption for Fuel Cell Applications. *Am. Chem. Soc. Div. Pet. Chem. Prepr.* (2002), 47, 48. For jet fuel, they obtained a saturation adsorption capacity of 0.015 g of sulfur per $cm^3$ of adsorbent and also showed that breakthrough occurs at about 20 $cm^3$ effluent volume for about 3.2 $cm^3$ of the metal loaded silica gel. For a model diesel fuel, Ma et al. obtained a breakthrough capacity of 1 $cm^3$ per gram of adsorbent. The latter was done for removal of dibenzothiophene and 4,6-dibenzothiophene molecules only. Collins et al. also performed fixed-bed adsorption experiments for sulfur removal, but after oxidation of the thiophenic compounds. Collins, F. M.; Lucy, A. R.; Sharp, C, Oxidative Desulphurisation of Oils via Hydrogen Peroxide and Heteropolyanion Catalysis. *J. Mol. Catal. A-Chem.* (1997), 117, 397. Oxidation was accomplished by using hydrogen peroxide, an acid catalyst and a phase transfer agent. Afterwards, the oxidized sulfurs were removed from the diesel oil using a silica gel. A breakthrough capacity of about 11 $cm^3$ per gram of silica gel was obtained in this case. Another adsorbent that has been studied was ALCOA Selexsorb, which is an activated alumina. In one specific application (Irvine, R. L. Process for Desulfurizing Gasoline and Hydrocarbon Feedstocks. U.S. Pat. No. 5,730,860, 1998) this proprietary material was used in a temperature swing adsorption (TSA) process in order to continuously adsorb hetereoatoms from hydrocarbon mixtures and produce full boiling range FCC gasoline products with a maximum sulfur content of 30 ppmw.

Essentially all industrial adsorption processes are based on van der Waals interactions between the sorbate and the sorbent. Chemical bonds have yet to be exploited. Further, the drawbacks concomitant with HDS appear to render it an inappropriate solution.

Thus, it would be desirable to provide an adsorption process for selectively removing sulfur compounds from liquid fuels at ambient conditions, thereby advantageously leading to a major advance in petroleum refining. It would further be desirable to provide highly selective sorbents for this process, thereby overcoming the drawbacks of current commercial sorbents, which are not desirable for this application.

SUMMARY OF THE INVENTION

The present invention addresses and solves the above-mentioned drawbacks, and substantially meets the desiderata and advantages enumerated above, by providing a process for removing thiophene and thiophene compounds from liquid fuel. The method comprises the step of contacting the liquid fuel with an adsorbent which preferentially adsorbs the thiophene and thiophene compounds, at a selected temperature and pressure, thereby producing a non-adsorbed component and a thiophene/thiophene compound-rich adsorbed component. The adsorbent comprises any ion-exchanged zeolite, but in a preferred embodiment, the zeolite is selected from the group consisting of zeolite X, zeolite Y, zeolite LSX, and mixtures thereof. The zeolite has exchangeable cationic sites, and at least some of the sites have d-block transition metal cation present. The preferential adsorption occurs by π-complexation.

In a further embodiment, the invention comprises a process for removing thiophene and thiophene compounds from liquid fuel. The method comprises the step of contacting the liquid fuel with an adsorbent which preferentially adsorbs the thiophene and thiophene compounds, at a selected temperature and pressure, thereby producing a non-adsorbed component and a thiophene/thiophene compound-rich adsorbed component. The adsorbent comprises a carrier having a surface area, the carrier having a d-block transition metal compound dispersed on at least some of the surface area. The metal compound releasably retains the thiophenes. The carrier comprises a plurality of pores having a pore size greater than the effective molecular diameter of the thiophene/thiophene compounds. The method may further comprise the step of changing at least one of the pressure and temperature to thereby release the thiophene/thiophene compound-rich component from the adsorbent.

In a further embodiment, the invention comprises a process for selective removal of aromatics from hydrocarbons.

BRIEF DESCRIPTION OF THE DRAWINGS

Objects, features and advantages of the present invention will become apparent by reference to the following detailed description and drawings, in which.

DETAILED DESCRIPTION OF THE PREFERRED EMBODIMENTS

Figure 1:
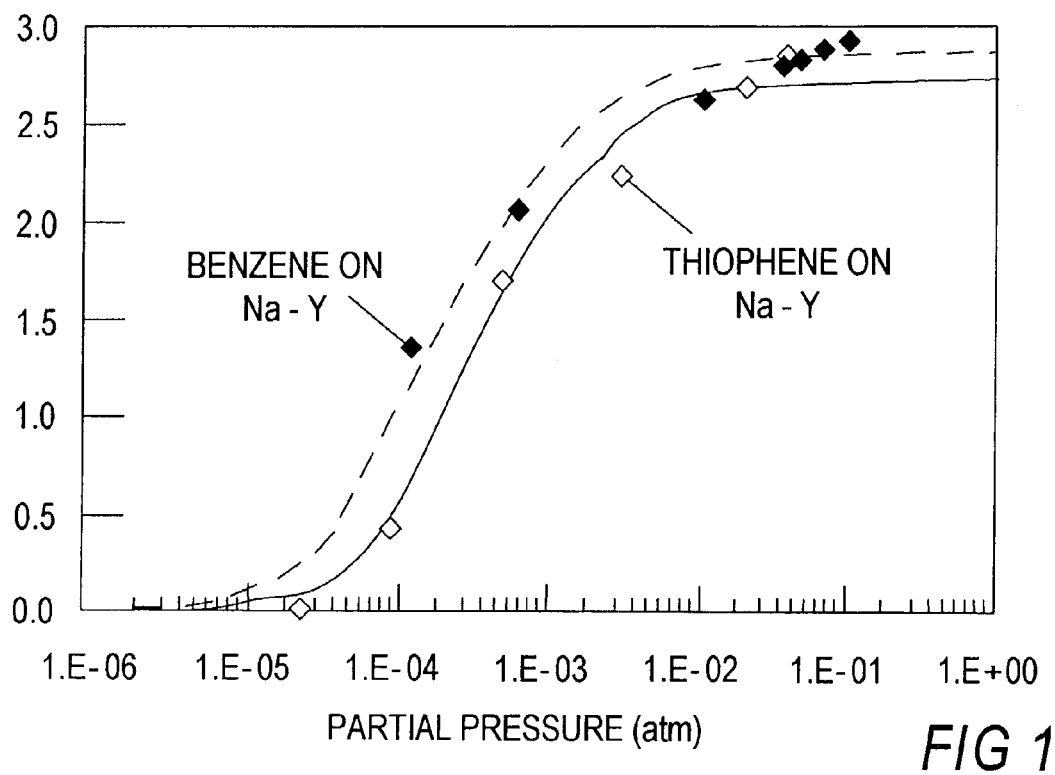
FIG. 1 is a graph depicting equilibrium isotherms of benzene and thiophene on NaY (Si/Al=2.43) at 120° C.; with the lines being fittings by Langmuir-Freundlich isotherm equation.

The present invention is predicated upon the unexpected and fortuitous discovery that thiophene and thiophene compounds are adsorbed slightly more selectively via π-complexation than is benzene. This is quite counter-intuitive, as it would be expected that benzene, having more double bonds (3) and more π electrons than thiophene (2 double bonds), would be more selectively adsorbed via π-complexation. An example of a compound having more double bonds being more selectively adsorbed than a compound having fewer double bonds may be found in U.S. Pat. No. 6,215,037, issued to Padin, Munson and Yang in 2001 and entitled, "Method for Selective Adsorption of Dienes."

Without being bound to any theory, it is believed that this counter-intuitive, slightly higher selectivity for thiophene/thiophene derivatives/compounds may be explained by the following theory. The sulfur atom in the five-member thiophene ring has more electrons than the carbons. As such, the S atom, with its available electrons and relatively strong attraction, may be aiding in the π-complexation bonding, thus contributing to the higher selectivity of the present sorbents for thiophenes over benzene. How much the sulfur could contribute to π-complexation bonding, however, is not predictable.

The present invention is a startling and useful discovery, in that the sorbents and process of the present invention adsorb more than 1 mmol/gram of thiophene at $10^{-5}$ atm. The present inventive process utilizing sorbents which adsorb via π-complexation may be used to remove sulfur compounds (for example, heterocyclic diunsaturated sulfur compounds, including but not limited to thiophene, thiophenic compounds, and/or derivatives thereof) from hydrocarbons such as liquid fuels (including, but not limited to gasoline, diesel fuels, coal and shale derived liquid fuels, methanol, and the like). Liquid fuels have a high concentration of aromatics, such as, e.g., benzene, and a low concentration of thiophene and thiophene compounds (in the parts-per-million (ppm)). Thus, it is one important aspect of the present invention that the inventive process adsorbs the thiophenes at least slightly more selectively than benzene.

This is a substantial advance over currently available commercial sorbents, which adsorb little, if any, thiophene or thiophene compounds at low concentrations. For example, activated carbon was recently tested by the present inventors, and was found to behave similarly to Na—Y (discussed in further detail below), in that it adsorbed very little (below 1/10 mmol/gram) benzene and thiophene at $10^{-5}$ atm.

Without being bound to any theory, it is believed that the higher sorbent capacity of embodiments of the present invention may be due to a sorbent pretreatment method of an embodiment of the present invention wherein the sorbent is calcined between about 350° C. and about 450° C. in an inert, dry atmosphere, and then cooled in a dry atmosphere.

The present inventive process may advantageously be run at ambient temperature and pressure, which is highly desirable for a variety of reasons. It is much less energy consuming to run processes at ambient temperature and pressure. Further, conventional catalytic desulfurizing processes, processes are typically run at high temperatures, e.g., 700° C., and high pressures, causing the (very expensive) catalyst to be continually deactivated. Further, the reactor size of a conventional process would need to be exponentially increased over present reactor sizes in order to remove thiophenes lower than the currently acceptable several hundred ppm. Still further, the present inventive process may be used as a first line desulfurizing process, and/or as a clean up desulfurizing process to remove sulfur compounds missed by conventional processes, such as those processes discussed above (e.g., hydrodesulfurization). It could be very useful to have the option to add the present invention as a downstream "clean up" desulfurizing process, in that it may not be necessary to revamp current refining processes upstream from the present inventive process. This could solve the cost-prohibitive problems encountered by some refiners. See Parkinson, G., (cited above).

Without being bound to any theory, it is also believed that the excellent desulfurization (of fuels such as, for example, gasoline and diesel) results as discussed hereinbelow in embodiments of the present invention may at least in part be due to the addition of a relatively thin layer of another sorbent as a guard bed. It is contemplated that all suitable commercial sorbents may be used as a guard bed. In a non-limitative embodiment(s) discussed herein, the present inventors used as the guard bed activated carbon, 15% of the bed, added at the inlet of the bed; while the main bed that was doing the purification work remained CuY zeolite. This sorbent proved orders of magnitude more effective than known sorbent(s).

The sorbents of the present invention, one example of which is Cu(I)Y, may be substantially fully regenerated by first air oxidation (e.g., at about 350° C.), followed by auto-reduction in an inert atmosphere (e.g., at about 450° C.).

The process and sorbents of the present invention may have quite significant cost benefits on the future energy picture. For example, for a full tank of gas, it is estimated that it would cost only about 70 cents to remove the sulfur from the current 350 ppm to below 5 ppm. If some blending were done, to meet the new (2006) EPA standard, then it is estimated that it would cost only about 12 cents. These costs are based on the assumption that the sorbent is disposable—no regeneration. However, it is estimated that the cost could be considerably less if the sorbent were regenerated (for example, as described above, i.e., air oxidation followed by auto-reduction in inert atmosphere).

Although the process of the present invention has specifically tested Cu—Y and Ag—Y (as well as other sorbents), it is to be understood that Type X zeolites may in some cases be as good as, or better zeolites than Y zeolites, since more cations are available in X zeolites. Further, it is to be understood that other zeolites are contemplated as being within the scope of the present invention. Still further, it is to be understood that all d-block transition metals and/or their ions may be used in place of the copper or silver, as it is believed that any d-block element will form $\pi$-complexation bonds with thiophene and thiophene compounds. In particular, it is believed that $Ni^{2+}$ and $Pd^{2+}$ would be as effective as $Cu^+$ and $Ag^+$. Further, the metals do not need to be ion-exchanged, but rather may be dispersed (monolayer dispersion, island dispersion, etc.) on a carrier (such as, for example, silica, alumina, etc.) by any suitable method.

The present inventors noted that chemical complexation adsorbents, such as those for $\pi$-complexation, have barely been utilized in industrial adsorption applications. The $\pi$-complexation bonds are stronger than those formed by van der Waals interactions, but they are also weak enough as to be broken by traditional engineering means such as increasing temperature and/or decreasing pressure. King, C. J. Separation Processes Based on Reversible Chemical Complexation. In Handbook of Separation Process Technology, Rousseau, R. W., Ed.; Wiley; New York, 1987; Chapter 15. Therefore, the present inventors have fortuitously tailored and developed new adsorbents for processes where selective adsorption is needed, such as in the case of sulfur removal from fuels. The present inventors have also fortuitously discovered that both cooper and silver exchanged faujasite type zeolites, Ag—Y and Cu(I)—Y, are excellent adsorbents for removal of thiophene molecules from liquid hydrocarbon mixtures. Breakthrough and saturation adsorption capacities obtained for an influent concentration of 760 ppmw sulfur (or 2000 ppmw thiophene) in n-octane followed the order Cu(I)—Y>Ag—Y>H—Y>Na—Y and Cu(I)—Y>H—Y>Na—Y>Ag—Y, respectively. For the case of 190 ppmw sulfur in mixtures containing both benzene and n-octane, Cu(I)—Y adsorbed 0.70 and 1.40 wt % sulfur at breakthrough and saturation, respectively.

In embodiments of the present invention, $\pi$-complexation adsorbents are used, such as, for example, Cu—Y (auto-reduced) zeolites, to remove sulfur compounds from commercial fuels, in particular gasoline and diesel, at room temperature and atmospheric pressure using fixed-bed adsorption/breakthrough techniques together with GC-FPD (Flame Photometric Detector) and FTIR analysis.

In an embodiment of the present invention, the process for removing thiophene and thiophene compounds from liquid fuel comprises the step of contacting the liquid fuel with an adsorbent which preferentially adsorbs the thiophene and thiophene compounds, at a selected temperature and pressure, thereby producing a non-adsorbed component and a thiophene/thiophene compound-rich adsorbed component. It is to be understood that in the "thiophene/thiophene compound-rich adsorbed component" term as used herein, the thiophenes may not be the greatest amount of adsorbate. For example, in the case of liquid fuels having a very high concentration of aromatics, and a very low concentration of thiophenes, the adsorbed phase will actually contain more benzene than thiophene, because there is much more benzene than thiophene in the solution. The adsorbed phase may have thiophene/benzene at a ratio of about ½. However, that would be enough to advantageously purify the solution.

The adsorbent comprises any ion-exchanged zeolite, but in a preferred embodiment, the zeolite is selected from the group consisting of zeolite X, zeolite Y, zeolite LSX, and mixtures thereof. The zeolite has exchangeable cationic sites, and at least some of the sites have d-block transition metal cation present. The preferential adsorption occurs by $\pi$-complexation.

In a further embodiment, the invention comprises a process for removing thiophene and thiophene compounds from liquid fuel. The method comprises the step of contacting the liquid fuel with an adsorbent which preferentially adsorbs the thiophene and thiophene compounds, at a selected temperature and pressure, thereby producing a non-adsorbed component and a thiophene/thiophene compound-rich adsorbed component. The adsorbent comprises a carrier having a surface area, the carrier having a d-block transition metal compound dispersed on at least some of the surface area. The metal compound releasably retains the thiophenes. The carrier comprises a plurality of pores having a pore size greater than the effective molecular diameter of the thiophene/thiophene compounds. The method may further comprise the step of changing at least one of the pressure and temperature to thereby release the thiophene/thiophene compound-rich component from the adsorbent.

As suggested by King, chemical complexation bonds are generally stronger than van der Waals interactions (thus giving rise to higher selectivities), yet weak enough to be reversible (i.e., to be broken by simple engineering means). See, for example, King, C. J., "Separation Processes Based on Reversible Chemical Complexation," *Handbook of Separation Process Technology*, R. W. Rousseau ed., Wiley, New York (1987), Chap. 15. Therefore, a tremendous opportunity exists for developing new sorbents (and new applications in separation and purification) by using weak chemical bonds, including various forms of complexation bonds. Based on the principles of π-complexation, the inventor(s) have already developed a number of new sorbents for a number of applications. These include sorbents for: (a) olefin/paraffin separations (see, for example, Yang, R. T.; Kikkinides, E. S. "New Sorbents for Olefin-Paraffin Separations by Adsorption via π-Complexation," *AIChE J.* (1995), 41, 509; Rege, S. U.; Padin, J; Yang, R. T. "Olefin-Paraffin Separations by Adsorption: Equilibrium Separation by π-Complexation vs. Kinetic Separation," AIChE J. (1998), 44, 799; Huang, H. Y.; Padin, J.; Yang, R. T. "Ab Initio Effective Core Potential Study of Olefin/Paraffin Separation by Adsorption via π-Complexation: Anion and Cation Effects on Selective Olefin Adsorption," *J. Phys. Chem. B*. (1999), 103, 3206; Huang, H. Y.; Padin, J.; Yang, R. T. "Comparison of π-Complexations of Ethylene and Carbon Monoxide and $Cu^+$ and $Ag^+$," Ind. Eng. Chem. Res. (1998), 38, 2720; and Padin, J.; Yang, R. T. "New Sorbents for Olefin-Paraffin Separations by Adsorption via π-Complexation: Synthesis and Effects of Substrates," *Chem. Eng. Sci.* (2000), 55, 2607.); (b) diene/olefin separation or purification (i.e., removal of trace amounts of dienes from olefins) (see Padin, J.; Yang, R. T.; Munson, C. L. "New Sorbents for Olefin-Paraffin Separations and Olefin Purification for $C_4$ Hydrocarbons," *Ind. Eng. Chem. Res.* (1999), 38, 3614; Jarayaman, A; Yang, R. T.; Munson, C. L.; Chinn, D. "Deactivation of π-Complexation Adsorbents by Hydrogen and Rejuvenation by Oxidation," Ind. Eng. Chem. Res. (2001); and Takahashi, A.; Yang, R. T.; Munson, C. L.; Chinn, D. "Cu(I)—Y Zeolite as a Superior Adsorbent for Diene/Olefin Separation," *Langmuir* (2001); and (c) aromatics/aliphatics separation and purification (i.e, removal of trace amounts of aromatics from aliphatics) (see Takahashi, A.; Yang, F. H.; Yang, R. T. "Aromatics/Aliphatics Separation by Adsorption: New Sorbents for Selective Aromatics Adsorption by π-Complexation," *Ind. Eng. Chem. Res*. (2000), 39, 3856; and Takahashi, A.; Yang, R. T. "New Adsorbents for Purification: Selective Removal of Aromatics," *AIChE J.*, (submitted 2001). For purification, vapor phase results can be applied directly to liquid phase applications. In the present invention, the inventors have used molecular orbital calculations to obtain a basic understanding for the bonding between the sorbates and sorbent surfaces, and further, to develop a methodology for predicting and designing π-complexation sorbents for targeted molecules (see, for example, Huang, H. Y.; Padin, J.; Yang, R. T. "Ab Initio Effective Core Potential Study of Olefin/Paraffin Separation by Adsorption via π-Complexation: Anion and Cation Effects on Selective Olefin Adsorption," *J. Phys. Chem. B*. (1999), 103, 3206; and Huang, H. Y.; Padin, J.; Yang, R. T. "Comparison of π-Complexations of Ethylene and Carbon Monoxide and $Cu^+$ and $Ag^+$," Ind. Eng. Chem. Res. (1998), 38, 2720).

In the present invention, the inventors obtained first results on new sorbents for desulfurization using π-complexation. CuY and AgY were the sorbents, and thiophene and benzene were used as the model system. Since NaX (i.e., 13×) or NaY is among the best commercially available sorbents for thiophene, NaY was used as the reference for comparison.

The sulfur breakthrough curves with AgY and NaY zeolites (FIG. 3), with a liquid feed of thiophene in octane, shows AgY to be an excellent sorbent. Further experiments were run with Cu(I)Y. Surprisingly, even though the results with AgY were very good, the results with Cu(I)Y were better than those of AgY. The sorbent capacity of Cu(I)Y is much higher than that of AgY, and very pure octane was obtained for extended periods of time. The sulfur capacity of Cu(I)Y zeolite was found to be about 2.55 mmol/g (or, 21.4 wt %). This is an extremely high capacity because the experiments were removing ppm levels of sulfur. Cu(I)—Y (auto-reduced Cu(II)—Y) zeolites were used to separate low concentration sulfur molecules from commercial gasoline and diesel samples, at room temperature and atmospheric pressure. Substantially sulfur-free fuels were obtained with Cu(I)—Y and a combination of activated carbon (AC) and Cu(I)—Y. Activated carbon was used as a guard bed. Breakthrough and saturation adsorption capacities obtained for an influent average total concentration of 335 ppmw sulfur in gasoline showed that Cu(I)—Y is capable of processing about 14.7 $cm_3$ of substantially sulfur-free gasoline per gram of adsorbent and removing about 1.4 wt % sulfur at saturation. When using activated carbon as a guard bed with Cu(I)—Y zeolite, the combination is capable of processing about 19.6 $cm_3$ of substantially sulfur-free gasoline per gram of adsorbent. In the case of diesel fuel. AC/Cu(I)—Y adsorbed about 1.08 wt % and 1.85 wt % total sulfur at breakthrough and saturation, respectively. At breakthrough, the adsorbent plus guard bed is capable of processing about 34.3 $cm_3$ of substantially sulfur-free diesel per gram of adsorbent. GC-FPD data reveals the π-complexation adsorbents are capable of removing heavily substituted thiophenes, benzothiophenes, and dibenzothiophene, which is not possible using conventional Hydrodesulfurization HDS reactors.

Ag-exchanged faujasite was claimed for thiophene removal in U.S. Pat. No. 4,188,285 issued to Michlmayr. In sharp contrast to the present invention, the '285 preferred temperature for adsorption was 200–350° C., and the sorbent was not dehydrated by heat-treatment prior to adsorption. Also in sharp contrast to the present invention, the '285 sulfur capacities were very low, at about 0.07–0.15 wt % for Ag—Y. In the '285 patent, the highest sulfur capacity (of 0.2 wt %) was obtained with the lowest Ag content, with USY zeolite. The '285 sorbent was apparently intended for bonding the sulfur atom with Ag. It was not intended for π-complexation. In contrast, the sorbents of the present invention, for example, the Cu(I)Y sorbent has a sulfur capacity>100 times larger.

Vansant et al. in European Patent Publication No. 0 275 855 investigated Cu(II)Y for thiophene removal. In contrast to the present invention, the '855 $Cu^{2+}$ exchanged Y zeolite was purposely heat-treated in air (to 200–550° C.) to maintain the $Cu^{2+}$ in the divalent state. Thus, in contrast to the present invention, in the '855 publication adsorption by π-complexation was not intended. The '855 publication discloses low thiophene capacities (the highest was 1.6 wt %). In sharp contrast, the thiophene capacities of the present invention were about 21.4 wt %.

FIGS. 14–21 are graphs depicting various breakthrough curves.

To further illustrate the present invention, the following examples are given. It is to be understood that these examples are provided for illustrative purposes and are not to be construed as limiting the scope of the present invention.

EXAMPLES

Experiment A

Sorbent Preparation $Cu^+$—Y was prepared by ion exchange of Na—Y zeolites (Si/Al=2.43, 56 Al atoms/u.c., Strem Chemical) with $Cu(NO_3)_2$ followed by reduction of $Cu^{2+}$ to $Cu^+$, since Cu(I) is not soluble in water. First, as-received Na—Y was exchanged twice using excess amounts (10-fold cation-exchange-capacity (CEC) assuming that one $Cu^{2+}$ compensates two aluminum sites) of 0.5 M $Cu(NO_3)_2$ at room temperature for 24 hours. After the exchange, the zeolite suspension was filtered and washed with copious amount of de-ionized water. The product was dried at 100° C. overnight. Several groups have reported reduction of $Cu^{2+}$ to $Cu^+$ in zeolite in He (i.e., auto-reduction, see Takahashi, A.; Yang, R. T.; Munson, C. L.; Chinn, D. "Cu(I)—Y Zeolite as a Superior Adsorbent for Diene/Olefin Separation," *Langmuir* (2001); and Larsen, S. C.; Aylor, A.; Bell, A. T.; Reimer, J. A. "Electron Paramagnetic Resonance Studies of Copper Ion-Exchanged ZSM-5," *J. Phys. Chem.* (1994), 98, 11533). In this study, reduction of $Cu^{2+}$ to $Cu^+$ was carried out in He only at 450° C. for 1 hour. $Ag^+$ ion-exchanged Y-zeolite (Ag—Y) was prepared at room temperature for 24 hours in the same manner as $Cu^{2+}$ exchange, using 5-fold excess $AgNO_3$ (0.1M).

Single component isotherms for benzene and thiophene were measured at 120° C. using standard gravimetric methods. A Shimadzu TGA-50 automatic recording microbalance was employed. Helium (Pre-purified grade, Metro welding, 99.995%) was used as the carrier gas and was first passed through two consecutive gas-wash bottles (to ensure saturation), which contained benzene (HPLC grade, Aldrich, 99.9+%) or thiophene (Aldrich, 99+%). After diluting the concentration to the desired value by blending with additional helium, the mixture was directed into the microbalance.

Molecular Orbital Computational Details

Molecular orbital (MO) studies on the π-complexation bonding for benzene and sorbent surfaces had been investigated recently. See Takahashi, A.; Yang, F. H.; Yang, R. T. "Aromatics/Aliphatics Separation by Adsorption: New Sorbents for Selective Aromatics Adsorption by π-Complexation," *Ind. Eng. Chem. Res.* (2000), 39, 3856. In this work, similar MO studies were extended to thiophene and sorbent surfaces. The Gaussian 94 Program in Cerius2 molecular modeling software (see Bowie, J. E., *Data Visualization in Molecular Science: Tools for Insight and Innovation*; Addison-Wesley Pub. Co.: Reading, Mass., (1995); chapter 9) from Molecular Simulation, Inc. was used for all calculations. See Frisch, M. J.; Trucks, G. W.; Schlegel, H. B.; Gill, P. M. W.; Johnson, B. G.; Robs, M. A.; Cheeseman, J. R.; Keith, T.; Petersson, G. A.; Montgomery, J. A.; Raghavachari, K.; Al-Laham, M. A.; Zakrzewski, V. G.; Ortiz, J. V.; Foresman, J. B.; Peng, C. Y.; Ayala, P. Y.; Chen, W.; Wong, M. W.; Andres, J. L.; Replogle, E. S.; Gomperts, R.; Martin, R. L.; Fox, D. J.; Binkley, J. S.; DeFrees, D. J.; Baker, J.; Stewart, J. P.; Head-Gordon, M.; Gonzalez, C.; Pople, J. A. *Gaussian 94, Revision B.*3, Gaussian, Inc., Pittsburgh, Pa. (1995). MO calculations for thiophene and sorbent surfaces were performed at the Hartree-Fock (HF) and density functional theory (DFT) level using effective core potentials (ECPs). See Hay, P. J.; Wadt, W. R. "Ab Initio Effective Core Potential for Molecular Calculations. Potentials for the Transition Metals Atoms Sc to Hg," *J. Chem. Phys.* (1985), 82, 270; Wadt, W. R.; Hay, P. J. "Ab Initio Effective Core Potential for Molecular Calculations: Potentials for Main Group Elements Na to Bi," *J. Chem. Phys.* (1985), 92, 284; and Hay, P. J.; Wadt, W. R. "Ab Initio Effective Core Potential for Molecular Calculations: Potentials for K to Au Including the outermost core orbitals," *J. Chem. Phys.* (1985), 82, 299.

The LanL2DZ basis set (see Russo, T. V.; Martin, R. L.; Hay, P. J. "Effective Core Potentials for DFT Calculations," *J. Phys. Chem.* (1995), 99, 17085) is a double-ζ basis set containing ECP representations of electrons near the nuclei for post-third-row atoms. The reliability of this basis set has been confirmed by the accuracy of calculation results as compared with experimental data. Therefore, the LanL2DZ basis set was employed for both geometry optimization and natural bond orbital (NBO) analysis.

The restricted Hartree-Fock (RHF) theory at the LanL2DZ level basis set was used to determine the geometries and the bonding energies of thiophene on AgCl and CuCl. The simplest models with only a single metal chloride interacting with a thiophene molecule were chosen for π-complexation studies. The optimized structures were then used for bond energy calculations according to the following expression:

$$E_{ads} = E_{adsorbate} + E_{adsorbent} - E_{adsorbent-adsorbate} \qquad (1)$$

where $E_{adsorbate}$ is the total energy of thiophene, $E_{adsorbent}$ is the total energy of the bare adsorbent, i.e., the metal chloride, and $E_{adsorbent-adsorbate}$ is the total energy of the adsorbate/adsorbent system. A higher value of $E_{ads}$ corresponds to a stronger adsorption.

Natural Bond Orbital (NBO)

The optimized structures were also used for NBO analysis at the B3LYP/LanL2DZ level. The B3LYP (see Becke, A. D. "Density Functional Thermochemistry. III. The Role of Exact Exchanges," *J. Chem. Phys.* (1993), 98, 5648) approach is one of the most useful self-consistent hybrid (SCH) approaches (see Becke, A. D.; "A New Mixing of Hartree-Fock and Local Density-Functional Theories," *J. Chem. Phys.* (1993), 98, 1372), it is Beck's 3-parameter nonlocal exchange functional (see Becke, A. D.; "Density-Functional Thermochemistry. II. The Effect of the Perdew-Wang generalized-gradient correlation correction," *J. Chem. Phys.* (1992), 97, 9173) with nonlocal correlation functional of Lee, Yang and Parr. See Lee, C.; Yang, W.; Parr, R. G. "Development of the Colle-Salvetti Correlation-Energy Formula into a Functional of the Electron Density," Phys. Rev. (1988), B37, 785.

The NBO analysis performs population analysis that pertains to localized wave-function properties. It gives a better description of the electron distribution in compounds of high ionic character, such as those containing metal atoms. See Reed, A. E.; Weinstock, R. B.; Weinhold, F. "Natural Population Analysis," *J. Chem. Phys.* (1985), 83 (2), 735. It is known to be sensitive for calculating localized weak interactions, such as charge transfer, hydrogen bonding and weak chemisorption. Therefore, the NBO program (Glendening, E. D.; Reed, A. E.; Carpenter, J. E., Weinhold, F. *NBO Version* 3.1 (1995)) was used for studying the electron density distribution of the adsorption system.

Results and Discussion

For purification, as the inventors have shown for the removal of ppm levels of dienes from olefins (Takahashi, A.; Yang, F. H.; Yang, R. T. "Aromatics/Aliphatics Separation by Adsorption: New Sorbents for Selective Aromatics Adsorption by π-Complexation," *Ind. Eng. Chem. Res.*, (2000), 39, 3856; and Takahashi, A.; Yang, R. T. "New Adsorbents for Purification: Selective Removal of Aromatics," *AIChE J.*, (submitted 2001), one parameter is the separation factor; and the separation factor should be evaluated at low concentrations of the solute but at high concentrations of the solvent. In other words, the capacity for the dilute solute (at ppm level) is an important factor in determining the purification. The separation factor ($\alpha$) is given by:

$$\alpha_{12} = X_1 Y_2/(X_2 Y_1) \quad (2)$$

where X and Y are mole fractions in the adsorbed and fluid phases, respectively. In our case, component 1 is thiophene and component 2 is benzene. Hence, the ability of the sorbent for purification depends on the amount of thiophene adsorbed at the ppm levels.

FIG. 1 shows the equilibrium isotherms of benzene and thiophene on NaY at 120° C. NaY does not have a selectivity for thiophene; however, it adsorbs both benzene and thiophene quite strongly, as evidenced by the still measurable amounts adsorbed at partial pressures as low as 10–100 ppm of 1 atm. As expected, a fixed-bed adsorber experiment using NaY would yield a breakthrough curve (Yang, R. T. *Gas Separation by Adsorption Processes*, Butterworth, Boston (1987), Imperial College Press, London (1997)), as seen in the literature (Salem, A. S. H.; Hamid, H. S. "Removal of Sulfur Compounds from Naphtha Solutions Using Solid Adsorbents," *Chem. Eng. Tech.* (1997), 20, 342). The data were fitted by the Langmuir-Freundlich isotherm (Takahashi, A.; Yang, R. T.; Munson, C. L.; Chinn, D. "Cu(I)—Y Zeolite as a Superior Adsorbent for Diene/Olefin Separation," Langmuir (2001); Takahashi, A.; Yang, F. H.; Yang, R. T. "Aromatics/Aliphatics Separation by Adsorption: New Sorbents for Selective Aromatics Adsorption by π-Complexation," *Ind. Eng. Chem. Res.* (2000), 39, 3856; and Takahashi, A.; Yang, R. T. "New Adsorbents for Purification: Selective Removal of Aromatics," *AIChE J.*, (submitted 2001), as shown by the lines in the figure.

Figure 2:
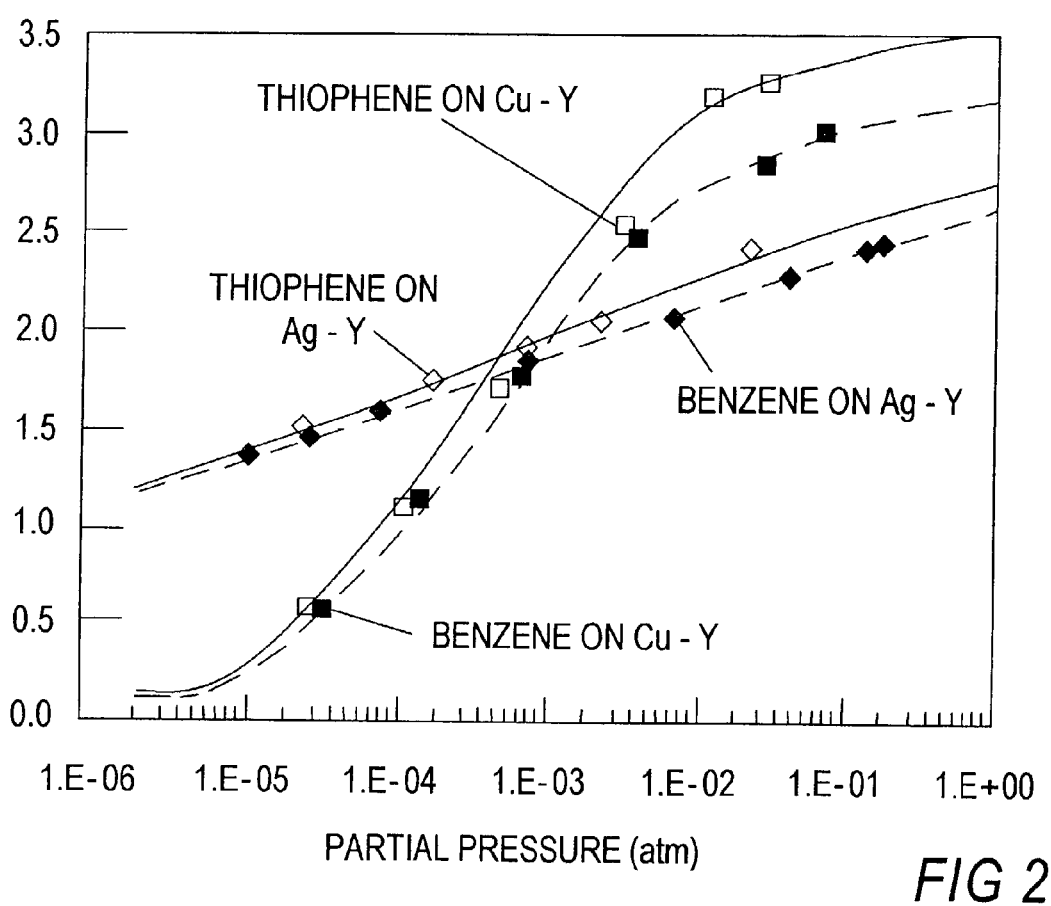
FIG. 2 is a graph depicting equilibrium isotherms on AgY (56 $Ag^+$/unit cell) and CuY (14 $Cu^+$/unit cell) at 120° C.

FIG. 2 shows the isotherms of benzene and thiophene on AgY and CuY. Note that: (a) compared with NaY, AgY and CuY adsorb both thiophene and benzene more strongly at below $10^{-3}$ atm, due to π-complexation; and (b) on a per-cation basis, $Cu^+$ shows stronger interactions than $Ag^+$. Compared with FIG. 1, these sorbents adsorbed significantly more thiophene and benzene than NaY at pressures below $10^{-3}$ atm, and nearly the same amounts at high partial pressures. This result was a clear indication of π-complexation with $Ag^+$ and $Cu^+$; $Na^+$ could not form π-complexation bonds. From the data in FIGS. 1 and 2, the separation factors were calculated using mixed Langmuir-Freundlich isotherms (Taka), and are shown in Table 1. However, these separation factors did not reflect the relative strengths of π-complexation between $Cu^+$ and $Ag^+$ because the $Cu^+$ exchange was not complete. Nonetheless, the large separation factors indicate that AgY and CuY are excellent sorbents for purification purposes.

TABLE 1

Separation factors of thiophene over benzene estimated from pure-component isotherms by extended Langmuir-Freundlich Equation at the pressure of $3 \times 10^{-5}$ atm for thiophene and 1 atm for benzene.

| Adsorbent | Ag—Y | Cu—Y | Na—Y |
| --- | --- | --- | --- |
| Separation Factor | 2800 | 50 | 0.10 |

The neutron activation analyses of the sorbent samples showed that the $Ag^+$ exchange was 100% but the $Cu^+$ exchange was only 23%. On a per-cation basis, the π-complexation with $Cu^+$ was stronger than that with $Ag^+$. This was indeed confirmed by our molecular orbital calculations, as will be discussed. To understand the relative strengths of π-complexation between $Ag^+$ and $Cu^+$, the thiophene adsorption amounts at $2 \times 10^{-5}$ atm were normalized by $Ag^+$ or $Cu^+$ content, and the results are shown in Table 2. It is seen that $Cu^+$ could adsorb higher thiophene adsorption amounts per cation. In fact, 0.92 thiophene molecule per $Cu^+$ was obtained at $2 \times 10^{-5}$ atm at 120° C. This amount was due to $Cu^+$ since the amount adsorbed by NaY at the same pressure was negligible. At the same pressure, only 0.42 thiophene/$Ag^+$ was obtained. This result indicated strong π-complexation bonds between both $Cu^+$ and $Ag^+$, and that the bond with $Cu^+$ was stronger. Further work is in progress to increase the $Cu^+$ contents on various X/Y and other zeolites and the results will be reported shortly.

TABLE 2

Thiophene adsorption amount normalized by cation content (thiophene/cation).

| Adsorbent | Ag—Y | Cu—Y |
|---|---|---|
| Cation for π-complexation | $Ag^+$ | $Cu^+$ |
| Cation Content in Zeolite (wt %) | 38.2 | 8.29 |
| Amount Adsorbed (thiophene molecule/cation) | 0.42 | 0.92 |

The heats of adsorption for π-complexation were estimated by taking the values at low loadings, and they were obtained from the temperature dependence of the isotherms at low pressures. These values are given in Table 3.

TABLE 3

Heats of adsorption (kcal/mol) for π-complexation.

| Zeolite | Thiophene | Benzene |
|---|---|---|
| Cu(I)—Y | 22.3 | 21.8 |
| Ag—Y | 21.4 | 20.1 |

Bond Energies, Geometries and NBO Results

The energies of adsorption calculated using equation 1 for thiophene and benzene are summarized in Table 4.

TABLE 4

Summary of energies of adsorption for thiophene and benzene in kcal/mol.

| MCl | $E_{ads}$ (Thiophene) | $E_{ads}$ (Benzene) |
|---|---|---|
| CuCl | 13.5 | 12.4 |
| AgCl | 9.0 | 8.6 |

The theoretical calculations indicate that the π-complexation strengths follow the order CuCl>AgCl and more importantly, thiophene>benzene. This trend is in agreement with the experimental data, in Table 3. Chloride was used as the anion in the theoretical calculations, while zeolite framework was the anion in the experiment. It is known from our previous work that the anion has a large effect on the π-complexation bonds. See, for example, Huang, H. Y.; Padin, J.; Yang, R. T. "*Ab Initio Effective* Core Potential Study of Olefin/Paraffin Separation by Adsorption via π-Complexation: Anion and Cation Effects on Selective Olefin Adsorption," *J. Phys. Chem. B*. (1999), 103, 3206; and Huang, H. Y.; Padin, J.; Yang, R. T. "Comparison of π-Complexations of Ethylene and Carbon Monoxide and $Cu^+$ and $Ag^+$," *Ind. Eng. Chem. Res*. (1998), 38, 2720. In the optimized structures of thiophene-MCl complexes, the distance between the thiophene molecule and Cu ion is about 0.3 Å shorter than that of thiophene and Ag ion. The NBO analysis is summarized in Tables 5 and 6. There is some donation of electron charges from the π-orbital of thiophene to the vacant s orbital of metals known as σ donation and, simultaneously, back-donation of electron charges from the d orbitals of metals to π*orbital of thiophene or π back-donation. The π back-donation appears to be important in all cases. The charge transfer results again confirmed the experimental data that the relative strengths of the π-complexation bonds follow the order: thiophene>benzene and $Cu^+>Ag^+$.

TABLE 5

Summary of NBO analysis* of π-complexation between thiophene and MCl.

| MCl | C → M interaction (σ donation) $q_1$ | M → C interaction (d–π* back-donation) $q_2$ | Net Change $q_1 + q_2$ |
|---|---|---|---|
| CuCl | 0.037 | −0.022 | 0.015 |
| AgCl | 0.022 | −0.014 | 0.008 |

*$q_1$ is the amount of electron population change in valence s orbitals of the metal, and $q_2$ is the total amount of electron population decrease in valence d orbitals of the metal.

TABLE 6

Summary of NBO analysis* of π-complexation between benzene and MCl.

| MCl | C → M interaction (σ donation) $q_1$ | M → C interaction (d–π* back-donation) $q_2$ | Net Change $q_1 + q_2$ |
|---|---|---|---|
| CuCl | 0.011 | −0.013 | 0.002 |
| AgCl | 0.003 | −0.007 | 0.004 |

*$q_1$ is the amount of electron population change in valence s orbitals of the metal, and $q_2$ is the total amount of electron population decrease in valence d orbitals of the metal.

Experiment B

Thiophene Removal Using Sodium and Silver Cation in Faujasite Zeolites

Work has been done on different adsorbents to remove sulfur from mixtures, such as, for example, thiophene from benzene or n-octane based solutions. These adsorbents include sodium and silver forms of faujasite type zeolites, particularly, Y type zeolites. Initial studies were done for the case of an inlet concentration of 2000 ppmw of thiophene in either benzene or n-octane.

Sorbent Preparation

Sodium Y Zeolite powder was obtained from Strem Chemicals. Silver Y Zeolite was obtained by ion exchanging NaY at room temperature. The solution was prepared using a silver nitrate salt and deionized water (~0.2 M). A 4-fold excess amount of silver was used to ensure exchange completion. After ion exchanging for 48 hours, the adsorbent was recovered by filtration and washed with large amounts of deionized water. Drying was performed at room temperature.

Breakthrough Experiments

Breakthrough experiments were performed in a custom made quartz reactor equipped with a glass frit. The adsorbent was loaded inside the reactor (usually 1 or 2 grams) and activated in situ under a helium atmosphere at 350° C. for 24 hrs. The adsorbent was then cooled down to room temperature. At this point, the sorbent was wetted by pouring down sulfur free solvent (benzene or n-octane) for about 30 minutes. This stream was then changed to one containing 2000 ppmw thiophene. Samples were collected at different time intervals, and the thiophene outlet concentration was analyzed using a GC unit equipped with a polar column at 65° C.

Preliminary Results

Figure 3:
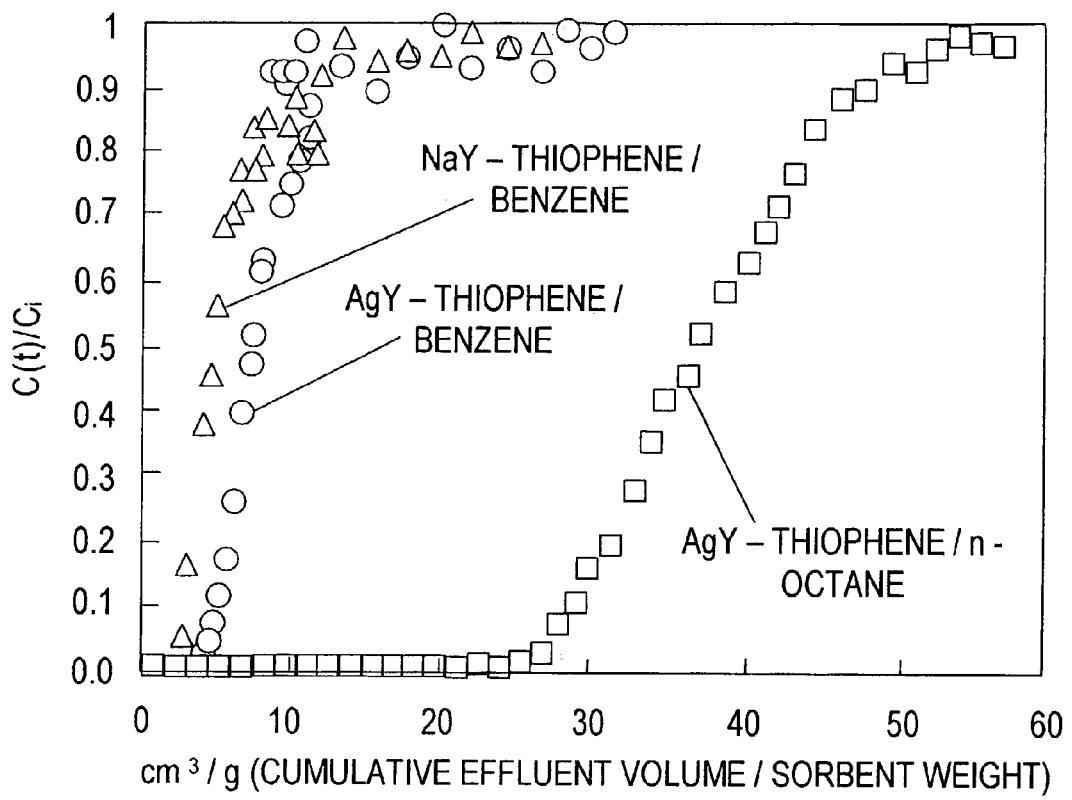
FIG. 3 is a graph depicting thiophene/benzene and thiophene/n-octane breakthrough in AgY, NaY zeolite at room temperature.

FIG. 3 shows breakthrough curves for thiophene in either benzene or n-octane in sodium or silver forms of Y Zeolite.

| | Thiophene adsorption amounts after saturation. | |
|---|---|---|
| Solvent | NaY Saturation Amount (mmol/g) | AgY |
| Benzene | 0.102 | 0.171 |
| n-Octane | — | 0.898 |

Integration of the area above the curves yield the adsorption saturation amounts presented in the table shown above. For the case of thiophene/benzene mixtures, the calculated thiophene adsorption amounts are not that high. Very recent single component vapor phase adsorption experiments have shown that NaY and AgY may adsorb benzene and thiophene in similar quantities. Thus, benzene may compete for many of the adsorption sites, perhaps leaving thiophene with fewer available sites. However, despite the possibility of competitive adsorption, the presence of silver cations results in an increase in some adsorption capacity. For the case of thiophene/n-Octane mixtures, AgY Zeolite shows great selectivity towards thiophene. Without being bound to any theory, it is believed that this indicates that the interaction between the silver cations and the thiophene molecules is higher than that of n-Octane molecules.

Experiment C

In this experiment, the known commercial sorbents such as Na—Y, Na-ZSM5, H-USY, activated carbon and activated alumina (Alcoa Selexsorb) were included, and a direct comparison was made with Cu—Y and Ag—Y which were the sorbents with π-complexation capability. Thiophene and benzene were used as the model system for desulfurization.

Sorbent Preparation

Various kinds of sorbents were investigated in this work. Four as-received sorbents: Na-type Y-zeolite (Na—Y, Si/Al=2.43, 56 Al atoms/unit cell, Strem Chemical), H-type ultra-stable Y-zeolite (H-USY, Si/Al=195, 0.98 Al atoms/u.c., HSZ-390HUA, TOSOH Corporation), activated carbon (Type PCB, Calgon Carbon Corporation) and modified activated alumina (Selexsorb CDX, Alcoa Industrial Chemical), were used in this study. According to the product datasheets, Selexsorb CDX is formulated for adsorption of sulfur-based molecules, nitrogen-based molecules, and oxygenated hydrocarbon molecules. Na—Y and H-USY were in powder form (binderless). Since activated carbon was in granular form and activated alumina was in pellet form, they were crushed into powder form for evaluation.

$Cu^+$—Y and Ag—Y were prepared as in Experiment A, above. 13X (Si/Al=1.25, Linde, lot#945084060002) was used for the preparation of Cu—X (10 fold CEC solution of $Cu(NO_3)_2$, ion-exchanged at 65° C. for 24 hrs, three times) and Ag—X (5-fold CEC solution of $AgNO_3$, ion-exchanged at RT for 24 hrs, twice). Na-type ZSM-5 (Na-ZSM-5) was prepared at room temperature by Na-exchange of $NH_4$—ZSM-5 (Si/Al=10, SM-24, ALSI-PENTA Zeolite GmbH).

Isotherm and Uptake Rate Measurements

The objective of this study is to compare the strength of adsorptive interaction between adsorbents and thiophene/benzene. Extremely low partial pressures at less than $10^{-5}$ atm would be necessary to meet this objective if isotherms were measured at ambient temperature, because the isotherms at ambient temperature are fairly flat and are difficult to compare each other. However, it is very difficult to obtain and control such low partial pressures experimentally. Therefore, single component isotherms for benzene and thiophene were measured at 90° C., 120° C. and 180° C. using standard gravimetric methods. A Shimadzu TGA-50 automatic recording microbalance was employed. Helium (Pre-purified grade, Metro welding, 99.995%) was used as the carrier gas and was first passed through two consecutive gas-wash bottles (to ensure saturation), which contained benzene (HPLC grade, Aldrich, 99.9+%) or thiophene (Aldrich, 99+%). After diluting the concentration to the desired value by blending with additional helium, the mixture was directed into the microbalance.

Isosteric heats of adsorption were calculated using the Clausius-Clapeyron equation from isotherms at different temperatures. Nitrogen isotherms at 77K measured with a Micromeritics ASAP 2010 system were used for pore size distribution and pore volume determination. Pore size distributions were calculated with Horvath-Kawazoe equation. See Horvath, G., and K. Kawazoe, "Method for Calculation of Effective Pore Size Distribution in Molecular Sieve Carbon," *J. Chem. Eng. Japan* (1983), 16, 470; Saito, A, and H. C. Foley, "Curvature and Parametric Sensitivity in Models for Adsorption in Micropore," *AIChE J* (1991), 37, 429; and Cheng, L. S., and R. T. Yang, "Improved Horvath-Kawazoe Equations Including Spherical Pore Models for Calculating Micropore Size Distribution," *Chem. Eng. Sci.* (1994), 49, 2599. Slit pore model was used for activated carbon, and cylindrical pore model was used for ZSM-5 and activated alumina, while spherical pore model was applied to Y-zeolites and X-zeolites. As for the parameters for H-K equation such as polarizability, magnetic susceptibility, density, etc., default values in Micromeritics ASAP system were used for the calculation of pore sizes. See "Accelerated Surface Area and Porosimetry System Operator's Manual V3.02," Micromeritics Instrument Corp. (1997). The diffusion time constants, $D/r^2$ $(s^{-1})$, were calculated from the uptake rates. See Yeh, Y. T, "Diffusion and Adsorption of Gases in Molecular Sieves," Ph.D. Dissertation, University of New York at Buffalo, Buffalo, N.Y., (1989). In this experiment, short time region (up to 30% uptake) and spherical adsorbent model were used.

Chemical Analysis

The compositions of Cu—Y and Ag—Y were characterized using neutron activation analysis (NAA) in the research nuclear reactor of the Phoenix Memorial Laboratory at the University of Michigan. The sample was irradiated sequentially for one minute at a core-face location with an average thermal neutron flux of $2 \times 10^{12}$ n/cm²/s. Two separate gamma-ray spectra were then collected for each sample with a high resolution germanium detector: one after 13-minute decay to determine the concentrations of Al, Ag and Cu, and a second after a 1 hour and 56-minute decay to analyze for Na. Gamma energy lines at 1779 keV, 632.99 keV, 1039.20 keV and 1368.6 keV were used for the determination of Al, Ag, Cu and Na concentration, respectively.

Molecular Orbital Computational Details and Natural Bond Orbitals are as described in Experiment A above.

Models for Ag-Zeolite (AgZ) and Cu-Zeolite (CuZ)

The zeolite models selected for this study are similar to the ones used by Chen and Yang (see Chen, N. and R. T. Yang, "Ab Initio Molecular Orbital Study of Adsorption of Oxygen, Nitrogen, and Ethylene on Silver-Zeolite and Silver Halides," *Ind. Eng. Chem. Res.* (1996), 35, 4020), with the molecular formula of $(HO)_3Si$—$O$—$Al(OH)_3$, and the cation $Ag_+$ or $Cu_+$ sits 2–3 Å above the bridging oxygen between Si and Al. This is a good cluster model representing the chemistry of a univalent cation bonded on site II (SII) of the faujasite framework (Z). Once the optimized structures of AgZ and CuZ are obtained at the B3LYP/LanL2DZ level, then a molecule of thiophene ($C_4H_4S$) or benzene ($C_6H_6$) is added onto the cation of the zeolite model, and the resulting structure is further optimized at the B3LYP/LanL2DZ level.

Results and Discussion

Characterization of sorbents. Neutron activation analysis showed that Ag/Al and Na/Al ratios in Ag—Y were 1.13 and 0.01, respectively. This is because $Ag^+$ is known to have higher selectivity to cation sites in zeolites compared to $Na^+$. See Breck, D. W. *Zeolite Molecular Sieves: Structure, Chemistry and Use*; Wiley: New York (1974). More than 100% Ag ion-exchange ratio was obtained in Ag—Y, because some Ag ions were located outside the charge-compensating sites. On the other hand, the Al, Cu, and Na contents in Cu—Y were 6.10±0.25 wt %, 6.65±0.05 wt %, and 1.50±0.12 wt %, respectively. This means that the Cu/Al molar ratio was 0.463, and the Na/Al ratio was 0.289, indicating less selectivity than $Ag^+$. Therefore, Cu ion-exchange for X-zeolite was carried out three times at 65° C. (instead of twice at RT for Cu—Y) for 24 hrs to enhance the ion-exchange.

Figure 4:
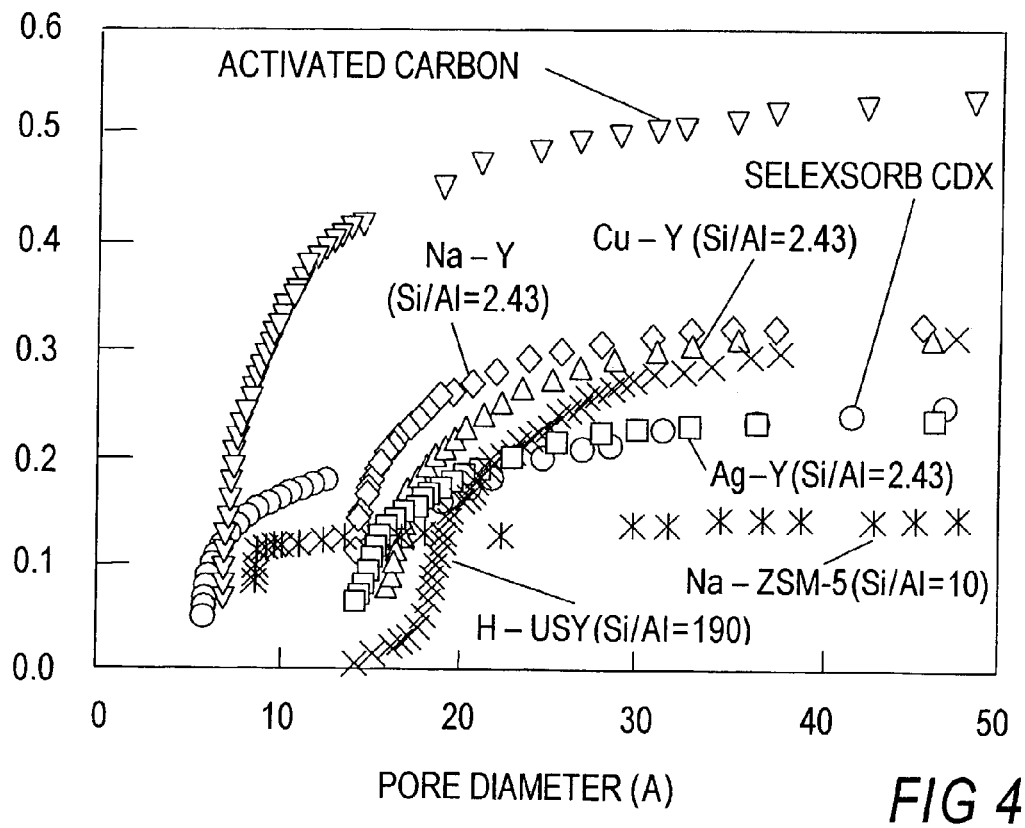
FIG. 4 is a graph depicting cumulative pore volumes of sorbents used in Experiment C.

FIG. 4 shows the comparison of the cumulative pore volumes of the sorbents used. Activated carbon has the largest pore volume with small pores, while Na-ZSM-5 has the smallest pore volume. Selexsorb CDX also shows small pores. Because silver is heavier than copper and the silver content in Ag—Y (Ag/Al=1.13) was more than copper content in Cu—Y (Cu/Al=0.463), the density of Ag—Y was higher by 36% ($Na_{0.084}Cu_{0.135}Al_{0.292}Si_{0.708}O_2$; MW=70.27 vs. $Ag_{0.330}Al_{0.292}Si_{0.708}O_2$; MW=95.36) Consequently, the pore volume of Ag—Y was about 25% smaller than that of Cu—Y.

Figure 5:
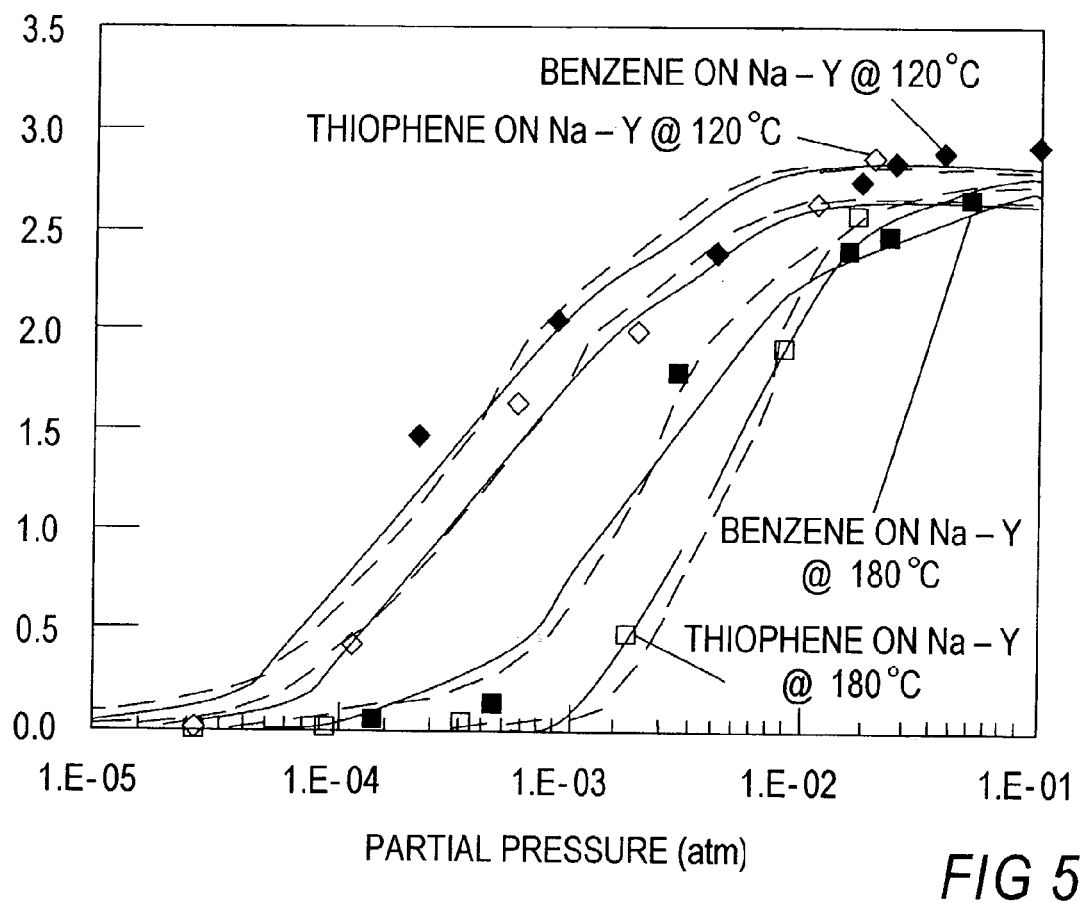
FIG. 5 is a graph depicting pure component equilibrium isotherms of benzene and thiophene on Na—Y (Si/Al=2.43) at 120° C. and 180° C.; curves are fitted with Dubinin-Astakhov (solid line) and Langmuir-Freundlich (dotted line) isotherms.

Benzene/Thiophene adsorption isotherms: Na—Y. FIG. 5 shows the equilibrium isotherms of benzene and thiophene on Na—Y at 120° C. and 180° C. The data were fitted by the Langmuir-Freundlich and Dubinin-Astakhov isotherms (see Padin, J.; Yang, R. T.; Munson, C. L., "New Sorbents for Olefin-Paraffin Separations and Olefin Purification for $C_4$ Hydrocarbons," *Ind. Eng. Chem. Res.* (1999), 38, 3614; Jayaraman, A; Yang, R. T.; Munson, C. L.; Chinn, D., "Deactivation of π-Complexation Adsorbents by Hydrogen and Rejuvenation by Oxidation," *Ind. Eng. Chem. Res.* (2001), 40, 4370; Takahashi, A.; Yang, R. T.; Munson, C. L.; Chinn, D., "Cu(I)—Y Zeolite as a Superior Adsorbent for Diene/Olefin Separation," *Langmuir* (2001), 17, 8405; Takahashi, A.; Yang, F. H.; Yang, R. T., "Aromatics/Aliphatics Separation by Adsorption: New Sorbents for Selective Aromatics Adsorption by π-Complexation," *Ind. Eng. Chem. Res.* (2000), 39, 3856; and Takahashi, A.; Yang, R. T., "New Adsorbents for Purification: Selective Removal of Aromatics," *AIChE J.*, (submitted 2001), which are shown by the lines in FIG. 5. Barthomeuf and Ha measured benzene adsorption on NaH—Y (Si/Al=2.43, 81%/Na) at 172° C. See, Barthomeuf, D. and Ha, B.-K, "Adsorption of Benzene and Cyclohexane on Faujasite-type Zeolites, Part-1, Thermodynamics Properties at Low Coverage," *J. Chem. Soc., Faraday Trans.* 1 (1973), 69, 2147. Their isotherm and calculated heat of adsorption agreed with the data shown in FIG. 5 very well, substantially ensuring the accuracy of the isotherms in this work. More benzene was adsorbed on Na—Y than thiophene at pressures lower than $10^{-2}$ atm. This result indicated that the contribution of the higher polarizability of benzene ($10.3 \times 10^{-24}$ cm$^3$ for benzene vs. $9.7 \times 10^{-24}$ cm$^3$ for thiophene) was larger than the contribution of the dipole moment (0 debye in benzene vs. 0.55 debye in thiophene) and lower magnetic susceptibility ($9.1 \times 10^{-29}$ cm$^3$/molecules for benzene vs. $9.5 \times 10^{-29}$ cm$^3$/molecules for thiophene). At higher pressures over $1 \times 10^{-2}$ atm, the benzene adsorption amount became smaller owing to the larger molar volume of benzene than thiophene. Na—Y does not have a selectivity for thiophene; however, it adsorbs both benzene and thiophene quite strongly, as evidenced by the still measurable amounts adsorbed at partial pressures as low as $10^{-4}$ to $10^{-3}$ atm.

Figure 6:
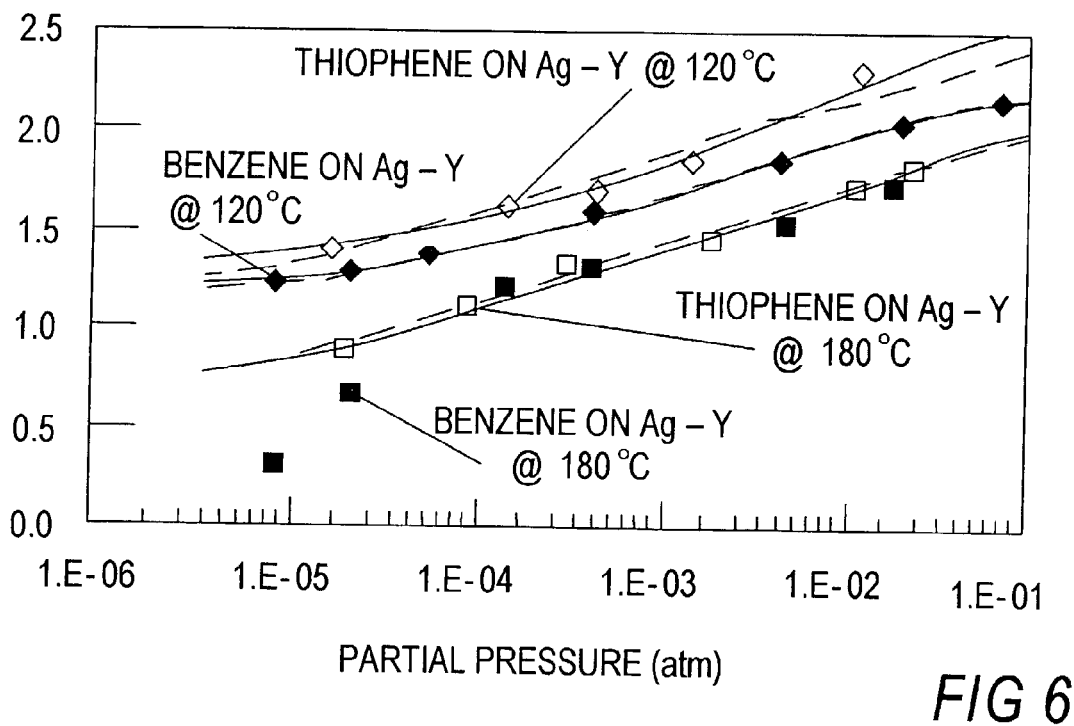
FIG. 6 is a graph depicting pure component equilibrium isotherms of benzene and thiophene on Ag—Y (Si/Al=2.43) at 120° C. and 180° C.; curves are fitted with Dubinin-Astakhov (solid line) and Langmuir-Freundlich (dotted line) isotherms; fitted curves are not shown for benzene adsorption at 180° C. because the artificial crossovers to the curves for thiophene at 180° C. are observed.
Figure 7:
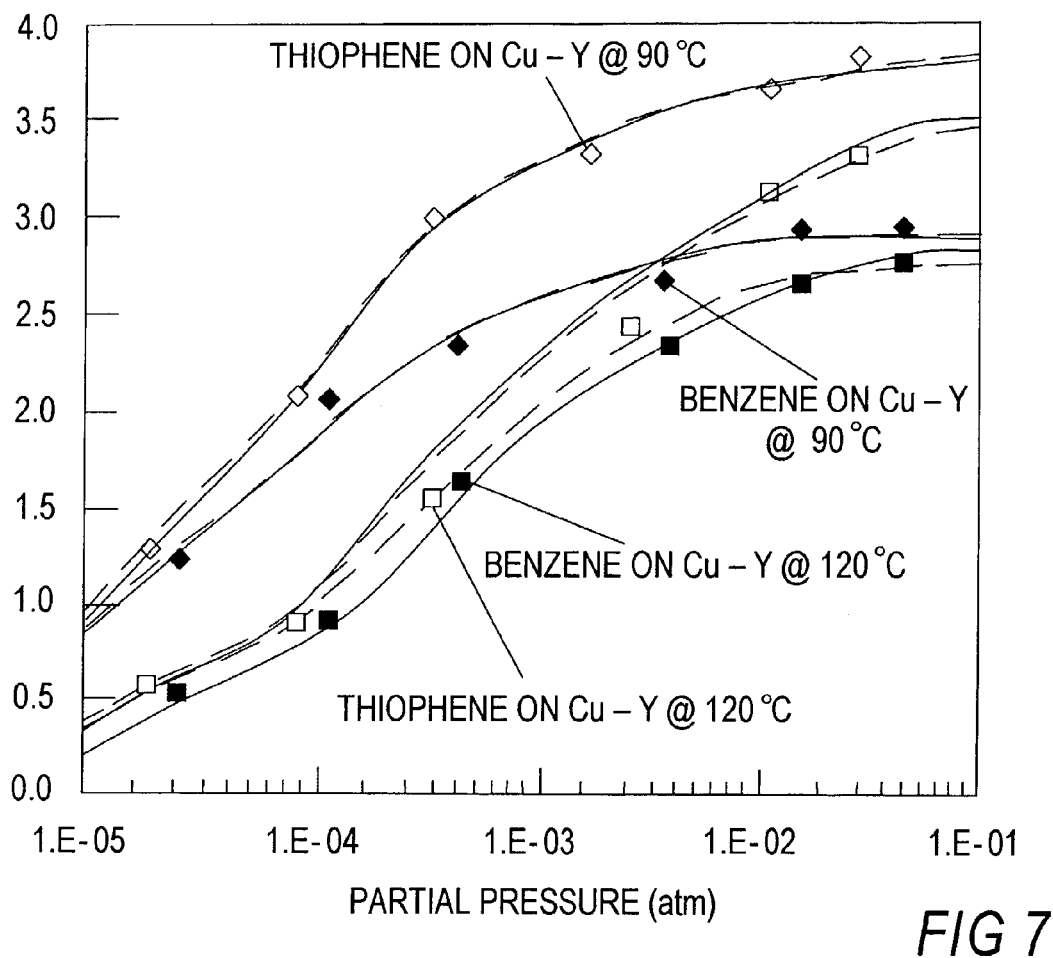
FIG. 7 is a graph depicting pure component equilibrium isotherms of benzene and thiophene on Cu—Y (Si/Al=2.43) at 90° C. and 120° C.; curves are fitted with Dubinin-Astakhov (solid line) and Langmuir-Freundlich (dotted line) isotherms.

Ag—Y and Cu—Y. FIG. 6 and FIG. 7 show the isotherms of benzene and thiophene on Ag—Y and Cu—Y. Compared with FIG. 5, these sorbents adsorbed significantly more thiophene/benzene than Na—Y at pressures below $10^{-3}$ atm, and nearly the same amounts at high partial pressures. This result was a clear indication of π-complexation with $Ag^+$ and $Cu^+$; since $Na^+$ could not form π-complexation bonds. However, the difference in the amounts of thiophene/benzene adsorbed did not reflect the relative strengths of π-complexation between $Cu^+$ and $Ag^+$ because the $Cu^+$ exchange was not complete. The neutron activation analyses of the sorbent samples showed that the $Ag^+$ exchange was 100% but the $Cu^+$ exchange was only 46%. According to the EPR analysis (described in Takahashi, A., Yang, R. T., Munson, C. L. and Chinn, D., "Cu(I)—Y Zeolite as a Superior Adsorbent for Diene/Olefin Separation," *Langmuir* (2001), 17, 8405), only about a half of the $Cu^{2+}$ was auto-reduced to $Cu^+$ after our heat treatment at 450° C. for 1 hr in He. On a per-cation basis, the π-complexation with $Cu^+$ was stronger than that with $Ag^+$. This was indeed confirmed by our molecular orbital calculations, as will be discussed. To understand the relative strengths of π-complexation between $Ag^+$ and $Cu^+$, the thiophene adsorption amounts at $2 \times 10^{-5}$ atm were normalized by $Ag^+$ or $Cu^+$ content, and the results are shown in Table 7. It is seen that $Cu^+$ could adsorb higher thiophene adsorption amounts per cation. In fact, 0.92 thiophene molecule per $Cu^+$ was obtained at $2 \times 10^{-5}$ atm at 120° C. This amount was due to $Cu^+$ since the amount adsorbed by NaY at the same pressure was negligible. At the same pressure, only 0.42 thiophene/$Ag^+$ was obtained. This result indicated strong π-complexation bonds between both Cu⁺ and Ag⁺, and that the bond with Cu⁺ was stronger.

TABLE 7

Thiophene Adsorption Amount Normalized by Cation Content. (thiophene/cation molar ratio)

| Adsorbent | Ag—Y | Cu—Y |
|---|---|---|
| Cations for π-complexation | Ag⁺ | Cu⁺ |
| Cation Content in Zeolite (wt %) | 38.2 | 8.29 |
| Amount Adsorbed (molar ratio) | 0.42 | 0.92 |

The vapor-phase isotherms of benzene/thiophene on Cu—Y and Ag—Y were not completely reversible within a practical time scale (1 hours to 3 hours), because of relatively strong interaction. However, the bond energies are of the order of 20 kcal/mol, which are weak enough so a substantial fraction of the adsorbed molecules are desorbed in a short period of time. For practical application, thermal desorption or displacement desorption may be a desirable option.

Cu—X. In order to increase the Cu⁺ content in the faujasite structure, an X-zeolite (Si/Al=1.25) was ion-exchanged with Cu(NO$_3$)$_2$. Cu—X was considered to be promising, since larger amounts of Cu⁺ can be present in the structure of zeolite, especially at SIII sites. The color of Cu—X powder after ion-exchange (before auto-reduction) was bluer than that of Cu—Y, suggesting that more Cu²⁺ was contained in X-zeolite than Cu—Y. For faujasite-type zeolites, the cations are designated as SI (the center of hexagonal prism), SI' (opposite SI but located in the cubooctahedron), SII (single six-ring in the supercage), SII' (opposite SII but inside the cubooctahedron), and SIII (near the four-ring windows in the supercage). See Yang, R. T. *Gas Separation by Adsorption Processes*, Butterworth, Boston (1987), Imperial College Press, London (1997); and Hutson, N. D.; Reisner, B. A.; Yang, R. T.; Toby, B. H., "Silver Ion-Exchanged Zeolites Y, X, and Low-Silica X: Observations of Thermally Induced Cation/Cluster Migration and the Resulting Effects on the Equilibrium Adsorption of Nitrogen," *Chem. Mater.* (2000), 12, 3020. The cations at SI, SI' and SII' sites are not exposed to the supercage and are shielded by framework oxygen. They cannot interact with molecules inside the supercages directly. Only SII and SIII sites are exposed to the supercage and can interact with molecules inside the supercage. Because Y-zeolite (Si/Al=2.43) does not have the SIII cation sites, it is believed that only cations at SII site are responsible for the thiophene/benzene adsorption. On the other hand, X-zeolite (Si/Al=1.25) have a certain amount of SIII sites, based on the results on Ag—X. This additional Cu⁺ located at SIII site should enhance the adsorption amount. However, unfortunately, it was found that Cu—X (Si/Al=1.25) was not stable at temperatures over 200° C., and the pore volume was decreased by 60%. The color of the powder was changed from light blue to dark greenish gray after heating at 200° C. for 1 hour in vacuum. As a result, thiophene adsorption amount on Cu—X after 450° C. auto-reduction was considerably smaller than that on Cu—Y (Isotherms were not shown). To alleviate the destruction of Cu—X structure, the heating rate to 450° C. was reduced to 0.5° C./min and 2° C./min (instead of 10° C./min), but little improvement was observed. Although the reason for poor stability is not clear yet, copper cations were responsible for this phenomenon, because Ag—X, which will be discussed next, did not show any degradation of pore structure. It was reported that Nickel exchanged A-zeolite was unstable and lost its crystal structure at a temperature above 70° C. See Breck. D. W., *Zeolite Molecular Sieves: Structure, Chemistry and Use*; Wiley: New York (1974). The thermal instability of nickel exchanged A-zeolite was interpreted in terms of a ligand-field effect. After dehydration octahedral coordination for the nickel cation is not favored in the zeolite structure. A similar phenomenon might be occurred in copper exchanged X-zeolite.

Figure 8:
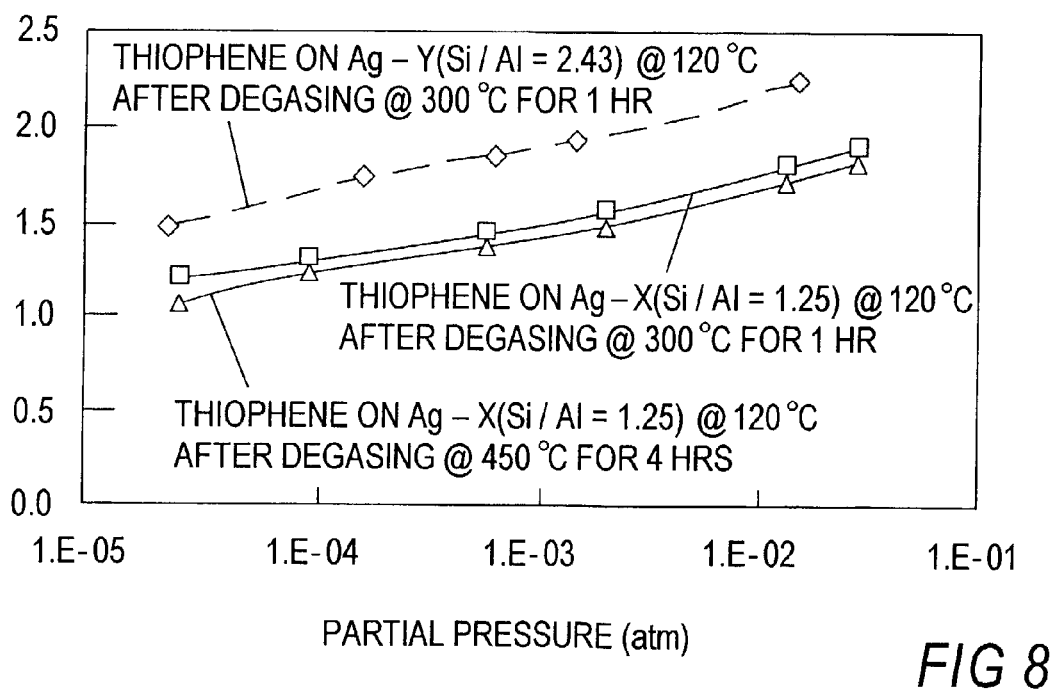
FIG. 8 is a graph depicting pure component equilibrium isotherms of thiophene on Ag—X (Si/Al=1.25) and Ag—Y (Si/Al=2.43) at 120° C.

Ag—X. Thiophene adsorption performance on Ag—X was also examined to understand the effect of additional Ag⁺ at SIII sites. Thiophene adsorption amounts on Ag—Y and Ag—X at 120° C. were compared in FIG. 8. Contrary to our expectation, Ag—X adsorbed less thiophene than Ag—Y on a per weight basis. However, since Ag—Y and Ag—X have different densities due to their different compositions, the adsorption amounts of thiophene were nearly the same based on per unit cell of faujasite (i.e., about 25 thiophene molecules/u.c. at 2.3×10⁻⁵ atm and 36–40 thiophene molecules/u.c at 1.8×10⁻² atm for both Ag—Y and Ag—X). The reason for the ineffectiveness of extra Ag⁺ at SIII site in Ag—X is not known. The thiophene adsorption amounts were also examined from the viewpoint of zeolite pore volume and liquid thiophene volume. The molar density of liquid thiophene is calculated to be 83 cc/mol at 120° C. See Doong, S. J.; Yang, R. T., "A Simple Potential-Theory Model for Predicting Mixed-Gas Adsorption," *Ind. Eng. Chem. Res.* (1988), 27, 630. 1.5 mmol thiophene adsorbed per gram of Ag—Y at 2.3×10⁻⁵ atm corresponded to 0.125 cc liquid thiophene per gram of Ag—Y. The thiophene liquid volume of 0.125 cc was nearly one half of pore volume of Ag—Y (0.24 cc/g as shown in FIG. 4), suggesting that one half of the pore was filled with thiophene. Therefore, it does seem likely that the cavity of Ag—X was filled with thiophene even at 2.3×10⁻⁵ atm and only a small amount could be further adsorbed at higher pressures. One possible reason for the relatively low amounts in Ag—X is that thiophene molecules adsorbed could be located at positions near more than one silver cations at both SII and SIII sites simultaneously, so that no improvement in adsorbed amount was observed.

Silver in Ag—X is known to form silver cluster at elevated temperature. See Sun, T. and K. Seff, "Silver Clusters and Chemistry in Zeolites," *Chem. Rev.* (1994), 94, 857. Hutson et al. showed that nitrogen adsorption capacity on Ag ion-exchanged low-silica X-zeolite (Si/Al=1) was enhanced by heating in vacuum at 450° C. for more than 4 hours. This enhancement was explained by thermally induced Ag cation and/or cluster migration using Rietvelt refinement of neutron powder diffraction data. The thiophene adsorption isotherm on Ag—X(Si/Al=1.25) after 450° C. for 4 hours is also shown in FIG. 5. No enhancement was observed for thiophene adsorption on Ag—X(Si/Al=1.25).

Figure 9:
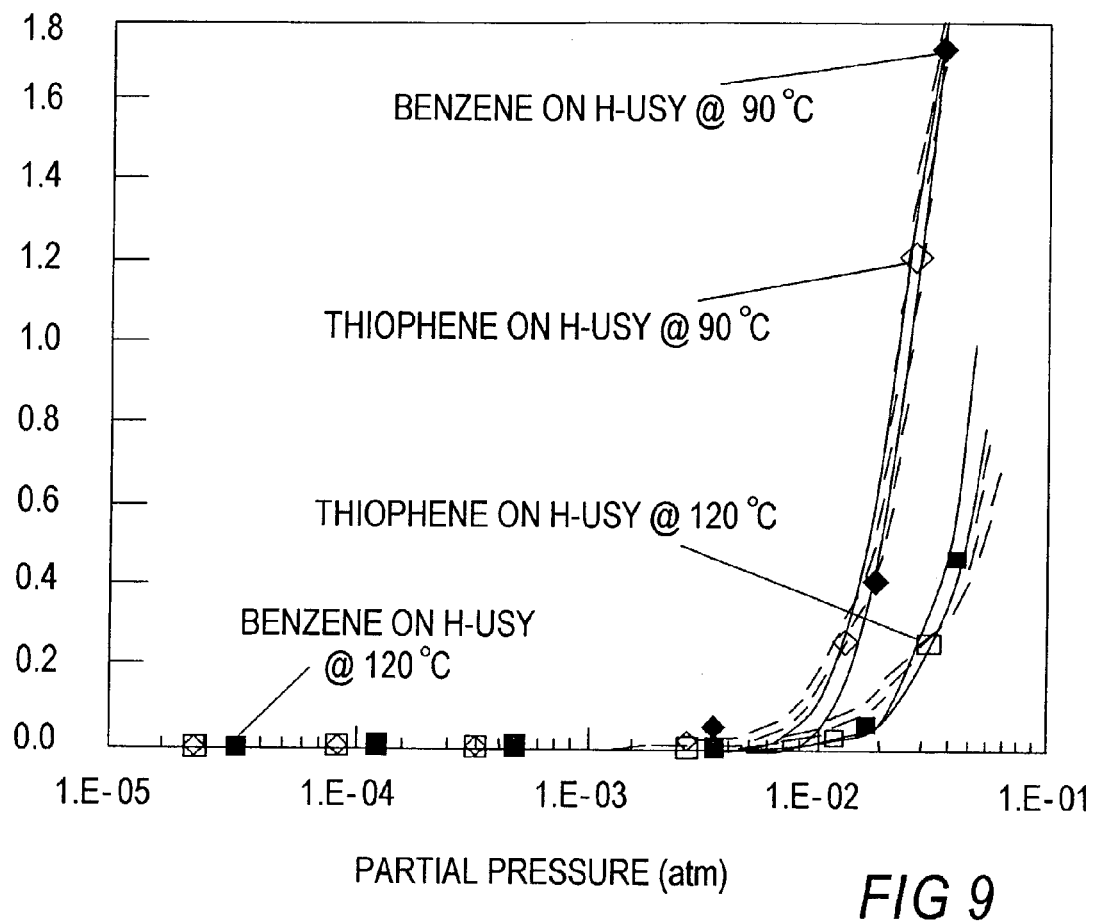
FIG. 9 is a graph depicting pure component equilibrium isotherms of benzene and thiophene on H-USY (Si/Al=195) at 90° C. and 120° C.; curves are fitted with Dubinin-Astakhov (solid line) and Langmuir-Freundlich (dotted line) isotherms.

H-USY. Thiophene and benzene isotherms on H-USY(Si/Al=195) are shown in FIG. 9. The interaction between thiophene/benzene and high-silica H-USY was very weak. Neither thiophene nor benzene was adsorbed at pressures lower than $1\times10^{-3}$ atm. Adsorbed amounts were substantially smaller than Na—Y even at $2\times10^{-2}$ atm. These results are clearly due to the strong interactions between the cations in zeolite and the thiophene or benzene molecule.

Figure 10:
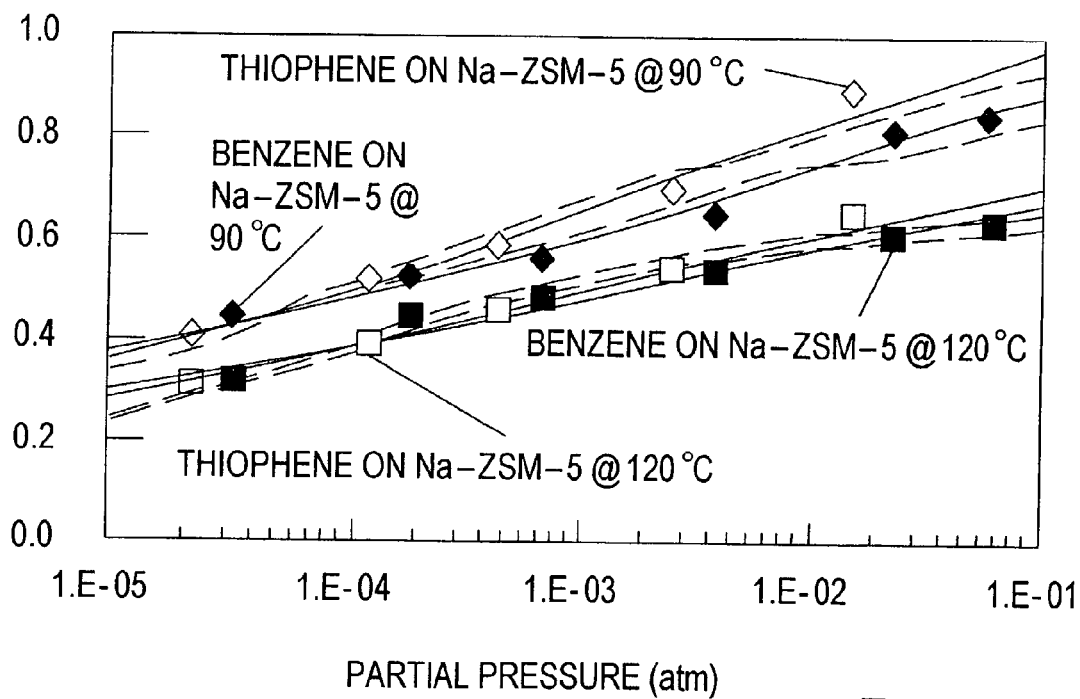
FIG. 10 is a graph depicting pure component equilibrium isotherms of benzene and thiophene on Na-ZSM-5 (Si/Al=10) at 90° C. and 120° C.; curves are fitted with Dubinin-Astakhov (solid line) and Langmuir-Freundlich (dotted line) isotherms.

Na-ZSM-5. As stated above, several groups used Na-ZSM-5 for thiophene/benzene purification and showed that Na-ZSM-5 could remove thiophene impurities from benzene in their fixed bed breakthrough experiments. FIG. 10 shows isotherms on Na-ZSM-5. Although thiophene and benzene isotherms turned out to be virtually the same on Na-ZSM-5, it may be important to note that thiophene isotherms were fairly flat over the pressure range in the application of purification. This small difference of adsorbed amounts at $3\times10^{-5}$ atm and $2\times10^{-2}$ atm was preferable for the purification of benzene by removal of thiophene, which will be discussed below. One disadvantage of Na-ZSM-5 was small adsorption capacity owing to the small pore volume, as clearly seen in FIG. 4.

Figure 11:
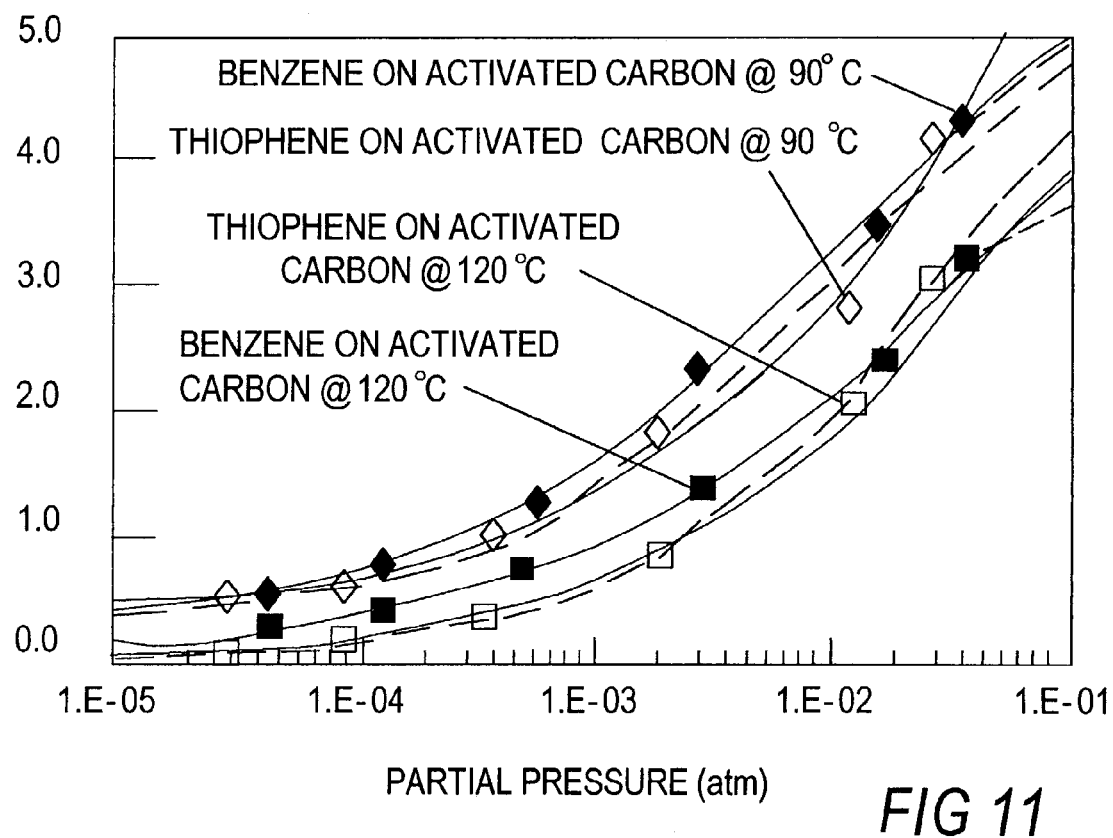
FIG. 11 is a graph depicting pure component equilibrium isotherms of benzene and thiophene on activated carbon (Type PCB) at 90° C. and 120° C.; curves are fitted with Dubinin-Astakhov (solid line) and Langmuir-Freundlich (dotted line) isotherms.
Figure 12:
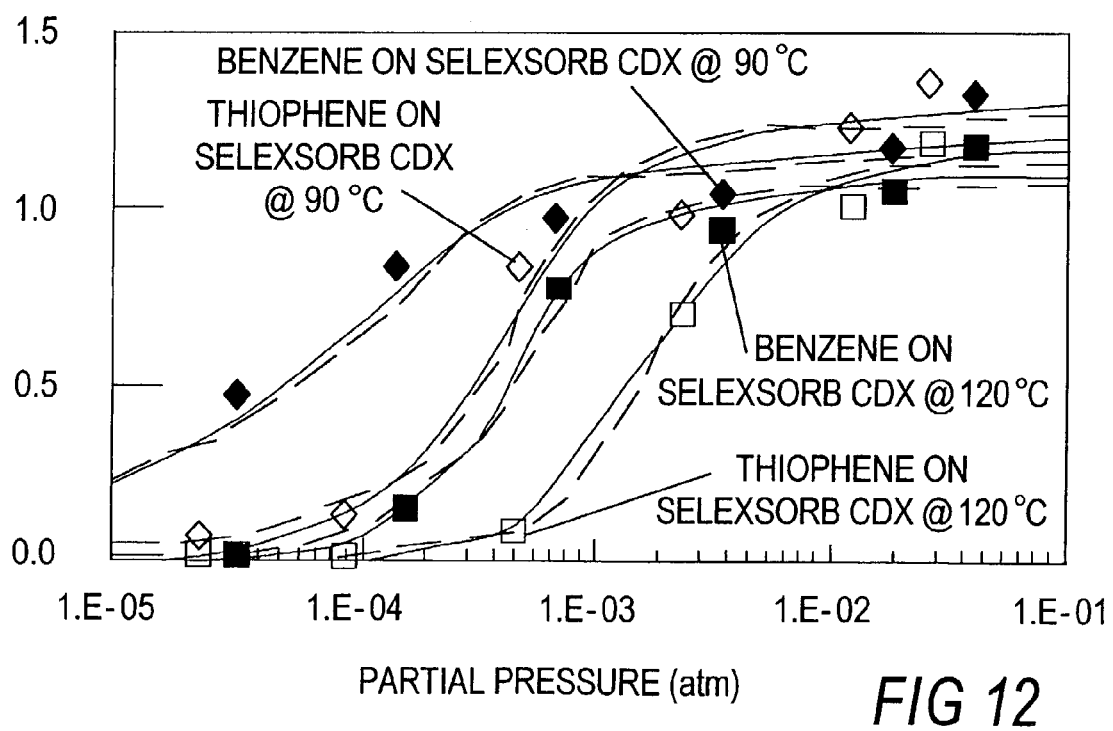
FIG. 12 is a graph depicting pure component equilibrium isotherms of benzene and thiophene on modified activated alumina (Selexsorb CDX) at 90° C. and 120° C.; curves are fitted with Dubinin-Astakhov (solid line) and Langmuir-Freundlich (dotted line) isotherms.

Activated carbon and modified activated alumina. The thiophene and benzene adsorption isotherms on activated carbon (Type PCB) and modified activated alumina (Selexsorb CDX) are shown in FIG. 11 and FIG. 12. PCB activated carbon is commercially designated for use in liquid phase or vapor phase applications such as recovery of alcohols, chlorinated hydrocarbons, hydrocarbons and aromatics. Selexsorb CDX is specially formulated by Alcoa Industrial Chemicals for adsorption of polar organic compounds including sulfur-based molecules (mercaptans, sulfides, disulfides, thiophenes), nitrogen-based molecules (nitriles, amines, pyridines) and oxygenated hydrocarbon molecules (alcohol, glycols, aldehydes, ketons, ethers, peroxides). More benzene than thiophene was adsorbed on both activated carbon and modified activated alumina at pressures below $1\times10^{-2}$ atm. This is surprising because Selexsorb was thought to adsorb thiophene more selectively than benzene. This result indicates that polarizability may play a more important role (than permanent dipole moment and magnetic susceptibility) in adsorption on these two sorbents. At pressures higher than $1\times10^{-2}$ atm, pore filling dominated hence benzene adsorbed less than thiophene because of the larger molar volume of benzene than thiophene.

Comparison of thiophene adsorption on all sorbents. Thiophene adsorption isotherms on all sorbents are compared in FIG. 13. It is clearly seen that Ag—Y and Cu—Y could adsorb significantly larger amounts of thiophene even at very low pressures.

Purification Capability

For purification, as has been shown for the removal of ppm levels of dienes from olefins, an important consideration is the separation factor; and the separation factor should be evaluated at low concentrations of the solute but at high concentrations of the solvent. In other words, the capacity for the dilute solute (at ppm level) is a factor that determines the purification. As stated above, the separation factor ($\alpha$) is given by:

$$\alpha_{12}=X_1Y_2/(X_2Y_1) \quad (3)$$

where X and Y are mole fractions in the adsorbed and fluid phases, respectively. In our case, component 1 is thiophene and component 2 is benzene. A further important parameter is the capacity of the sorbent for the solute at low concentrations. Hence, the ability of the sorbent for purification depends on the amount of thiophene adsorbed at the ppm levels.

To estimate the adsorption amount in the mixture of thiophene and benzene, the pure-component adsorption data were first fitted by both D-A (Dubinin-Astakhov) and L-F (Langmuir-Freundlich) isotherms. The separation factors of thiophene over benzene were then obtained using the equivalent multi-component isotherms, as described previously. The conversion of molar adsorbed amount to volumetric adsorbed amount and vice versa were performed in the same way as Doong and Yang. The molar volumes of thiophene in this work were 79.7 cc/mol at 90° C., 83.0 cc/mol at 120° C. and 89.8 cc/mol at 180° C., and those of benzene were 90.5 cc/mol at 90° C., 94.6 cc/mol at 120° C. and 102.9 cc/mol at 180° C. The adsorbed molar volumes were assumed to be the same in both single- and mixed-gas adsorption. Separation factors were calculated for two cases: $1\times10^{-4}$ atm thiophene/1 atm benzene and $1\times10^5$ atm thiophene/1 atm benzene.

The parameters for the D-A and L-F equations are given in Table 8 and the resulting separation factors are listed in Table 9. Some of the D-A parameters were not applicable for the Doong/Yang model for mixtures, when the volumetric adsorbed amount of benzene was much higher than that of thiophene. The separation factors of thiophene over benzene follow the order: Ag—Y>Na-ZSM-5>Cu—Y activated carbon>>Na—Y>>H-USY≅modified activated alumina. This order can be explained as follows. As described earlier, the ability of the sorbent for purification depends on the amount of thiophene adsorbed at the ppm levels, compared with the amount of benzene adsorbed at high concentration. Ag—Y and Na-ZSM-5 showed fairly flat isotherms of thiophene over the entire partial pressure range, resulting in the higher separation factors. In fact, Ag—Y and Na-ZSM-5 maintained 65% and 47% of thiophene adsorption amounts at $2.3\times10^{-5}$ atm compared with those at $1.3\times10^{-2}$ atm, respectively. The advantage of Ag—Y against Na-ZSM-5 was further enhanced by the fact that Ag—Y was slightly selective for thiophene than benzene, while thiophene/benzene isotherms on Na-ZSM-5 were virtually the same. On the other hand, Cu—Y and activated carbon could adsorb a certain amount of thiophene/benzene, but smaller adsorption amounts at lower pressures reduced the separation factors considerably. Only 18% and 5% of thiophene adsorption amounts were retained by Cu—Y and activated carbon between $2.5\times10^{-5}$ atm and $1.3\times10^{-2}$ atm, respectively. Larger adsorption amounts of benzene than thiophene by Selexsorb CDX made the separation factor of this sorbent extremely low.

TABLE 8

Parameters for the D-A and L-F Equations

| | | | L-F Equation | | | D-A Equation | | | | |
|---|---|---|---|---|---|---|---|---|---|---|
| | | | qo (mmol/g) | B (1/atm) | n (-) | qo (mmol/g) | Vo (cc/g) | C (-) | n (-) | Ps (atm) |
| Ag—Y | Benzene | 120° C. | 3.133 | 3.40 | 7.67 | 2.416 | 0.2286 | 0.0559 | 1.56 | 2.96 |
| | | 180° C. | 2.032 | 155.5 | 1.85 | 2.008 | 0.2066 | 0.0786 | 4.57 | 10.07 |
| | Thiophene | 120° C. | 3.200 | 4.416 | 6.59 | 2.986 | 0.248 | 0.0609 | 1.12 | 2.68 |
| | | 180° C. | 2.602 | 6.13 | 4.77 | 2.329 | 0.2091 | 0.0699 | 1.87 | 9.42 |
| Cu—Y | Benzene | 90° C. | 2.989 | 292.6 | 1.76 | 2.940 | 0.266 | 0.0889 | 4.36 | 1.34 |
| | | 120° C. | 2.897 | 178.6 | 1.59 | 2.929 | 0.2771 | 0.1008 | 3.95 | 2.96 |
| | Thiophene | 90° C. | 3.910 | 196.4 | 1.80 | 3.826 | 0.3048 | 0.0935 | 3.99 | 1.19 |
| | | 120° C. | 3.548 | 121.5 | 1.65 | 3.548 | 0.2946 | 0.1010 | 3.81 | 2.68 |
| Na—Y | Benzene | 120° C. | 2.781 | 13985 | 0.89 | 2.789 | 0.2639 | 0.0980 | 6.80 | 2.96 |
| | | 180° C. | 2.820 | 449.0 | 0.90 | 2.872 | 0.2956 | 0.1200 | 4.73 | 10.07 |
| | Thiophene | 120° C. | 2.681 | 13548 | 0.84 | 2.658 | 0.2207 | 0.1050 | 7.30 | 2.68 |
| | | 180° C. | 2.739 | 15001 | 0.50 | 2.846 | 0.2555 | 0.1330 | 7.54 | 9.42 |
| PCB—AC | Benzene | 90° C. | 7.828 | 4.47 | 2.46 | 6.329 | 0.5725 | 0.1638 | 1.71 | 1.34 |
| | | 120° C. | 6.312 | 4.254 | 2.16 | 6.197 | 0.5863 | 0.1847 | 1.62 | 2.96 |
| | Thiophene | 90° C. | 7.231 | 5.54 | 2.29 | 8.936 | 0.7118 | 0.2246 | 1.24 | 1.19 |
| | | 120° C. | 6.996 | 6.39 | 1.66 | 7.236 | 0.6009 | 0.2193 | 1.59 | 2.68 |
| Na—ZSM5 | Benzene | 90° C. | 0.928 | 17.15 | 3.43 | 0.987 | 0.0893 | 0.0810 | 1.44 | 1.34 |
| | | 120° C. | 0.795 | 14.66 | 3.47 | 0.826 | 0.0781 | 0.0793 | 1.64 | 2.96 |
| | Thiophene | 90° C. | 1.023 | 16.91 | 3.27 | 1.036 | 0.0825 | 0.0880 | 1.79 | 1.19 |
| | | 120° C. | 0.811 | 16.36 | 3.30 | 0.856 | 0.0711 | 0.0832 | 1.70 | 2.68 |
| Selexsorb CDX | Benzene | 90° C. | 1.182 | 1196.6 | 1.39 | 1.176 | 0.1064 | 0.0914 | 5.23 | 1.34 |
| | | 120° C. | 1.096 | 75902 | 0.71 | 1.109 | 0.1049 | 0.1049 | 8.14 | 2.96 |
| | Thiophene | 90° C. | 1.223 | 29720 | 0.79 | 1.239 | 0.0987 | 0.1141 | 6.78 | 1.19 |
| | | 120° C. | 1.134 | 133016 | 0.55 | 1.158 | 0.0962 | 0.1265 | 8.20 | 2.68 |
| H—USY | Benzene | 90° C. | 4.258 | 568.1 | 0.48 | 4.359 | 0.3943 | 0.2800 | 4.21 | 1.34 |
| | | 120° C. | 3.895 | 63.573 | 0.53 | 4.100 | 0.3879 | 0.2825 | 3.63 | 2.96 |
| | Thiophene | 90° C. | 4.568 | 382.1 | 0.51 | 4.689 | 0.3735 | 0.2939 | 3.55 | 1.19 |
| | | 120° C. | 4.356 | 24.41 | 0.61 | 4.599 | 0.3819 | 0.2820 | 4.07 | 2.68 |

TABLE 9

Separation Factors estimated by the D-A and L-F Equations at 120° C.

| Thiophene (atm)/ | L-F Equation | | D-A Equation | |
|---|---|---|---|---|
| Benzene (atm) | 1E-4/1 | 1E-5/1 | 1E-4/1 | 1E-5/1 |
| Ag—Y | 3300 | 23000 | 1600 | 11000 |
| Cu—Y | 31 | 78 | 360 | 700 |
| Na—Y | 0.16 | 0.10 | *** 1) | *** 1) |
| PCB—AC | 64 | 160 | 33 | 83 |
| Na—ZSM5 | 700 | 3500 | *** 1) | *** 1) |
| Selexsorb CDX | 9.6E-04 | 1.5E-04 | *** 1) | *** 1) |
| H—USY | 1.2E-03 | 2.7E-04 | *** 1) | *** 1) |

1) Not application to Doong/Yang extension.

Figure 13:
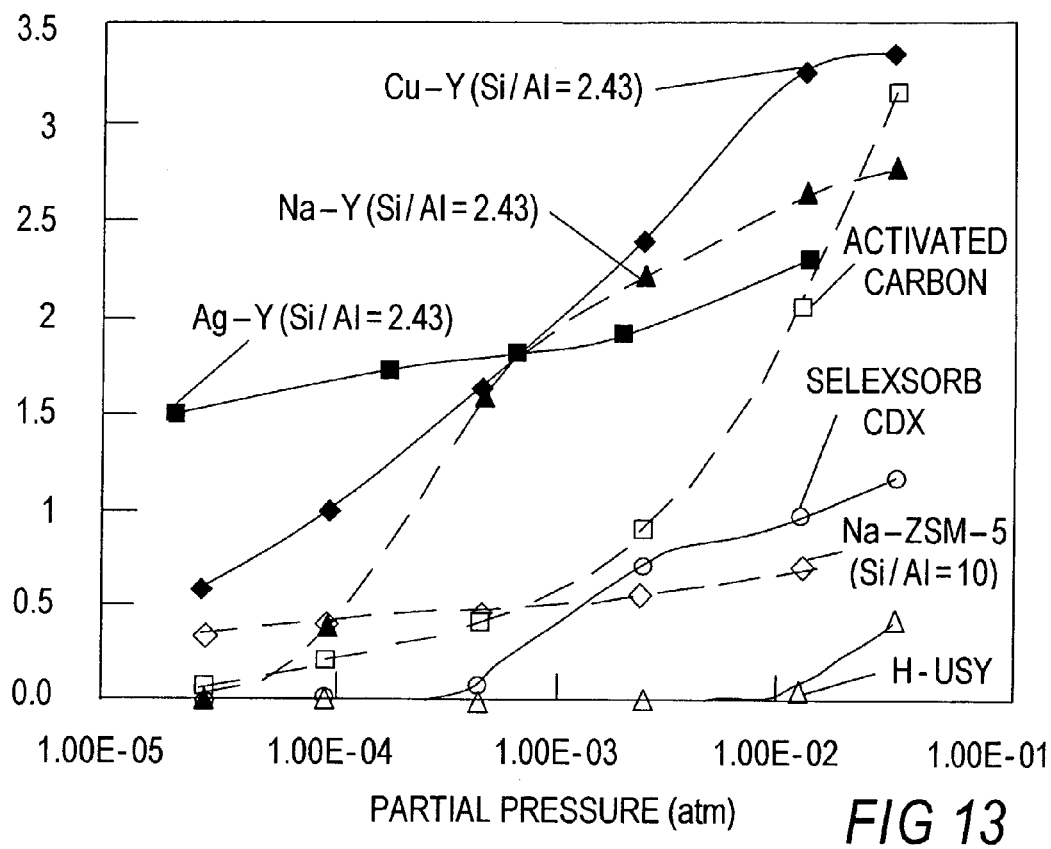
FIG. 13 is a graph comparing equilibrium adsorption isotherms of thiophene at 120° C.
Figure 14:
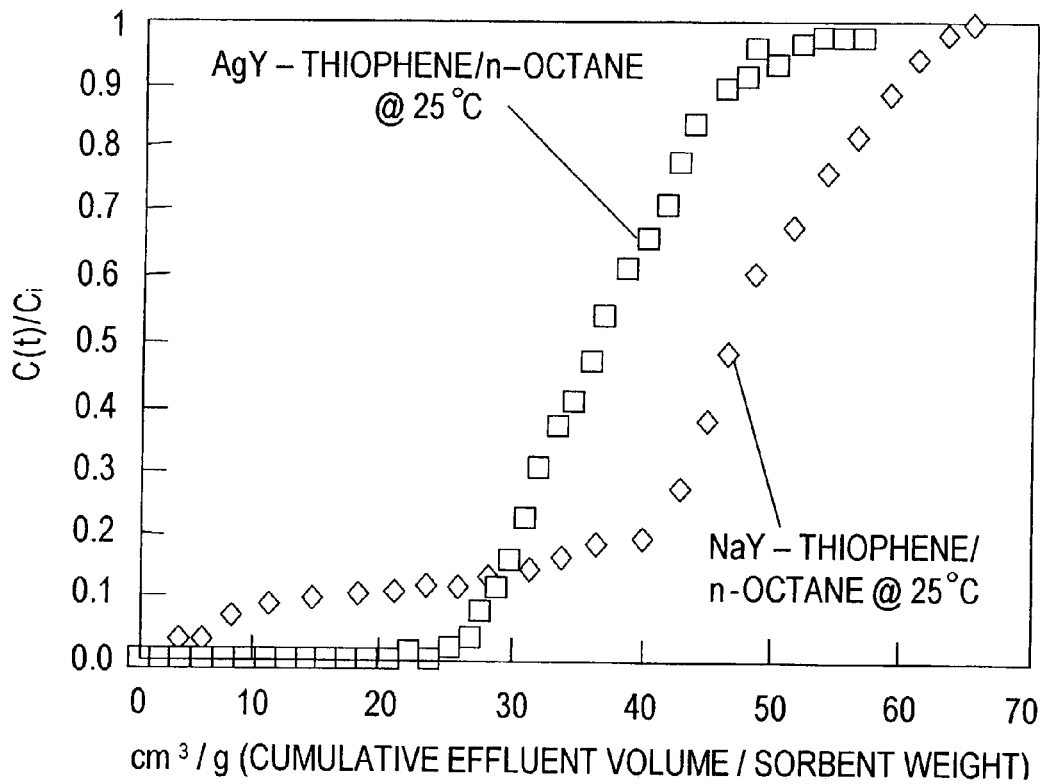
FIGS. 14–21 are graphs depicting various breakthrough curves.
Figure 15:
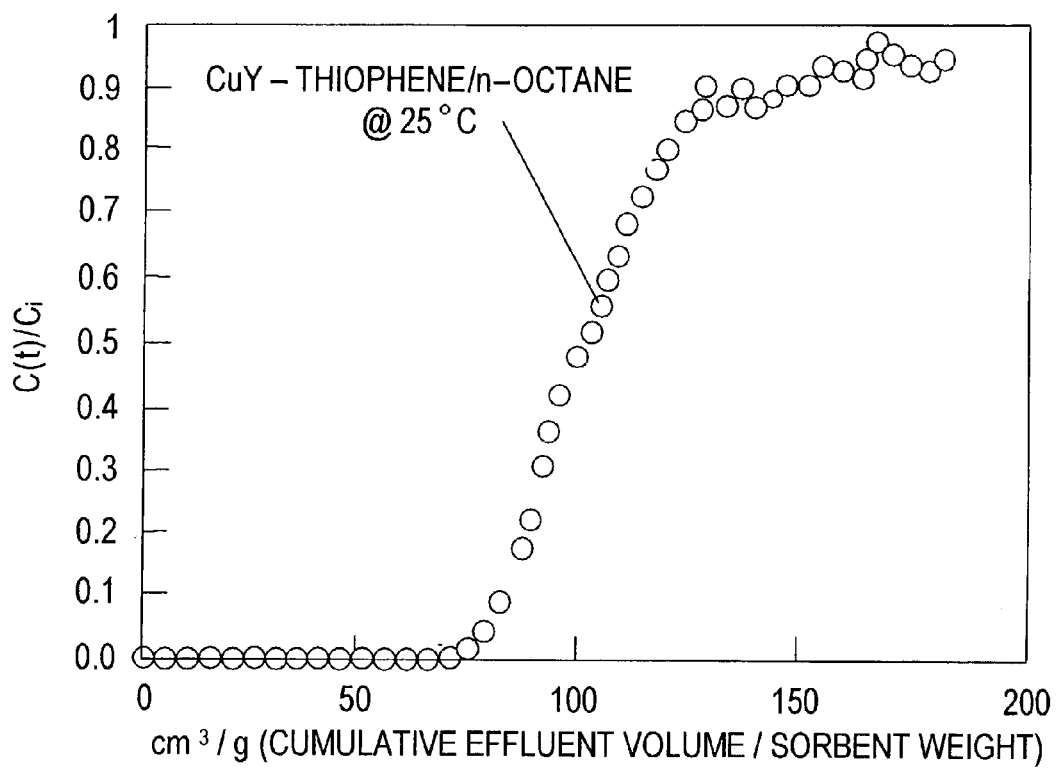
Figure 16:
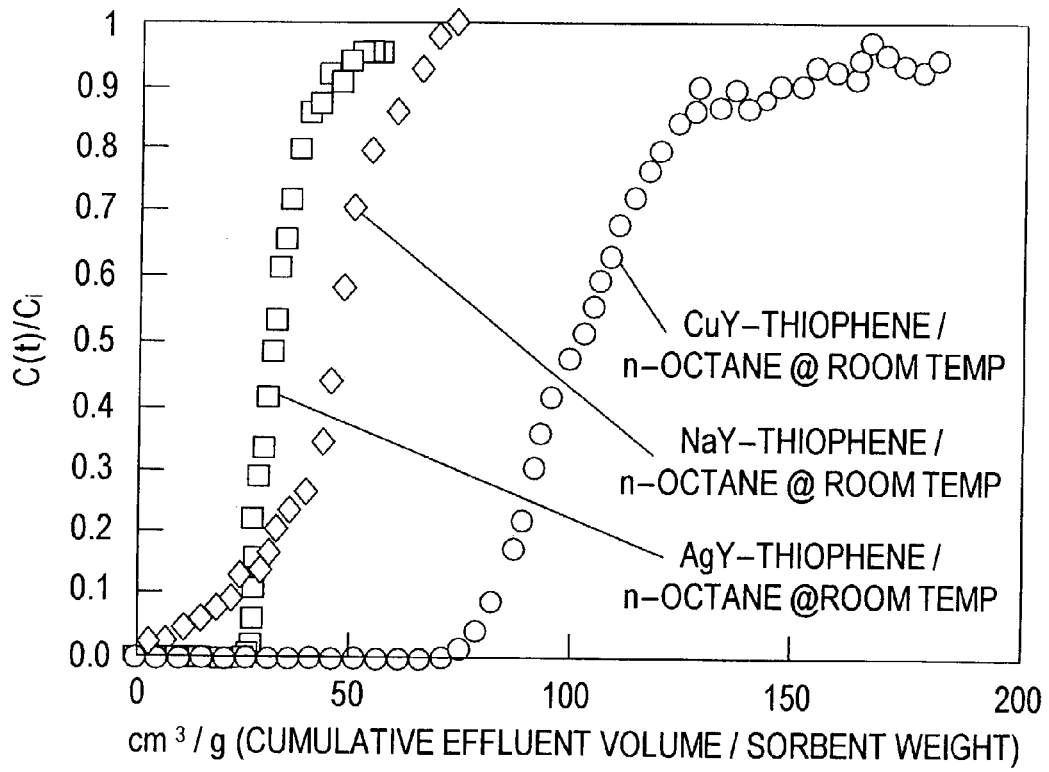
Figure 17:
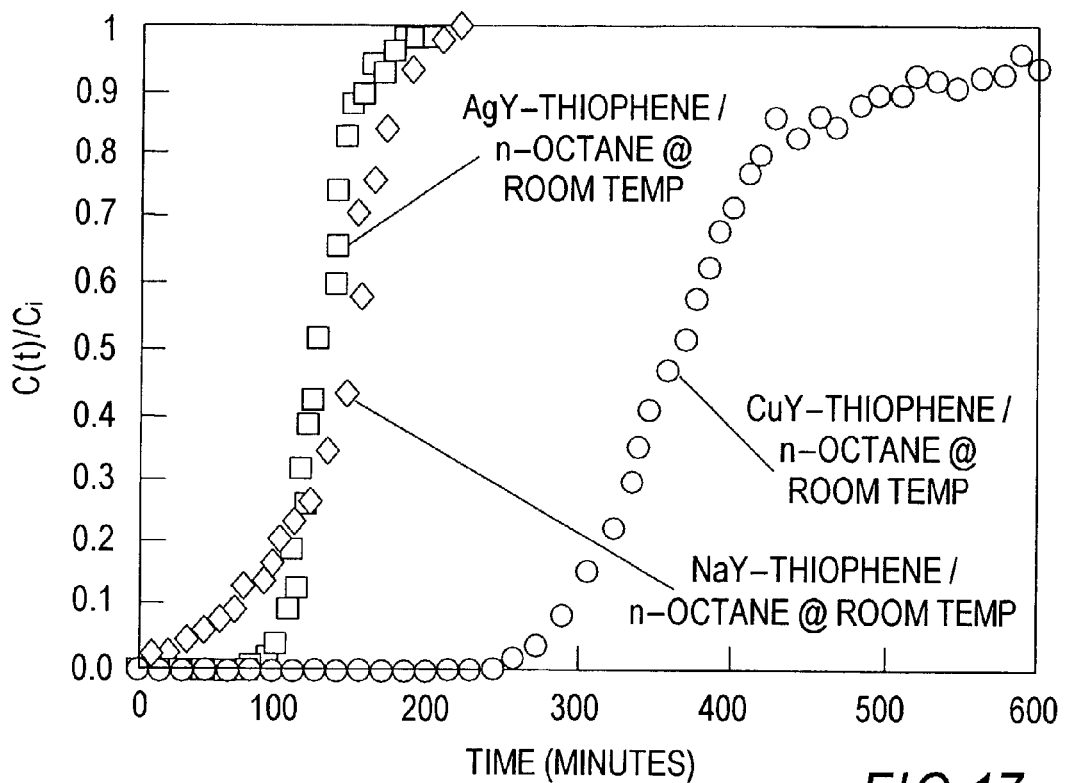
Figure 18:
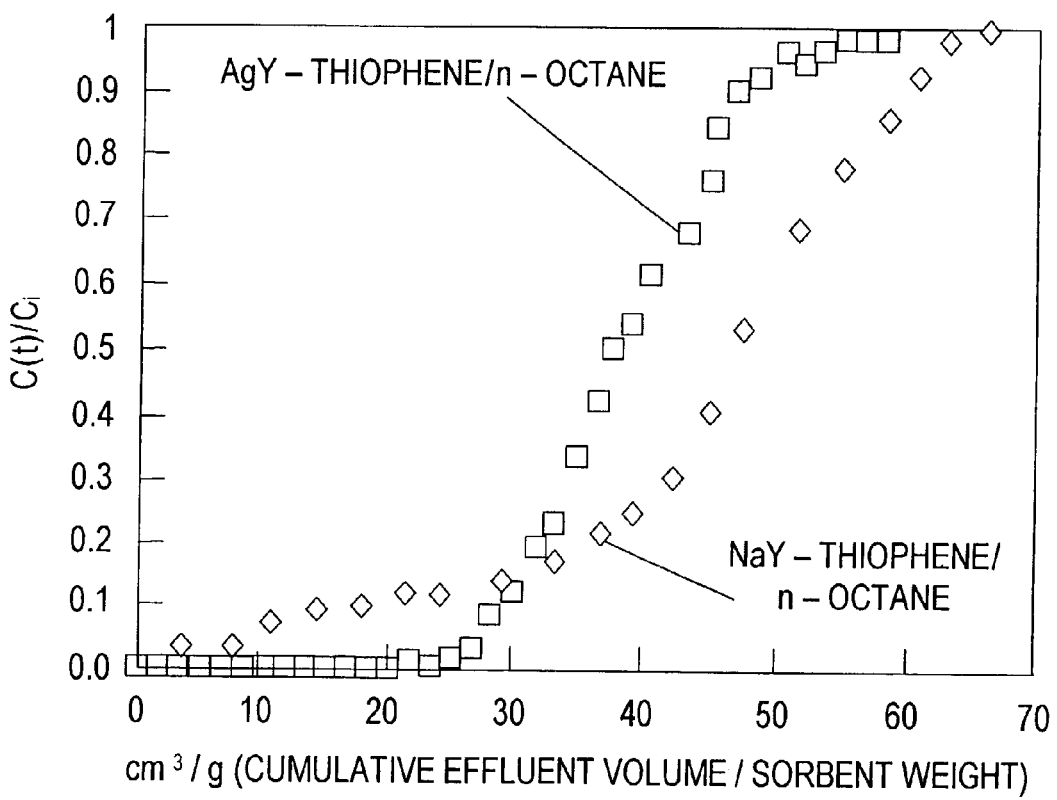
Figure 19:
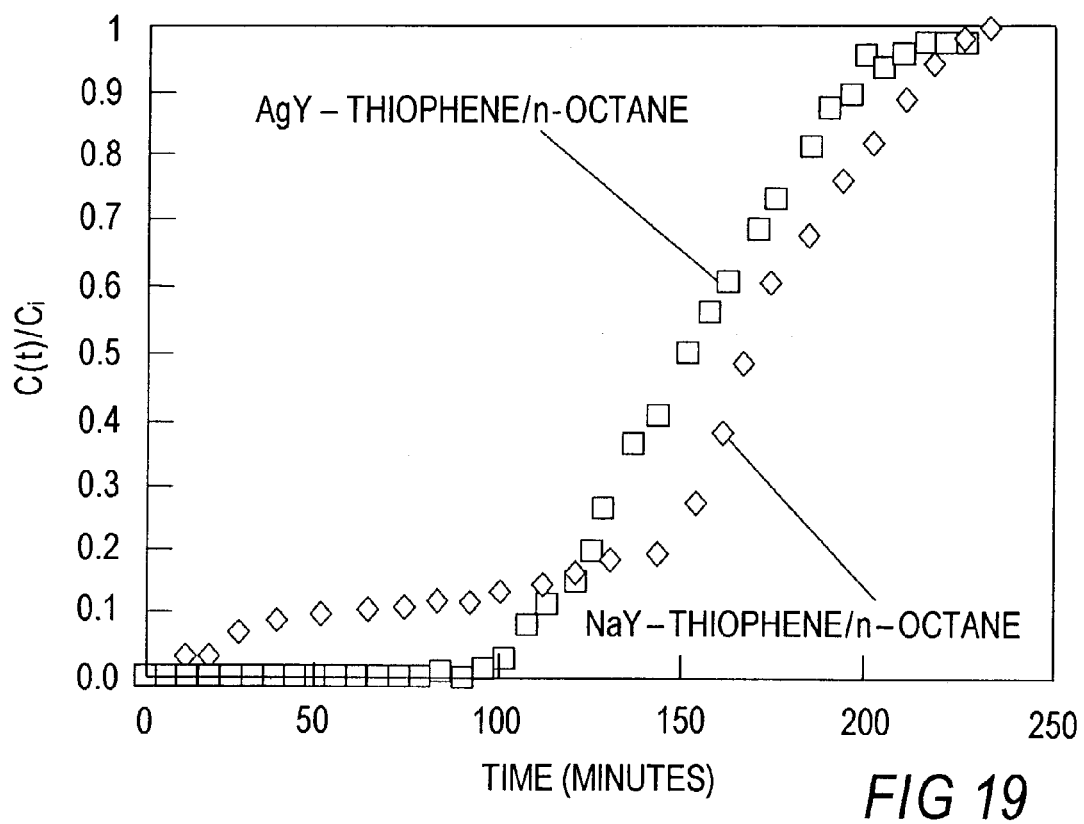
Figure 20:
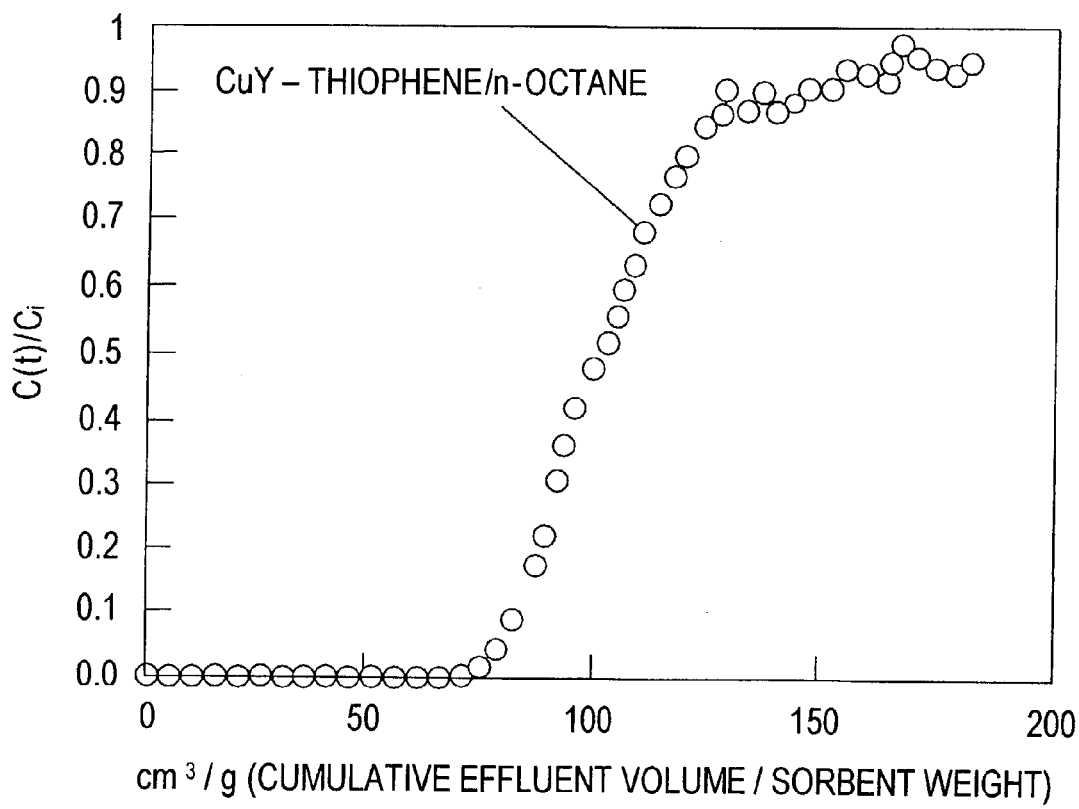
Figure 21:
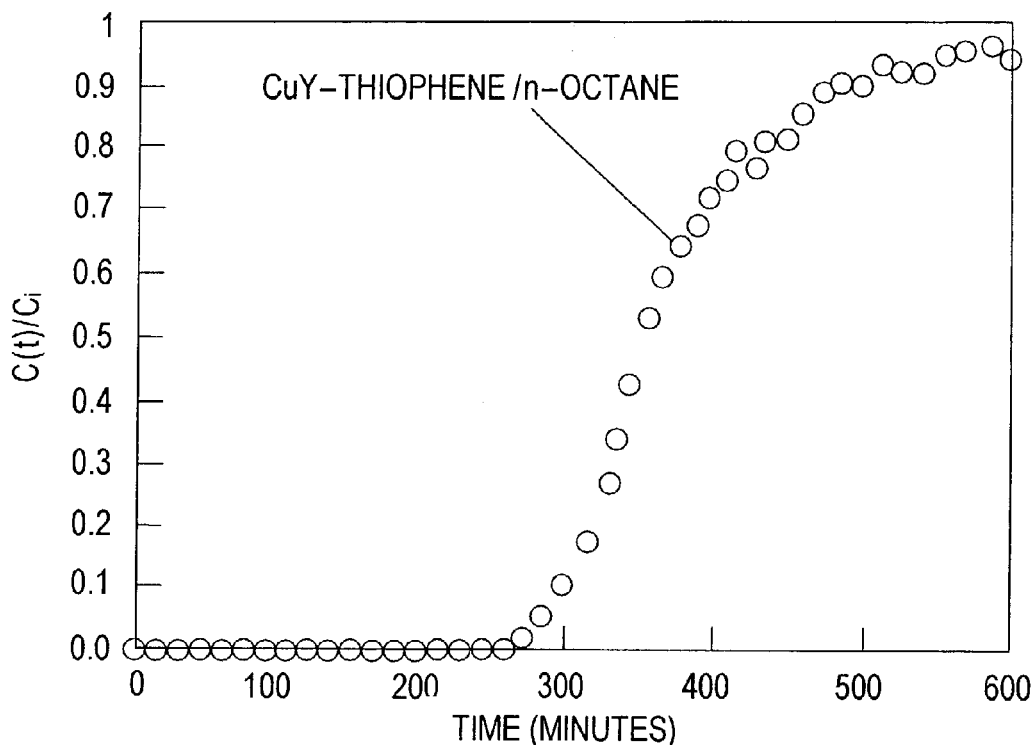
Figure 22:
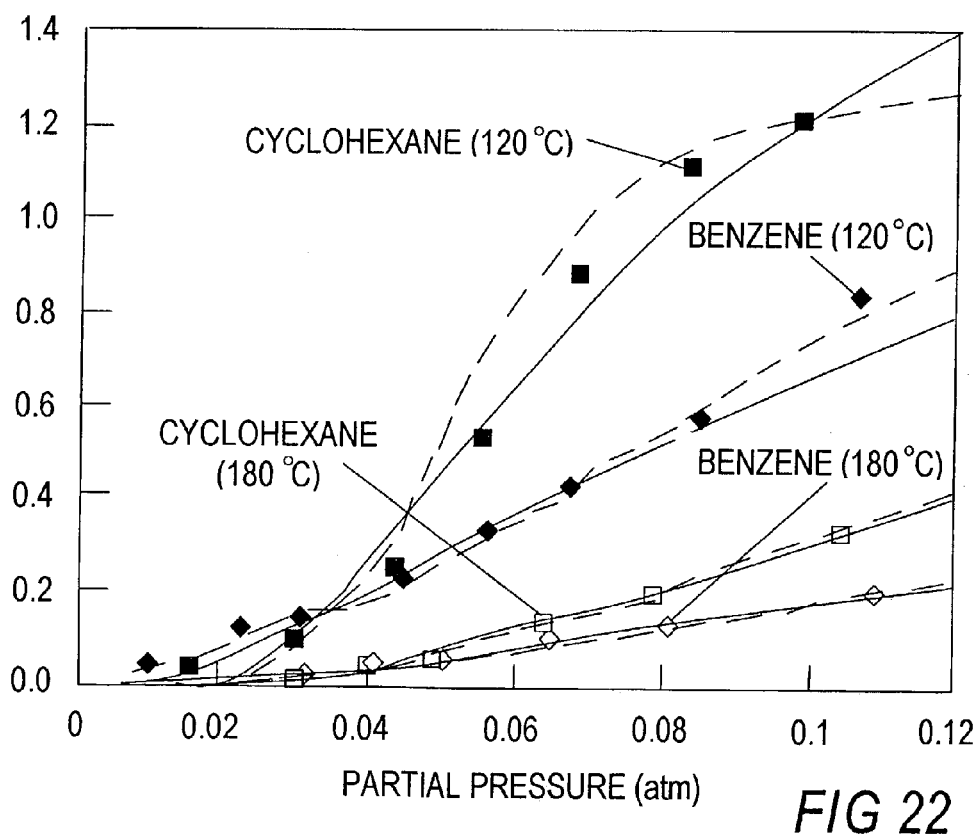
FIG. 22 is a graph depicting pure component equilibrium isotherms for benzene and cyclohexane adsorption on H-USY at 120 and 180° C.; curves are fitted with Dubinin-Astakhov (solid lines) and Langmuir-Freundlich (dotted lines) isotherms.
Figure 23:
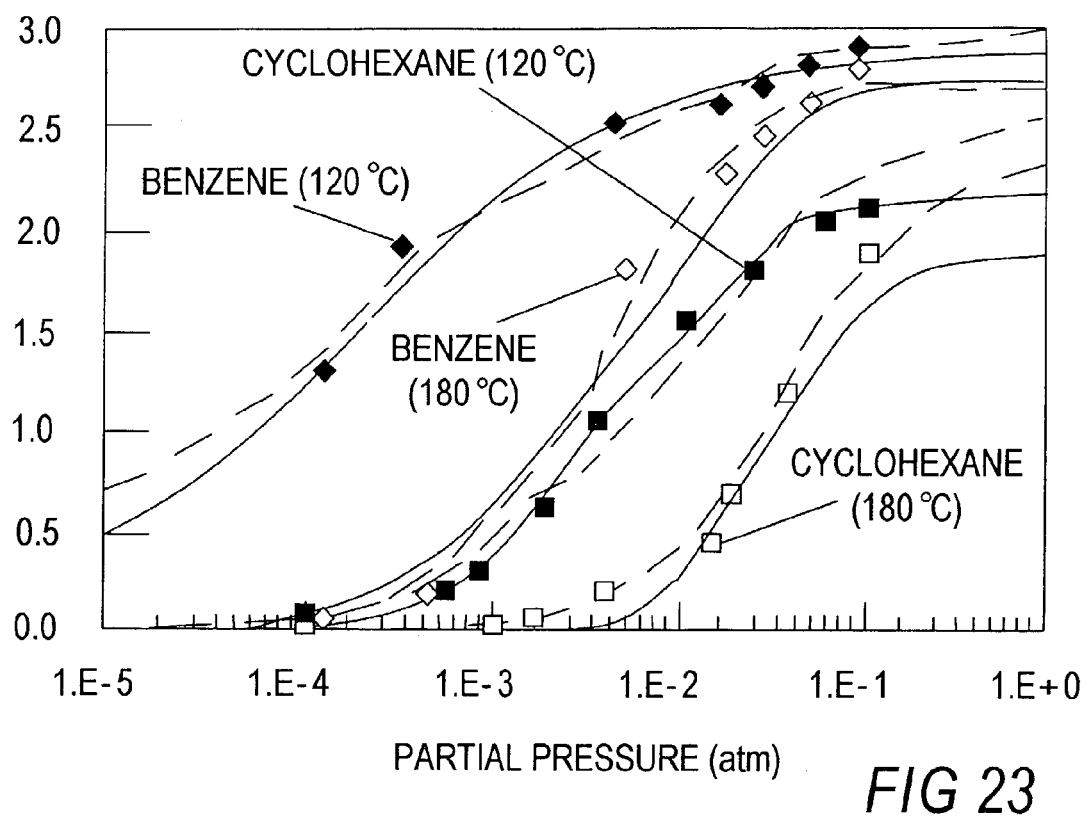
FIG. 23 is a graph depicting pure component equilibrium isotherms for benzene and cyclohexane adsorption on Na—Y at 120 and 180° C.; curves are fitted with Dubinin-Astakhov (solid lines) and Langmuir-Freundlich (dotted lines) isotherms.
Figure 24:
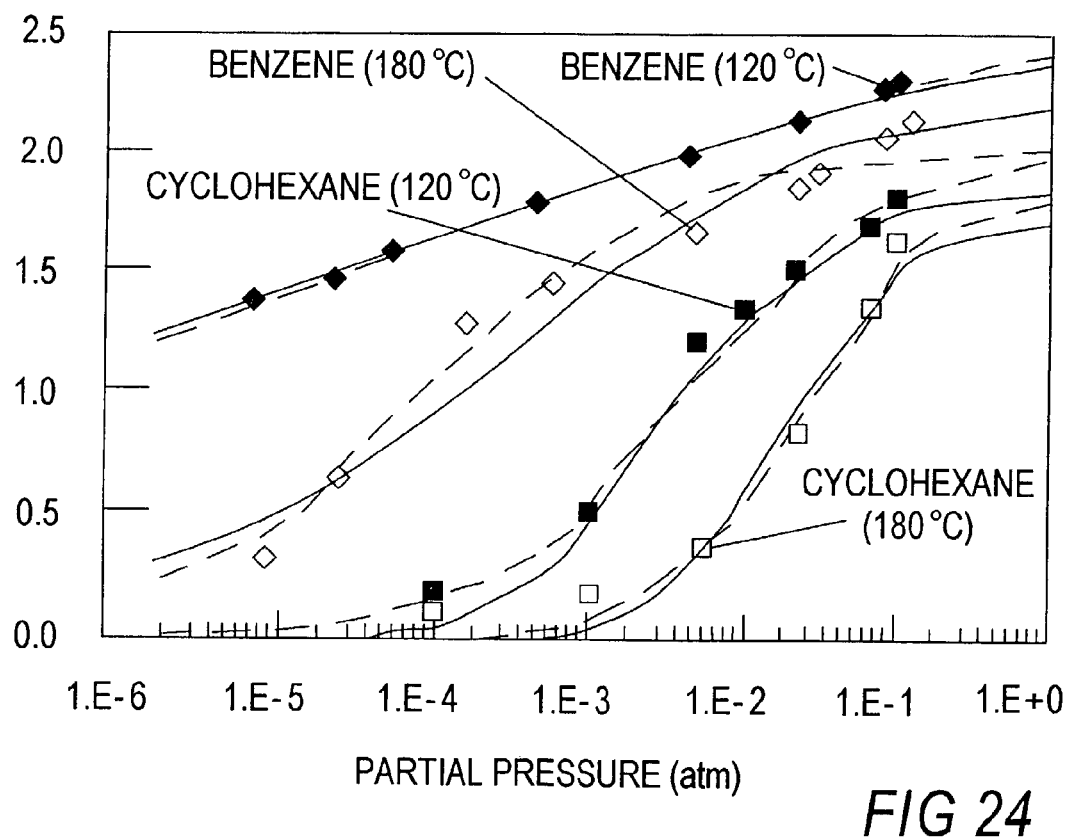
FIG. 24 is a graph depicting pure component equilibrium isotherms for benzene and cyclohexane adsorption on Ag—Y at 120 and 180° C.; curves are fitted with Dubinin-Astakhov (solid lines) and Langmuir-Freundlich (dotted lines) isotherms.
Figure 25:
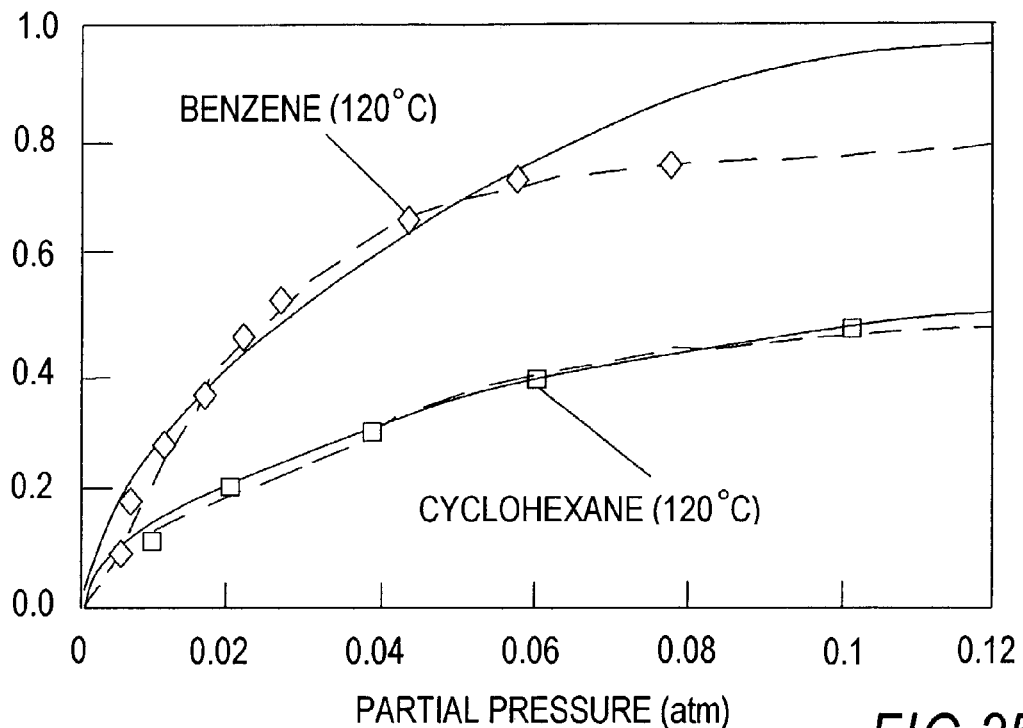
FIG. 25 is a graph depicting pure component equilibrium isotherms for benzene and cyclohexane adsorption on Pd—Y at 120° C.; curves are fitted with Dubinin-Astakhov (solid lines) and Langmuir-Freundlich (dotted lines) isotherms.

Another important parameter for purification is the sorbent capacity for the solute at very low concentrations, i.e., for thiophene at ppm levels. The sorbent capacities are shown in FIG. 13. At $2.3 \times 10^{-5}$ atm, the capacities for thiophene follow the order: Ag—Y & Cu—Y>>Na-ZSM-5>activated carbon>Na—Y>modified alumina & H-USY. Based on these two key parameters, the π-complexation sorbents are clearly the best.

Heat of Adsorption

Heats of adsorption were calculated using the Clausius-Clapeyron equation from isotherms at two different temperatures, and are shown in Table 10. All the heats of thiophene/benzene adsorption had the tendency to decrease as the loading increased. This is a common phenomenon for the sorbents such as ion-exchanged zeolites that have heterogeneous sites. The heats of adsorption on activated carbon, in particular, ranged widely from 23.9 kcal/mol (at 0.5 mmol/g loading) to 8.0 kcal/mol (at 3 mmol/g). Ag—Y and Cu—Y exhibited the higher heats of adsorption than Na—Y for both benzene and thiophene, it is believed due to π-complexation. More importantly, the heats of adsorption for thiophene were higher than that of benzene. These experimental results can be explained by molecular orbital calculation and NBO analysis, which will be discussed shortly.

At the low loading of 0.5 mmol/g, Na-ZSM-5 showed nearly the same heats of adsorption as Na—Y for both thiophene and benzene. The different pore dimensions (5.2–5.6 Å for ZSM-5 vs. 7.4 Å for Na—Y) apparently had no influence on the heats of adsorption. It is not clear why the amounts adsorbed on Na—Y decreased sharply at very low pressures while that on Na-ZSM-5 maintained.

TABLE 10

Heat of adsorption (kcal/mol) calculated from isotherms at different temperatures.

| | Na—Y (Si/Al = 2.43) | Ag—Y (Si/Al = 2.43) | Cu—Y (Si/Al = 2.43) | H—USY (Si/Al = 195) | Na—ZSM5 (Si/Al = 10) | Activated Carbon Type PCB | Activated Alumina Selexsorb CDX |
|---|---|---|---|---|---|---|---|
| Thiophene | 19.1–19.6 (0.5–2.0) | 21.3–21.5 (1.5–1.7) | 20.8–22.4 (2.0–3.0) | 7.9–11.2 (0.1–0.3) | 18.6–19.2 (0.45–0.60) | 8.0–23.9 (0.5–3.0) | 16.1–17.5 (0.2–1.0) |

TABLE 10-continued

Heat of adsorption (kcal/mol) calculated from isotherms at different temperatures.

| | Na—Y (Si/Al = 2.43) | Ag—Y (Si/Al = 2.43) | Cu—Y (Si/Al = 2.43) | H—USY (Si/Al = 195) | Na—ZSM5 (Si/Al = 10) | Activated Carbon Type PCB | Activated Alumina Selexsorb CDX |
|---|---|---|---|---|---|---|---|
| Benzene | 17.0–18.2 (1.5–2.0) | 19.0–20.1 (1.5–1.8) | 19.3–21.8 (1.8–2.5) | 6.6–13.1 (0.1–0.5) | 16.5–17.9 (0.45–0.65) | 13.1–16.1 (1.0–3.0) | 16.8–19.6 (0.6–1.0) |

*)Numbers in parentheses indicate the adsorption amounts (mmol/g) for calculation.
**)The heats of adsorption decreased with loading in all cases.

Bond Energies, Geometries and NBO Results

The energies of adsorption calculated using equation 1 for thiophene and benzene are summarized in Table 11. The theoretical calculations indicate that the π-complexation strengths follow the order CuZ>AgZ and more importantly, thiophene>benzene. This trend is in agreement with the experimental data, in Table 10. In fact, the molecular orbital results on CuZ and AgZ are in excellent agreement with the experimental data. Both chloride and zeolite models were used as the anion in the theoretical calculations, while only zeolite framework was the anion in the experiment. It is believed that the anion has a large effect on the π-complexation bonds. The bond energies on the zeolites (Z) are significantly higher than that on the chlorides (Table 11). This result indicates that the zeolite anion is more electronegative than the chloride anion, which has been revealed by Chen and Yang in their ab initio molecular orbital calculations. In the optimized structures of thiophene-MCl complexes, the distance between the thiophene molecule and Cu ion is about 0.3 Å shorter than that of thiophene and Ag ion for chloride. The NBO analysis is summarized in Tables 12 and 13. There is some donation of electron charges from the π-orbital of thiophene to the vacant s orbital of metals known as σ donation and, simultaneously, back-donation of electron charges from the d orbitals of metals to π* orbital (i.e., anti-bonding π orbital) of thiophene or π back-donation. It appears that the σ donation is more predominant for thiophene and the π back-donation is more important for benzene. Comparing the two anions, zeolite anion and chloride anion, the NBO results show that both σ donation and d-π* back-donation are significantly stronger with the zeolite anion bonded to $Ag^+$ or $Cu^+$. The charge transfer results again confirmed the experimental data that the relative strengths of the π-complexation bonds follow the order: thiophene>benzene and Cu+>Ag+.

TABLE 11

Summary of energies of adsorption for thiophene and benzene in kcal/mol calculated from molecular orbital theory (Z denotes Zeolite anion)

| | $E_{ads}$ (Thiophene) | $E_{ads}$ (Benzene) |
|---|---|---|
| CuCl | 13.5 | 12.4 |
| AgCl | 9.0 | 8.6 |
| CuZ | 21.4 | 20.5 |
| AgZ | 20.0 | 19.1 |

TABLE 12

Summary of NBO analysis* of π-complexation between thiophene and MCl/MZ

| MX | C → M interaction (σ donation) $q_1$ | M → C interaction (d-π* back-donation) $q_2$ | Net Change $q_1 + q_2$ |
|---|---|---|---|
| CuCl | 0.037 | −0.022 | 0.015 |
| AgCl | 0.022 | −0.014 | 0.008 |
| CuZ | 0.112 | −0.063 | 0.049 |
| AgZ | 0.101 | −0.086 | 0.015 |

*$q_1$ is the amount of electron population change in valence s orbitals of the metal, and $q_2$ is the total amount of electron population decrease in valence d orbitals of the metal.

TABLE 13

Summary of NBO analysis* of π-complexation between benzene and MCl/MZ.

| MX | C → M interaction (σ donation) $q_1$ | M → C interaction (d-π* back-donation) $q_2$ | Net Change $q_1 + q_2$ |
|---|---|---|---|
| CuCl | 0.011 | −0.013 | −0.002 |
| AgCl | 0.003 | −0.007 | −0.004 |
| CuX | 0.078 | −0.119 | −0.041 |
| AgX | 0.043 | −0.045 | −0.002 |

*$q_1$ is the amount of electron population change in valence s orbitals of the metal, and $q_2$ is the total amount of electron population decrease in valence d orbitals of the metal.

Uptake Rates

Table 14 compares diffusion time constants for Ag—Y, Cu—Y and Na—Y. These constants were calculated from the uptake rates using the solution for Fick's law. Uptake rates among the three sorbents were very similar and no notable differences between thiophene and benzene were observed. These rates are reasonably fast for practical applications.

In this experiment, vapor-phase benzene/thiophene adsorption isotherms were investigated to develop new sorbents for desulfurization. Among the sorbents studied, it was found that Cu—Y and Ag—Y exhibited excellent adsorption performance (capacities and separation factors) for desulfurization. This enhanced performance compared to Na—Y is believed to be due to the π-complexation with $Cu^+$ and $Ag^+$. Molecular orbital calculations confirmed the relative strengths of π-complexation: thiophene>benzene and $Cu^+$>$Ag^+$. In an actual desulfurization process, liquid phase adsorptions such as batch adsorption or fixed-bed adsorption column around room temperatures are viable options. Liquid phase experiments are described herein. Even in the case of liquid phase separation, enhanced selectivities based on π-complexation studied in this experiment are applicable.

TABLE 14

Diffusion Time Constants (1/s) of Thiophene and Benzene.

| | Thiophene Pressure Change (atm) | $D/r^2$ (1/s) | Benzene Pressure Change (atm) | $D/r^2$ (1/s) |
|---|---|---|---|---|
| Ag—Y | 1.9E-5–1.6E-4 | 2.0E-05 | 5.7E-5–5.5E-4 | 5.4E-05 |
|  | 5.6E-4–1.8E-3 | 3.3E-04 | 5.5E-4–5.4E-3 | 1.8E-04 |
|  | 1.8E-3–1.5E-2 | 1.2E-04 | 5.4E-3–2.6E-2 | 4.2E-04 |
| Cu—Y | 2.3E-5–8.8E-5 | 1.3E-05 | 3.2E-5–1.2E-4 | 2.0E-05 |
|  | 8.8E-5–4.0E-4 | 2.3E-05 | 1.2E-4–5.4E-4 | 5.2E-05 |
|  | 4.0E-4–2.2E-3 | 1.5E-04 | 5.4E-4–4.0E-3 | 3.3E-04 |
|  | 2.2E-3–1.3E-2 | 1.4E-04 | 3.0E-3–1.8E-2 | 3.7E-04 |
| Na—Y | 8.8E-5–4.0E-4 | 1.7E-05 | 0–1.5E-4 | 1.5E-05 |
|  | 4.0E-4–2.2E-3 | 1.6E-04 | 1.5E-4–5.5E-4 | 2.6E-05 |
|  | 2.2E-3–1.3E-2 | 2.8E-04 | 5.5E-4–5.4E-3 | 5.6E-05 |
|  | 1.3E-2–2.9E-2 | 5.4E-04 | 5.4E-3–2.6E-2 | 2.4E-04 |

Experiment D

As mentioned hereinabove, it has further been fortuitously found that the sorbents of the present invention also are excellent sorbents for removal of aromatics. A detailed description of removal of aromatics follows.

Adsorption of benzene and cyclohexane on various Y-zeolites was investigated in order to develop sorbents for the purification of aliphatics by removal of aromatics. Ag—Y showed superior benzene/cyclohexane selectivities than Na—Y, Pd—Y and H-USY. Separation factors greater than $10^5$ were obtained with Ag—Y at low concentrations of benzene. The high selectivities were achieved by the strong interaction between benzene and Ag—Y, while the interaction with cyclohexane was not influenced by the cations. Molecular orbital calculation revealed that benzene formed classical π-complexation bond with Ag—Y: donation of electron charges from the p-orbitals of benzene to the vacant s-orbital of the silver (σ donation) and, simultaneously, back-donation of electron charges from d-orbitals of silver to π* orbital of benzene (d-π* back-donation). Grand canonical Monte Carlo simulations were also performed for the adsorption isotherms. Potential parameters of benzene on Ag—Y including π-complexation were first developed. GCMC simulation and experiments were in excellent agreement for adsorption of benzene on Y-zeolites.

Purification of aliphatics by removing aromatics is important in both petrochemical industry and for pollution control. Because benzene (and aromatics) is known to be highly carcinogenic, concentration of benzene needs to be minimized in the automotive fuel. A number of separation processes have been employed to reduce the benzene concentration in a refinery's gasoline pool, so that it meets new reformulated gasoline requirements. In a typical benzene reduction process, a combination of extraction and distillation is used (Jeanneret, 1997). Also, removal of aromatics from kerosene improves the clean burning properties of the fuel and separation of the aromatics from the isoparaffins and naphthenes in lubricating oils improves the viscosity-temperature relationship (Bailes, 1983).

Because of the importance of aromatics/aliphatics separation and the problems associated with current separation processes, possible alternatives have been under continuing investigation. These include pervaporation (Hao et al, 1997), liquid membranes (Li, 1968), and the use of liquid inclusion complexes (Atwood, 1984). Purification of dilute aromatics from aliphatics (e.g., toluene and/or xylene in heptane) by temperature swing adsorption (TSA) was studied in the liquid phase (Matz and Knaebel, 1990). Commercially available sorbents were used: silica gel, activated alumina, activated carbon, zeolite 13X, and polymeric resin (XAD-7). Among these sorbents, silica gel was considered the best due to its superior thermal-exchange capacity. However, the selectivities were low.

Adsorption is playing an increasingly important role in separations. However, its utility is limited by the availability of selective sorbents. The conventional sorbents and separations using them are based on van der Waals and electrostatic interactions between the sorbate and the sorbent. Studies of new sorbents using weak chemical bonds such as chemical complexation have begun only recently in our laboratory. As suggested by King (King, 1987), chemical complexation bonds are generally stronger than van der Waals interactions, yet weak enough to be reversible. Therefore, tremendous opportunities exist for developing new sorbents and new applications in separations by using weak chemical bonds, including various forms of complexation bonds.

The π-complexation is a sub-class of chemical complexation. It pertains to the main group (or d-block) transition metals, i.e., from Sc to Cu, Y to Ag, and La to Au in the periodic table (Cotton and Wilkinson, 1966). These metals or their ions can form the normal σ-bond to carbon and, in addition, the unique characteristics of the d orbitals in these metals or ions can form bonds with unsaturated hydrocarbons in a nonclassical manner. This type of bonding is broadly referred to as π-complexation. This π-complexation has been seriously considered for olefin/paraffin separations using liquid solutions containing silver or cuprous ions (Quinn, 1971; Ho et al., 1988; Keller et al., 1992; Blytas, 1992; Eldridge, 1993; Safarik and Eldridge, 1988). These involved gas-liquid operations. While gas-solid operation can be simpler as well as more efficient, particularly by pressure swing adsorption, the list of attempts for developing solid π-complexation sorbent is a short one.

More recently, several new sorbents based on π-complexation were prepared for selective olefin adsorption. These included $Ag^+$-exchanged resins (Yang and Kikkinides, 1995; Wu et al., 1997), monolayer CuCl on pillared clays (Cheng and Yang, 1995) and monolayer $AgNO_3/SiO_2$ (Padin and Yang, 1997; Rege et al., 1998; Padin and Yang, 2000). Moreover, Ag ion-exchanged Y-Zeolite was developed to purify butene by removing trace amounts of butadiene (Padin et al., 1999). The purification performance of this sorbent was superior to that of NaY owing to π-complexation.

It is possible, in principle, to purify aromatics from aliphatics based on π-complexation. In the benzene molecules, the carbon atom is $sp^2$ hybridized. Hence, each carbon has three $sp^2$ orbitals and another $P_z$ orbital. The six $P_z$ orbitals in the benzene ring form the conjugative π bonds. The $P_z$ orbitals also form the antibonding π* orbitals, which are not occupied. When benzene interacts with transition metals, the π-orbitals of benzene could overlap with the empty or unfilled outer-shell s orbital of the transition metal to form a σ-bond. Furthermore, the vacant antibonding π*-orbitals of benzene could overlap with the d-orbitals in the transition metals, similar to that formed in the olefin-$Cu^+$ bond (Huang et al., 1999a). In this work, $Ag^+$ and $Pd^{2+}$ ion-exchanged zeolites were selected for the study of aromatics/aliphatics separations, since these two cations have the most promising π-complexation capabilities, and they are stable. In order to understand the effects of π-complexation, $Ag^+$ and $Pd^{2+}$ ion-exchanged zeolites were compared with that of $Na^+$ ion-exchanged zeolite and a high-$SiO_2$ zeolite.

Benzene and cyclohexane are an ideal pair of model compounds for studying selective sorbents for purification. These molecules have similar shapes, polarizabilities and volatilities (the boiling points are 80° C. for benzene and 81° C. for cyclohexane). The kinetic diameter of benzene, which is calculated from the minimum equilibrium cross-sectional diameter, is estimated to be 5.85 angstrom compared with 6.0 angstrom for cyclohexane (Breck, 1974). Therefore, benzene and cyclohexane were used in this work.

In addition to the experimental investigation, molecular orbital calculations were performed to obtain a basic understanding of the origin of the strong interactions of Ag ion-exchanged zeolite with benzene. Moreover, grand canonical Monte Carlo (GCMC) simulations were used to simulate/predict the isotherms. Many GCMC studies have been performed for predicting adsorption isotherms in zeolites. These include $N_2$, $O_2$, Ar, Xe, $CH_4$, $C_2H_4$ and $C_4H_{10}$ on zeolite-A, X, Y and MFI-type Zeolite (Woods and Rowlinson, 1989; Razmus and Hall, 1991; Kravias and Myers, 1991; Watanabe et al., 1995). Adsorption of benzene on NaY, Heulandite and MFI-type zeolites has also been studied (Snurr et al., 1994; Kitagawa et al., 1996; Klemm et al., 1998; Laboy et al., 1999). However, these studies did not involve the effects of π-complexation on adsorption. In this study, benzene adsorption isotherms on Ag ion-exchanged Y-zeolite were simulated.

EXPERIMENTAL DETAILS

Sorbent Preparation

The sorbents in this work were ion-exchanged zeolites. From earlier results on olefin/paraffin separations (Yang and Kikkinides, 1995; Wu et al., 1997; Cheng and Yang, 1995; Padin and Yang, 1997; Rege et al., 1998; Padin and Yang, 2000), $Ag^+$ and $Pd^{2+}$ were the most promising ions because of their strong π-complexation abilities.

Ion-exchange of zeolites was accomplished with aqueous solutions. Faujasite was selected as the zeolite framework structure for ion-exchange, because of its large pore aperture (7.4 angstrom), large pore volume (0.489 ml/ml) and wide range of $SiO_2/Al_2O_3$ ratios(1-∞). Two as-received zeolites, Na-type Y-Zeolite (Na—Y, Si/Al=2.43, Strem Chemical) and H-type ultra-stable Y-Zeolite (H-USY, Si/Al=195, TOSOH CORPORATION, HSZ-390HUA), were used in this study. $Pd^{2+}$ type Y-Zeolite was prepared by exchanging Na—Y zeolite with $Pd(NO_3)_2$ (Aldrich) in an aqueous solution (Li et al., 1994). First, Na—Y was exchanged using 2-fold excess of $Pd(NO_3)_2$ (0.005M) at 80° C. for 24 hours.

After the exchange, the zeolite suspension was filtered and washed with copious amount of deionized water. The product was dried at 110° C. overnight in air. $Ag^+$ ion-exchange was prepared at room temperature for 24 hours in the same manner as $Pd^{2+}$ exchange, using 2-fold excess $AgNO_3$ (0.1M).

Adsorption Isotherms and Uptake Rates

Single component isotherms for benzene and cyclohexane were measured using standard gravimetric methods. A Shimadzu TGA-50 automatic recording microbalance was employed. Helium (Pre-purified grade, Metro Welding, 99.995%) was used as the carrier gas and was first passed through two consecutive gas-wash bottles (to ensure saturation) which contained benzene (HPLC grade, Sigma-Aldrich, 99.9+%) or cyclohexane (HPLC grade, Aldrich, 99.9+%). After diluting the concentration to the desired value by blending with additional helium (total flowrate: 250 cc/min), the mixture was directed into the microbalance.

Isosteric heats of adsorption were calculated using the Clausius-Clapeyron equation from isotherms at different temperatures. Nitrogen isotherms at 77K measured with a Micromeritics ASAP 2010 system were used for pore size distribution and pore volume determination. Pore size distributions were calculated with Horvath-Kawazoe equation (Horvath and Kawazoe, 1983; Cheng and Yang, 1994). Pore volumes were calculated at 0.95 P/Po. The overall diffusion time constants, D/r, were calculated from the uptake rates (Yeh, 1989). In this work, the short time region was used.

Molecular Orbital Calculation Details

The π-complexation bonding between olefins and sorbents have been extensively investigated using molecular orbital (MO) calculations (Chen and Yang, 1996; Huang et al., 1999a, 1999b). More recently, MO studies were extended to benzene adsorption on various salts such as CuCl and AgCl (Takahashi et al.). In this work, similar MO studies for benzene adsorption on Ag ion-exchanged zeolite were performed using a cluster model of Ag-zeolite. The Gaussian 94 Progam (Frisch et al., 1995) in Cerius2 molecular modeling software (Bowie, 1995) from Molecular Simulation, Inc. was used for calculations. MO calculations for benzene and Ag zeolite were performed at the Hartree-Fock (HF) and density functional theory (DFT) level. The 3–21G basis set is the split-valence basis set, which has been used successfully for many simulations for benzene adsorption on zeolites (O'Malley and Braithwaite, 1995), protonation reaction of propylene and isobutene on zeolite (Viruera-Martin et al., 1993) and $O_2$, $N_2$ and $C_2H_4$ adsorption on Ag-Zeolites (Chen and Yang, 1996). The reliability of this basis set has been confirmed by the accuracy of calculation results in comparison with experimental data. Therefore, the 3–21 G basis set was employed for both geometry optimization and natural bond orbital (NBO) analysis.

Geometry Optimization and Energy of Adsorption Calculations

The restricted Hartree-Fock (RHF) theory at the 3–21G level basis set was used to determine the geometries and the bonding energies of benzene on Ag zeolite cluster, since $Ag^+$ has filled d-orbitals with spin=1.

The computational model used for Ag zeolite were the same as that used by Chen and Yang (Chen and Yang, 1996), since this model yielded heats of adsorption of $N_2$ and $C_2H_4$ on Ag zeolite that agreed well with experimental data. The simplest cluster model, $(HO)_3Si—O(Ag)—Al(OH)_3$, was chosen for this work. The optimized structures were then used for bond energy calculations according to the following expression:

$$E_{ads} = E_{adsorbate} + E_{adsorbent} - E_{adsorbent-adsorbat} \quad (1)$$

Where $E_{adsorbate}$ is the total energy of benzene, $E_{adsorbent}$ is the total energy of the bare adsorbent i.e., the Ag zeolite cluster, and $E_{adsorbent-adsorbate}$ is the total energy of the adsorbate/adsorbent system.

Natural Bond Orbital (NBO) Analysis

The optimized structures were also used for NBO analysis at the B3LYP/3–21G level. The B3LYP (Becke, 1993a) approach is one of the most useful self-consistent hybrid (SCH) approaches (Becke, 1993b), which is Becke's 3-parameter nonlocal exchange functional (Becke, 1992) with the nonlocal correlation functional of Lee, Yang and Parr (Lee et al., 1988).

The NBO analysis performs population analysis pertaining to the localized wave-function properties. It gives a better description of the electron distribution in compounds of high ionic character, such as those containing metal atoms (Reed et al., 1985). It is known to be sensitive for calculating localized weak interactions, such as charge transfer, hydrogen bonding and weak chemisorption. Therefore, the NBO program (Glendening et al., 1995) was used for studying the electron density distribution of the adsorption system.

Monte Carlo Simulation Details

Grand canonical ensemble (at a fixed pressure) Monte Carlo simulation was performed utilizing the Cerius2 molecular modeling software (Bowie, 1995) on a Silicon Graphics Indigo2 workstation running IRIX v.6.5. After the "crystal builder" module was used to set up the zeolite models, energy expressions and parameters for force field were input by the "force field editor" module. The "sorption" module was then used for benzene adsorption simulations.

The simulation was performed at 120° C. and 180° C. for at least 1,000,000 configurations. During the simulation, the sorbate molecules interacted with the potential field generated by sorbate-sorbent and sorbate-sorbate interactions. The initial configurations contained no sorbate molecules. Each subsequent configuration was generated by one of four moves: CREATE, DESTROY, TRANSLATE and ROTATE. Molecular creation attempts were made at random points within the accessible portion of the zeolite lattice with the criterion that there be no overlapping sites (i.e., creations which results in interaction sites which were closer than half the sum of the van der Waal's radii of the two sites were rejected). Translation and rotation were performed with the same rejection criterion. For non-overlapping sites, the change in the potential energy accompanying the new configuration was calculated and subsequently accepted or rejected in accordance with standard acceptance probabilities (Molecular Simulation Inc., 1998).

Zeolite Models

The structure determined from powder neutron diffraction data by Fitch et al. (Fitch et al., 1986) was used as the structure for Na—Y Zeolite (Si/Al=2.43). The location of the Na cations were 32 atoms on SII sites, 16 atoms on SI sites and 8 atoms on SI' sites. Na cations on SI and SI' sites were located in such a manner that two adjacent SI and SI' were not simultaneously occupied. This is due to the electrostatic repulsion caused by their small separation of 0.218 nm (Fitch et al., 1986). The position of Al in the framework was randomly chosen using the "disorder" function in the "crystal builder" module that obeyed the Loewenstein rule. No charge-free "blocking atom" was added because large molecules such as benzene were not located in the site, which was actually sterically inaccessible.

For the simulation of Ag ion-exchanged zeolite (Si/Al=2.43), the Na cations in Na—Y were replaced by Ag maintaining the same cation locations. An all silica Y-Zeolite structure was used to simulate Ultra-Stable Y-Zeolite (Si/Al=195) since this zeolite has less than one Al atom per unit cell.

Until recently, the location of the Ag cation was not accurately determined. Using neutron diffraction data, Hutson et al (Hutson et al., 2000) reported the Ag location and occupancies of Ag in Ag—Y (Si/Al=2.43) after 450° C. dehydration. Their results showed that the Ag cation sites were 28 atoms on SII sites, 4 atoms on SII' site, 11 atoms on SI sites and 12 atoms on SI' sites. Simultaneous occupancy of Ag cations at SII and SII' as well as SI and SI' sites was unlikely due to the large repulsion. This location is very similar to the location of Na cations in Na—Y reported by Fitch et al., 1986. Therefore, the zeolite model for Ag—Y used in this work is considered to reflect the actual Ag cation locations in Ag—Y (Si/Al=2.43).

Forcefield Determination

One of the most important factors for GCMC simulation is the selection of an energy expression and parameters for the forcefield. The forcefield used in these simulations was a modified version of Cerius2 Sorption Demontis Forcefield, since Demontis et al. simulated the mobility of benzene in Na—Y zeolite successfully using molecular dynamics methods (Demontis et al., 1989). In this model, the total potential energy ($U_{Total}$) between the zeolite lattice and adsorbate molecules is written as the sum of the interactions between adsorbate molecules(AA) and that between the adsorbate molecules and the zeolite lattice (AZ).

$$U_{Total} = U_{AA} + U_{AZ} \quad (2)$$

Interactions between adsorbate molecules ($U_{AA}$) were described as the sum of the atom-atom Buckingham potentials (the first and second terms below), which have shown to yield reasonable predictions for liquid and solid benzene (Williams and Cox, 1984), and the Coulombic interaction potentials (the third term below).

$$U_{ij} = A_{ij} \exp(-B_{ij} r_{ij}) - \frac{C_{ij}}{r_{ij}^6} + \left(\frac{q_i q_j}{r_{ij}}\right) \quad (3)$$

The first and second terms represent, respectively, the repulsive and dispersive potential energies between sites "i" and "j", and the third term represents the interaction potential between point charges $q_i$ and $q_j$ of sites "i" and "j" separated by a distance $r_{ij}$.

The interactions between the adsorbate molecules and the zeolite lattice ($U_{AZ}$) is written as the sum of the atom-atom Lennard-Jones 12-6 potential and the Coulombic interaction potentials.

$$U_{ij} = 4\varepsilon_{ij}\left[\left(\frac{\sigma_{ij}}{r_{ij}}\right)^{12} - \left(\frac{\sigma_{ij}}{r_{ij}}\right)^{6}\right] + \left(\frac{q_i q_j}{r_{ij}}\right) \quad (4)$$

Following the empirical approach used by Razman and Hall (Razmus and Hall, 1991), Watanabe et al. (Watanabe et al., 1995) used the empirical approach to parameterize the forcefield for adsorption of $N_2$, $O_2$, and Ar in type A and faujasite zeolites. The dispersive part of the Lennard-Jones 12-6 potential ($U_{dispersion}$) was written using an adjustable parameter ($\beta_i$) of the adsorbate and the polarizabilities ($\alpha$) of the atoms of the adsorbate molecules (i) and in the zeolite lattice (j).

$$U_{dispersion} = -\beta_i \left(\frac{\alpha_i \alpha_j}{r_{ij}^6}\right) \quad (5)$$

The potential energy well depth parameter, $\varepsilon_{ij}$ is then written as $$\varepsilon_{ij} = \beta_i \left(\frac{\alpha_i \alpha_j}{4\sigma_{ij}^6}\right) \quad (6)$$

The Lennard-Jones parameter, $\sigma_{ij}$, for the adsorbate-zeolite interaction is given by the mixing rule, $$\sigma_{ij} = \left(\frac{\sigma_i + \sigma_j}{2}\right) \quad (7)$$

The $\sigma_j$ for the zeolite lattice are related to the van der Waals radii, $R_j$, of the respective ions by $$R_j = 2^{\frac{1}{6}} \sigma_j \quad (8)$$

The well depth parameter, $\varepsilon_{ij}$, is assumed to be a geometric combination of $\varepsilon_i$ and $\varepsilon_j$, $$\varepsilon_{ij} = (\varepsilon_i \varepsilon_j)^{0.5} \quad (9)$$

The van der Waals energy in the periodic framework was calculated using a minimum image convention with an interaction cut-off distance of 1 nm. The Coulombic term was evaluated using the Evald summation method (Allen and Tildesley, 1987).

The potential parameters used for Na—Y, Ag—Y and H-USY are listed in Table 15. The potential parameters for Na—Y are the same as that of Demontis et al (Demontis et al., 1989). Van der Waals interactions between adsorbate and zeolite cage were modeled by means of interactions between the (C,H) and (Na,O) atoms. Interactions with the Si and Al atoms were neglected because they were well shielded by the oxygen atoms of the $SiO_4$ and $AlO_4$ tetrahedra. Electrostatic interactions between all charges were included in the potential energy calculation. As for Ag—Y and all silica Y zeolites, modification of parameters was performed using the mixing rule and the geometric combination rule. The detailed scheme for parameterization will be discussed shortly.

TABLE 15

The Potential Parameters used for Na—Y, Ag—Y and H—USY

| | | | C—C | H—H | C—H | |
|---|---|---|---|---|---|---|
| Na—Y | $U_{AA}$[1] | | | | | |
| | | A(kcal/mol) | 88371 | 2861 | 15901 | |
| | | B(1/A) | 3.60 | 3.74 | 3.67 | |
| | | C($A^6$*kcal/mol) | 583.13 | 32.60 | 137.88 | |
| | $U_{AZ}$ | | O—C | O—H | Na—C | Na—H |
| | | $\epsilon$(kcal/mol) | 0.25547 | 0.16515 | 0.04187 | 0.03153 |
| | | $\sigma$(A) | 2.9984 | 2.5893 | 3.3279 | 2.7651 |
| Ag—Y | $U_{AZ}$ | | O—C | O—H | Ag—C | Ag—H |
| (Case 1) | | $\epsilon$(kcal/mol) | 0.25547 | 0.16515 | <u>0.7823</u> | <u>0.5895</u> |
| | | $\sigma$(A) | 2.9984 | 2.5893 | 3.5773 | 3.0145 |
| Ag—Y | $U_{AZ}$ | | O—C | O—H | Ag—C | Ag—H |
| (Case II) | | $\epsilon$(kcal/mol) | 0.25547 | 0.16515 | <u>0.7601</u> | <u>0.5728</u> |
| | | $\sigma$(A) | 2.9984 | 2.5893 | 3.5773 | 3.0145 |
| H—USY | $U_{AZ}$ | | O—C | O—H | | |
| | | $\epsilon$(kcal/mol) | <u>0.1687</u> | <u>0.1271</u> | | |
| | | $\sigma$(A) | 2.9984 | 2.5893 | | |

[1] Parameters for $U_{AA}$ are the same for all sorbents.
[2] The numbers with underline were determined in this work.

Assignment of Charges for Adsorbate and Adsorbent

Assignment of charges also has a significant impact on simulation results when the Coulombic interactions are not negligible. In this work, the existing model for benzene in Cerius$^2$ was used. In this model, each carbon in benzene carries −0.093 point charge, while hydrogen carries +0.093. These values were nearly the average values from the various charge determination methods: MOPAC (0.1022), ZINDO (0.072) and charge equilibration method ($Q_{eq}$) by Rappe and Goddard (0.1147) (Rappe and Goddard, 1991).

The point charges of zeolite were assigned either by (i) using the point charges in the literature or (ii) calculating by means of the charge equilibration method in the Cerius2 software. In this work, Na, Si/Al, 0 in Na—Y carried the charges of +0.78, +1.2125 and −0.72, respectively, since these values were successfully used in quantum mechanics simulations (Kitagawa et al., 1996). Here, no distinction was made between Si and Al atoms in terms of point charges. Charges of Ag—Y and all-silica Y-Zeolites were calculated by the charge equilibration method: Ag(+0.45), Si/Al(+1.16875), O(−0.65), which will be referred to as Case I for Ag—Y, and Si(+1.2650), O(−0.6325) for H-USY. In order to investigate the effect of the assigned charges to the isotherm simulation results, the same charges that were used for Na—Y, i.e., Ag(+0.78), Si/Al(+1.2125) and O(−0.72), were also used for Ag—Y. This case is referred to as Case II for Ag—Y. For all cases, regardless of the positions of cations and framework atoms (Si, Al, O), the same values of point charge were assigned to the same atoms throughout the simulation unit cell, even though the point charge might vary with the position of the atom. The Ag cation charges used for Monte Carlo simulation were also consistent with the values calculated by molecular orbital method at MP2/3–21G (Ag charge: +0.49) or MP2/LanL2DZ level (Ag charge: +0.74) using the zeolite cluster model (Chen and Yang, 1996).

RESULTS AND DISCUSSION EXPERIMENTAL

Benzene/Cyclohexane Adsorption Isotherms

Pure component isotherms of benzene and cyclohexane were measured for H-USY(Si/Al=195), Na—Y(Si/Al=2.43), Ag—Y(Si/Al=2.43), and Pd—Y(Si/Al=2.43) at 120 and 180° C., shown in FIGS. 22-25. Isosteric heats of adsorption calculated using the Clausius-Clapeyron equation are listed in Table 16.

TABLE 16

Comparison of Heat of Adsorption (kcal/mol) between Experimental and Simulated Results

| | Na—Y | Ag—Y | H—USY |
|---|---|---|---|
| Benzene | | | |
| Experimental | 17.7–18.2 | 20.5–20.7 | 6.2–7.2 |
| Monte Carlo Simulation | 16.4–18.5 | 18.8–21.1 | 8.2–9.2 |
| Molecular Orbital Calculation | *** | 17.2 | *** |
| Barthomeuf et al.[1] | 17.5–18.0 | *** | *** |
| Cyclohexane | | | |
| Experimental | 10.9–13.0 | 12.1–12.3 | 4.1–4.3 |
| Barthomeuf et al. | 12.0–13.2 | *** | *** |

[1]Barthomeuf and Ha, 1973

In the case of H-USY, the adsorbed amounts of cyclohexane were higher than that of benzene at>0.04 atmosphere. This result qualitatively agreed with calculations using the Horvath-Kawazoe theory (Horvath and Kawazoe, 1983; Cheng and Yang, 1994). The threshold pore-filling vapor pressures of cyclohexane and benzene at 120° C. and 180° C. were calculated using the spherical pore model of the H-K method. The threshold pressure is the pressure where the steep rise in the isotherm occurs. At both temperatures, it was found that the pore-filling pressure of cyclohexane was 20% lower than that of benzene. The reason for this difference was the larger polarizability (11.0× $10^{-24}$ cm$^3$ for cyclohexane and 10.3×$10^{-24}$ Cm$^3$ for benzene) and magnetic susceptibility (11.3×$10^{-29}$ µm$^3$ for cyclohexane and 9.1×$10^{-29}$ µm$^3$ for benzene) of cyclohexane. However, the calculated isosteric heat of adsorption of benzene was slightly higher than that of cyclohexane. A possible reason for the larger heat of benzene adsorption was the existence of H$^+$ in the zeolite, although the number of proton was extremely small (less than one per unit cell). The interaction between protons in zeolite and π-electrons of benzene might be stronger than the interaction between oxygen in zeolite and benzene. Therefore, the amounts of benzene adsorption were slightly larger than that of cyclohexane at less than 0.04 atm, leading to its higher heat of adsorption.

On all other sorbents investigated in this work, larger amounts of benzene were adsorbed at all pressure ranges. Heats of adsorption for benzene were 18 kcal/mol for Na—Y and 21 kcal/mol for Ag—Y, while heats of adsorption for cyclohexane were 10–12 kcal/mol for both Na—Y and Ag—Y. These results are clearly due to the strong interactions between the cations in zeolite and the benzene molecule. Consequently, Ag—Y and Na—Y could adsorb large amounts of benzene even at the pressure of less than 0.01 atm. The heats of adsorption on Na—Y were comparable to previous work (Barthomeuf and Ha, 1973). Most importantly, Ag—Y showed the strongest interactions for benzene and the largest heats of adsorption (20.5 kcal/mol). For cyclohexane adsorption, the adsorption amounts and heat of adsorption were almost the same between Ag—Y and Na—Y, since π-complexation was absent for cyclohexane. A detailed discussion will be made in the section of molecular orbital calculation and Monte Carlo simulation results. These results indicated that improved purification performance of benzene from cyclohexane is possible using Ag—Y. The isotherms of both Ag—Y and Na—Y are reversible, although it took a little longer time to desorb benzene and cyclohexane. For example, 200 minutes are necessary to desorb benzene completely after the adsorption at 0.1 atmosphere. This slow desorption is clearly due to the strong interaction between benzene and Ag. However, the bonds are of the order of 20 kcal/mol, which are weak enough so a substantial fraction of the adsorbed benzene is desorbed in a few minutes. For practical applications, thermal desorption may be a desirable option.

Figure 26:
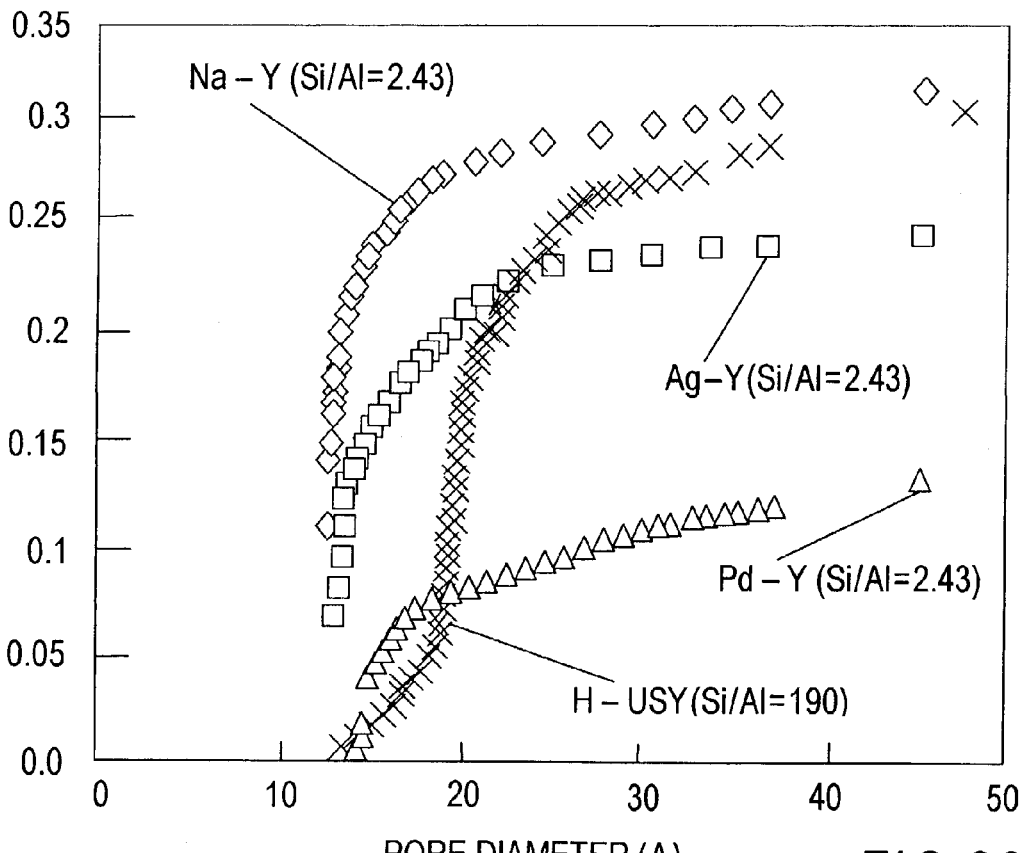
FIG. 26 is a graph depicting pore size distributions of Na—Y, Ag—Y, Pd—Y and H-USY.

Pd—Y gave lower adsorption amounts than both Ag—Y and Na—Y. This decrease of adsorption amounts by ion-exchange with Pd was due to degradation of the zeolite structure. In FIG. 26, the pore size distributions for all sorbents calculated from N$_2$ isotherms at 77 K are shown.

Pd—Y had a small pore volume with a wide pore size distribution, clearly indicating the collapse of the zeolite pore structure or pore blockage by Pd. The Pd ion-exchanged was performed at 80° C., compared with the Ag ion-exchange at room temperature. Collapsing of zeolite structure tends to occur considerably more in acidic solution and at higher temperatures. The pore volume of Ag—Y also decreased by 23% after ion-exchange. However, this reduction of Ag—Y was mainly caused by 37% density increase of the zeolite lattice by replacing $Na^+$ with $Ag^+$ (27% reduction of pore volume per weight basis). The pore structure of Ag—Y was intact after ion-exchange.

Another interesting phenomenon in FIG. 26 is the apparent shift of the pore size distribution in H-USY toward a higher value, compared to other zeolites. This was likely due to the lower polarizability of oxygen in the framework of high-$SiO_2$ zeolites (Pellenq and Nicholson, 1993), which will be discussed in detail in the section of Monte Carlo simulation results. Otherwise, the interactions between nitrogen and cations in zeolites would have led to a shift of the pore sizes toward smaller values for Na—Y, Ag—Y and Pd—Y. Since the pore sizes of Na—Y, Ag—Y and Pd—Y were the same as the actual value for Y zeolites (1.3 nm), the latter explanation is not plausible.

Separation Factors

The pure component adsorption data were first fitted by both D-A (Dubinin-Astakhov) and L-F (Langmuir-Freundlich) isotherms. The separation factors of benzene over cyclohexane were then obtained using the equivalent multicomponent isotherms. In the D-A equation of pure component gas, the volume adsorbed, V, at relative pressures $P/P_S$ is expressed as $$V = V_o \exp\left[-\left(C \ln \frac{P_s}{P}\right)^n\right] \quad (10)$$

where $$C = \frac{RT}{\beta E_0} \quad (11)$$

Doong and Yang (Doong and Yang, 1988) extended the D-A equation to mixed-gas adsorption in a simple way by using the concept of maximum available pore volume without any additional equations such as the Lewis relationship (Lewis et al., 1950). For binary mixtures, $$V_1 = (V_{01} - V_2)\exp\left[-\left(C_1 \ln \frac{P_{s1}}{P_1}\right)^{n_1}\right] \quad (12)$$

$$V_2 = (V_{02} - V_1)\exp\left[-\left(C_2 \ln \frac{P_{s2}}{P_2}\right)^{n_2}\right] \quad (13)$$

Since equation (12) and (13) are linear, $V_1$ and $V_2$ can be obtained in a straightforward fashion. After the calculation of $V_1$ and $V_2$, volumetric adsorbed amounts were converted to molar adsorbed amounts and the separation factors were calculated. The conversion of molar adsorbed amount to volumetric adsorbed amount and vice versa was performed using the liquid density data of the adsorbates. The liquid density at 120 and 180° C. were obtained by the modified Rackett equation by Spencer and Adler (Spencer and Adler, 1978). The liquid densities used in this work were 0.769 g/cc at 120° C. and 0.689 g/cc at 180° C. for benzene, and 0.679 g/cc at 120° C. and 0.606 g/cc at 180° C. for cyclohexane. The adsorbed molar volumes were assumed to be the same in both single- and mixed-gas adsorption.

For the Langmuir-Freundlich isotherm equation, pure component isotherm is written using three adjustable parameters:

$$q = \frac{q_0 B P^{\frac{1}{n}}}{1 + B P^{\frac{1}{n}}} \quad (14)$$

The L-F equation can also be extended for n-component mixture (Yang, 1987):

$$q_i = \frac{q_0 B_i P_i^{\frac{1}{n_i}}}{1 + \sum_{j=1}^{n} B_j P_j^{\frac{1}{n_j}}} \quad (15)$$

The fitting parameters for both isotherms are listed in Table 17 and the fitted curves are plotted in FIGS. 22–25. The separation factors of benzene over cyclohexane were calculated using the equilibrium mole fractions in adsorbed and gas phases:

$$\alpha = \frac{X_{benzene}/Y_{benzene}}{X_{cyclohexane}/Y_{cyclohexane}} \quad (16)$$

The calculated separation factors for Ag—Y and Na—Y are compared in Table 18. Both D-A and L-F equations led to similar dependence of separation factor on pressure. The separation factor for Ag—Y increased with decreasing concentration of benzene, while that for Na—Y at 180° C. decreased. Although the separation factors calculated by the two isotherms were not the same, the advantages of Ag—Y over Na—Y are clearly seen, especially at lower concentrations of benzene. This is certainly because Ag—Y can maintain its adsorption ability to benzene even at around $1 \times 10^5$ atm. On the other hand, at 0.01 and 0.001 atm of benzene and at the lower temperature of 120° C., Na—Y showed equivalent separation factors to Ag—Y.

For separations by adsorption and membranes, a separation factor of the order of 10 is considered high. For example, in air separation by pressure swing adsorption using zeolites and also by polymeric membranes, systems with separation factors ($N_2/O_2$ for adsorption and $O_2/N_2$ for membranes) of near 10 are commercially used. For aromatics/aliphatics separations using liquid membranes (e.g., toluene/heptane and benzene/heptane separations), separation factors of the order of 10–100 yielded excellent separations (Li, 1968; Li, 1971). The separation factors shown in Table 18, in the order of 10–10,000, are excellent for separation/purification.

TABLE 17

Parameters for the D-A and L-F Equations

| | | | D-A Equation | | | | L-F Equation | | |
|---|---|---|---|---|---|---|---|---|---|
| Adsorbent | Adsorbate | Temp. (° C.) | $V_o$ (cc/g) | C (-) | n (-) | Ps (atm) | $q_o$ (mmol/g) | B (1/atm) | n (1/atm) |
| Na—Y | Benzene | 120 | 0.295 | 0.092 | 3.76 | 2.96 | 3.15 | 30.7 | 2.53 |
| | Benzene | 180 | 0.326 | 0.120 | 4.73 | 10.07 | 2.82 | 449 | 0.9 |
| | Cyclohexane | 120 | 0.267 | 0.149 | 5.01 | 2.84 | 2.58 | 51.2 | 1.18 |
| | Cyclohexane | 180 | 0.264 | 0.168 | 6.44 | 9.48 | 2.30 | 61.9 | 0.77 |
| Ag—Y | Benzene | 120 | 0.244 | 0.056 | 1.57 | 2.96 | 3.07 | 3.67 | 7.46 |
| | Benzene | 180 | 0.248 | 0.082 | 3.05 | 10.07 | 2.03 | 156 | 1.85 |
| | Cyclohexane | 120 | 0.225 | 0.133 | 4.32 | 2.84 | 2.02 | 48.4 | 1.44 |
| | Cyclohexane | 180 | 0.237 | 0.145 | 4.96 | 9.48 | 1.80 | 74.3 | 0.91 |
| H—USY | Benzene | 120 | 0.237 | 0.318 | 2.84 | 2.96 | 3.40 | 11.2 | 0.62 |
| | Benzene | 180 | 0.234 | 0.333 | 2.17 | 10.07 | 3.40 | 1.11 | 0.74 |
| | Cyclohexane | 120 | 0.249 | 0.265 | 5.85 | 2.84 | 1.33 | 2500000 | 0.2 |
| | Cyclohexane | 180 | 0.15 | 0.232 | 4.93 | 9.48 | 0.73 | 260 | 0.39 |
| Pd—Y | Benzene | 120 | 0.173 | 0.237 | 2.15 | 2.96 | 0.883 | 240 | 0.7 |
| | Cyclohexane | 120 | 0.16 | 0.317 | 1.34 | 2.84 | 0.753 | 9.22 | 1.2 |

TABLE 18

Separation Factors estimated by the D-A and L-F Equations

| Pressure (atm) | | Temp. | D-A Equation | | L-F Equation | |
|---|---|---|---|---|---|---|
| Benzene | Cyclohexane | (° C.) | Ag—Y | Na—Y | Ag—Y | Na—Y |
| 0.01 | 1 | 120 | 107 | *** | 6 | 12 |
| 0.001 | 1 | 120 | 416 | 441 | 45 | 48 |
| 0.0001 | 1 | 120 | 2286 | 1016 | 335 | 191 |
| 0.00001 | 1 | 120 | 14361 | 2553 | 2462 | 767 |
| 0.01 | 1 | 180 | 39 | 95 | 19 | 5.4 |
| 0.001 | 1 | 180 | 120 | 71 | 57 | 4.2 |
| 0.0001 | 1 | 180 | 456 | 26 | 163 | 3.3 |
| 0.00001 | 1 | 180 | 1767 | 0.5 | 470 | 2.6 |

Diffusion Time Constants

In Table 19, diffusion time constants calculated from 0–0.3 fractional uptake were summarized. Diffusion time constants of benzene and cyclohexane in Na—Y and Ag—Y were of the order of $10^{-4}$ 1/s. These values were almost the same as those of benzene and cyclohexane into $AgNO_3$ monolayer dispersed $SiO_2$ sorbent (Takahashi et al.). However, these values were an order of magnitude lower than those of propylene and propane in $AgNO_3$ monolayer-dispersed $SiO_2$ sorbent (Rege, 1998) and at least the same as those of ethylene and ethane into Ag ion-exchanged resins (Wu et al., 1997). The diffusion rates of benzene in these zeolites are high for applications (Yang, 1987).

TABLE 19

Diffusion Time Constants of Benzene and Cyclohexane

| Adsorbents | Temp. (° C.) | Benzene (1/s) | (Pressure Change) (atm) | Cyclohexane (1/s) | (Pressure Change) (atm) |
|---|---|---|---|---|---|
| Na—Y | 120 | $2.1 \times 10^{-4}$ | ($5.4 \times 10^{-3}$ --> $2.6 \times 10^{-2}$) | $9.8 \times 10^{-4}$ | ($1.1 \times 10^{-2}$ --> $2.0 \times 10^{-2}$) |
| Ag—Y | 120 | $4.2 \times 10^{-4}$ | ($5.4 \times 10^{-3}$ --> $2.6 \times 10^{-2}$) | $1.1 \times 10^{-4}$ | ($1.1 \times 10^{-2}$ --> $2.0 \times 10^{-2}$) |
| $AgNO_3/SiO_2$(0.33 g/g)[1] | 120 | $1.3 \times 10^{-4}$ | ($2.0 \times 10^{-3}$ --> $3.7 \times 10^{-2}$) | $2.9 \times 10^{-4}$ | ($2.0 \times 10^{-3}$ --> $3.7 \times 10^{-2}$) |

| Adsorbents | Temp. (° C.) | Propylene (1/s) | (Pressure Change) (atm) | Propane (1/s) | (Pressure Change) (atm) |
|---|---|---|---|---|---|
| $AgNO_3/SiO_2$(0.33 g/g)[2] | 70 | $3.5 \times 10^{-3}$ | (0 --> 1) | *** | *** |
| Ag-Amberlyst-35[3] | 70 | $1.5 \times 10^{-4}$ | *** | $1.4 \times 10^{-4}$ | *** |

[1] Takahashi et al., 2000
[2] Rege et al., 1998
[3] Wu et al., 1997

Molecular Orbital Calculation

Adsorption Bond Energy and Molecular Geometries

Adsorption energy and structural geometry were calculated using molecular orbital theory. The calculated heat of adsorption using B3LYP/3–21G level by equation (1) is also compared with experimental and Monte Carlo simulation results in Table 16. The theoretical value, 17.2 kcal/mol, was in fairly good agreement with the experimental value. The comparison of bond length by benzene adsorption revealed that the Ag—O length increased from 3.023A to 3.246A. The C—C bond length in benzene also increased from 1.385A to 1.385–1.391A. This trend was consistent with that for benzene interaction with AgCl (Takahashi et al.).

Natural Bond Orbital (NBO) Results

The nature of benzene-Ag zeolite interaction can be better understood by analyzing the NBO results. The main feature of the interaction can be seen from the population changes in the vacant outer-shell s orbital of the silver and those in the d orbitals of silver upon adsorption. In Table 20, NBO analysis results for benzene on Ag zeolite are compared with other combinations of adsorbates and adsorbents. According to the electron population changes by benzene adsorption on Ag zeolite, the trend is in agreement with previously reported trend of π-complexation (Cheng, 1996; Huang et al., 1999a; 1999b; 1999c; Takahashi et al.) i.e., donation of electron charges from the p-orbitals of benzene to the vacant s-orbital of the silver (σ donation) and, simultaneously, back-donation of electron charges from the d-orbitals of silver to π* orbital of benzene (d-π* back-donation). The contribution of d-π* back-donation is larger than σ donation, resulting in the decrease of net electron charge in silver. The net electron charge of carbon in benzene increased instead.

The differences of electron population changes between benzene and ethylene adsorption deserve a discussion. From Table 20, it is seen that the contribution of donation is predominant in ethylene adsorption, while d-π* back-donation is slightly larger in benzene adsorption. Also, the extent of σ donation and d-π* back-donation by benzene adsorption was considerably smaller compared with ethylene adsorption. Therefore, π-complexation with benzene was weaker than that with ethylene. Weak π-complexation of benzene can also be understood by the difference in bond lengths. The bond length between carbon in ethylene and silver in AgCl was 2.66 A (Huang et al., 1999b), while that between carbon in benzene and silver in Ag zeolite or AgCl was 2.71–3.7 A or 3.22 A (Takahashi et al.), respectively. This longer bond length was caused by the less overlap of orbitals from the weaker π-complexation.

tion. In this section, benzene adsorption on Na—Y, H-USY and Ag—Y is simulated and the mechanism of adsorption on each zeolite is discussed.

Na—Y Zeolite

Figure 27:
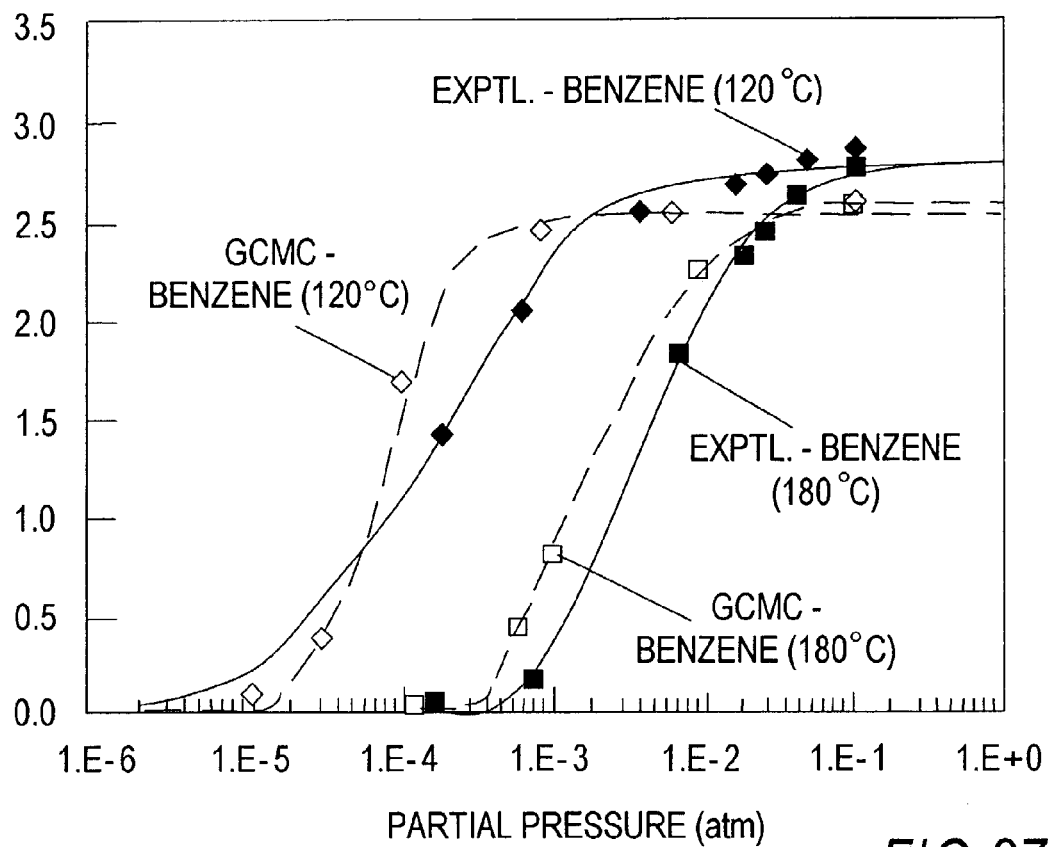
FIG. 27 is a graph comparing experimental and GCMC simulation for adsorption of benzene on Na—Y.

GCMC simulation results of benzene isotherms at 120 and 180° C. using the potential parameters given in Table 15 are shown in FIG. 27, where they are also compared with experimental data. The simulation results were in excellent agreement with experimental data. The calculated heats of adsorption were 16.4–18.5 kcal/mol, which were in agreement with that from experiments. It was hence confirmed that the energy expressions and parameters were suitable for simulation of benzene isotherms on Na—Y.

H-USY Zeolite

First, simulation of benzene isotherms on H-USY was attempted using the same potential parameters as on Na—Y. However, the simulated isotherms were considerably higher than the experimental data. This disagreement was caused by incorrect well depth parameters, $\epsilon_{O-C}$ and $\epsilon_{O-H}$, for van der Waals interaction. Pellenq and Nicholson (Pellenq and Nicholson, 1993) reported the values of the polarizabilities of framework atoms in silicalite and aluminosilicates determined from Auger electron spectroscopy data. It was found that the polarizability for oxygen in zeolite framework is sensitive to the ratio of silicon to aluminum and also the nature of the extraframework cations. Watanabe et al. (Watanabe et al., 1995) used different potential values for oxygen in silicalite (0.202 kcal/mol), denoted by Oz(Si—O—Si), and that in aluminosilicates (0.334 kcal/mol), denoted by Oz(Si—O—Al).

In this work, an adjustment of $\epsilon_{Oz(Si-O-Si)-C}$ and $\epsilon_{Oz(Si-O-Si)-H}$ was made to simulate the experimental Henry's law constants at 120 and 180° C. Here since low pressure data depend only on the benzene-zeolite interactions so the benzene-benzene interactions were neglected. Using the well depth parameter for $\epsilon_{Na-C}$=0.04187 kcal/mol and $\epsilon_{Na-H}$=0.03153 kcal/mol for Na—Y (in Table 15) and assuming $\epsilon_{Na}$=0.041 kcal/mol as used by Watanabe et al. (Watanabe et al., 1995) for Na—A and Na—X, $\epsilon_C$=0.0428

TABLE 20

Summary of the NBO Analysis of the π-complexation: Electron Population Changes of Each Orbital After Adsorption

|  | Method/Basis Set | Silver | | | Carbon | | |
| --- | --- | --- | --- | --- | --- | --- | --- |
|  |  | 5S | Σ4d | Net Change | 2s | Σ2p | Net Change |
| Benzene on Ag Zeolite | B3LYP/3-21G | 0.00541 | −0.0135 | −0.00805 | 0.00554 | 0.00709 | 0.01263 |
| Benzene on AgCl[1] | B3LYP/LanL2DZ | 0.0033 | −0.0071 | −0.0038 | *** | *** | *** |
| $C_2H_4$ on Ag Zeolite[2] | MP2/3-21G | 0.0596 | −0.0177 | 0.0419 | 0.0203 | 0.0193 | 0.0396 |
| $C_2H_4$ on AgCl[2] | MP2/3-21G | 0.1204 | −0.0470 | 0.0734 | 0.0226 | 0.0142 | 0.0368 |
| $C_2H_4$ on AgCl[3] | B3LYP/LanL2DZ | 0.061 | −0.055 | 0.006 | *** | *** | *** |

[1]Takahashi et al., 2000
[2]Chen and Yang, 1996
[3]Huang et al., 1999

Monte Carlo Simulation

Monte Carlo simulation of adsorption isotherms provides great insight into the adsorption mechanism via model construction, charge assignment and forcefield determinakcal/mol and $\epsilon_H$=0.0243 kcal/mol were obtained from the geometric combination rule, equation (9). Therefore, $\epsilon_{Oz(Si-O-Si)-C}$ and $\epsilon_{Oz(Si-O-Si)-H}$ for H-USY could be expressed as $(0.0428 \times \epsilon_{Oz(Si-O-Si)})^{0.5}$ and as $(0.0243 \times \epsilon_{Oz(Si-O-Si)})^{0.5}$, respectively. By fitting with $\epsilon_{Oz(Si\text{—}O\text{—}Si)}$, $\epsilon_{Oz(Si\text{—}O\text{—}Si)}$=0.665 kcal/mol was obtained to fit the experimental Henry's law constant of 0.519 molecules/(cell.kPa) at 120° C. and 0.137 molecules/(cell.kPa) at 180° C. The ratio of $\epsilon_{Oz(Si\text{—}O\text{—}Si)}$ over $\epsilon_{Oz(Si\text{—}O\text{—}Al)}$ was 0.44 (calculated from $\epsilon_{Oz(Si\text{—}O\text{—}Al)\text{—}H}$) −0.60 (calculated from $\epsilon_{Oz(Si\text{—}O\text{—}Al)}$), which was in agreement with the ratio of 0.60 obtained by Watanabe et al. (Watanabe et al., 1995).

Figure 28:
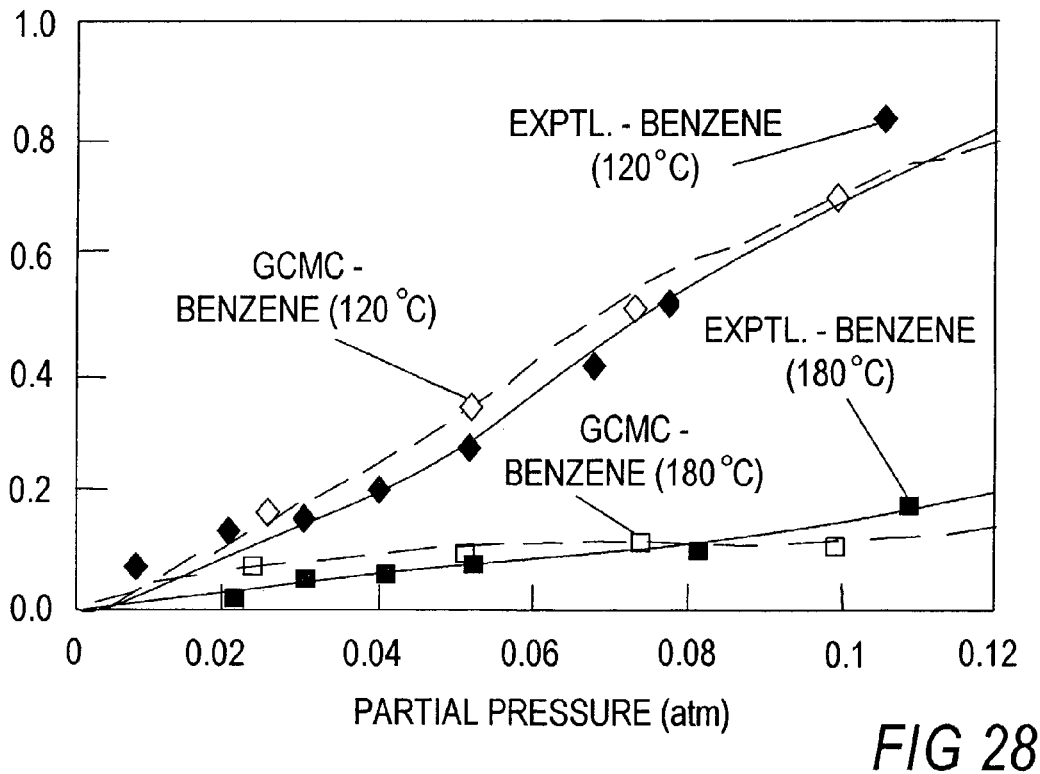
FIG. 28 is a graph comparing experimental and GCMC simulation for adsorption of benzene on H-USY.

Using the modified parameters for H-USY (in Table 15), the benzene isotherms were calculated and compared with experimental isotherms in FIG. 28. Again, the isotherms and the heat of adsorption (8.2–9.2 kcal/mol) obtained from simulation were in excellent agreement with the experimental data.

Ag—Y Zeolite

The potential parameters for Ag—Y are listed in Table 15. These parameters were modified to get the low pressure points of the isotherm at 180° C. (1.30 mmol/g at 1.6×10$^{-4}$ atmosphere), although adjustment of the parameters to fit the experimental Henry's law constant was preferable. The reason not to use the experimental Henry's constant was that the small pressure values (8.7×10$^{-6}$ atmosphere) at the lowest adsorbed amount in the isotherms might lead to the large error of potential parameters. The procedure of adjustment was basically the same as in the case for H-USY except for changing the $\epsilon_{Ag}$ value instead of the $\epsilon_{Oz(Si\text{—}O\text{—}Si)}$ value. $\epsilon_C$=0.0428 kcal/mol and $\epsilon_H$=0.0243 kcal/mol were obtained from the geometric combination rule, equation (9). Then, $\epsilon_{Ag\text{-}C}$ and $\epsilon_{Ag\text{-}H}$ for Ag—Y could be estimated from $(0.0428\times\epsilon_{Ag})^{0.5}$ and $(0.0243\times\epsilon_{Ag})^{0.5}$, respectively. In Case I for Ag—Y, $\epsilon_{Ag}$ became 14.3 kcal/mol, while $\epsilon_{Ag}$=13.5 kcal/mol was obtained for Case II. The larger well-depth parameter was needed for Case I to compensate for the weaker Coulombic interaction due to the smaller Ag cation charge. In both cases, the $\epsilon_{Ag}$ values used were more than 2 orders of magnitude greater than $\epsilon_{Na}$, clearly indicating the strong interaction from π-complexation.

Figure 29:
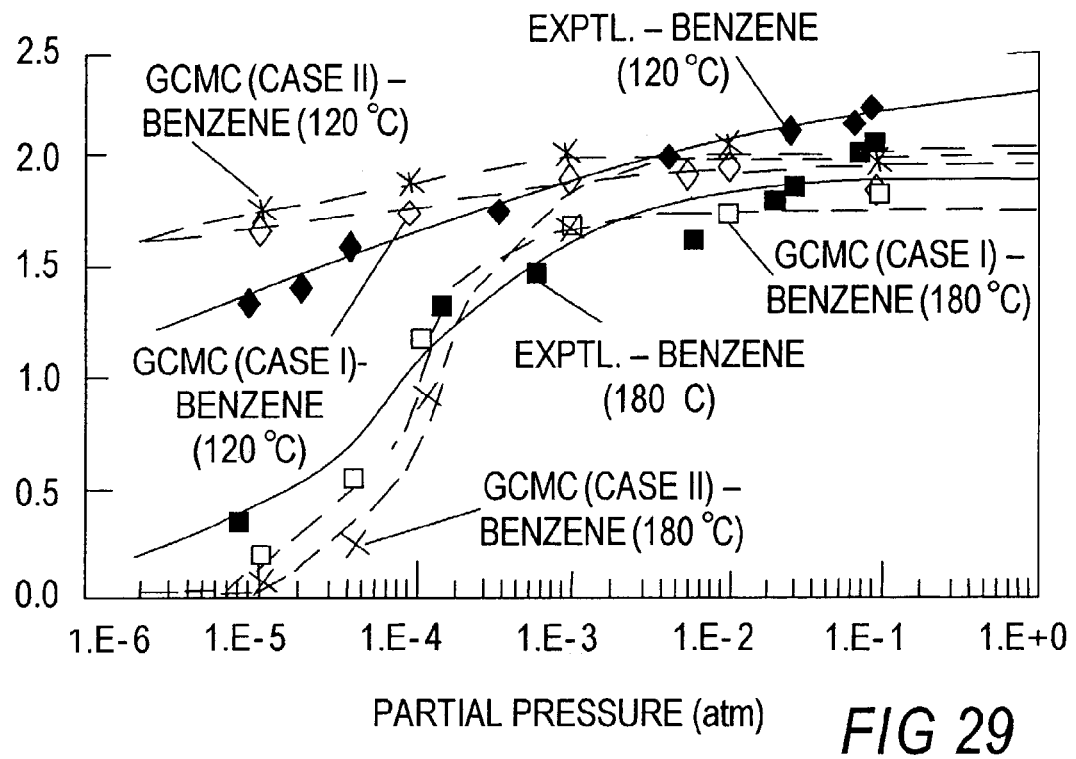
FIG. 29 is a graph comparing experimental and GCMC simulation for adsorption of benzene on Ag—Y.

FIG. 29 shows the simulation results of benzene on Ag—Y for Case I and Case II. The differences between Case I and Case II were fairly small. In both cases, the agreement with experimental isotherms was not as good as that for Na—Y and H-USY. However, they certainly followed the basic trend of the experimental isotherms. The calculated heat of adsorption was 18.8–21.1 kcal/mol, which was higher than Na—Y and also in agreement with the experimental value.

In all cases, not only Ag—Y but also Na—Y and H-USY, the simulated isotherms tended to be higher than the experimental isotherms in the lower pressure range with few exceptions, while they were lower in the higher pressure range. The higher simulation results at low pressures might be caused by the larger values for the well-depth parameter between oxygen (zeolite)—carbon (benzene) interaction and oxygen (zeolite)—hydrogen (benzene) interaction. The other possible cause was the imperfection of the zeolite crystals. Since zeolites contain defects while in Monte Carlo simulation perfect zeolite lattice was assumed. In the high pressure range, larger experimental values were possibly caused by adsorption between zeolite crystals.

Adsorption sites for benzene on Na—Y and Ag—Y were investigated using the Mass Cloud Plots function in Cerius2 (not shown here). It was confirmed that benzene was adsorbed preferentially near the SII cation sites and the center of the 12-ring window, which was consistent with the neutron diffraction data for Na—Y obtained by Fitch (Fitch et al., 1986). For Ag—Y, benzene was adsorbed slightly further away from the SII cation sites than that in Na—Y, due to the fact that the van der Waals radius of Ag$^+$ is 30% larger than that of Na$^+$.

Figure 30:
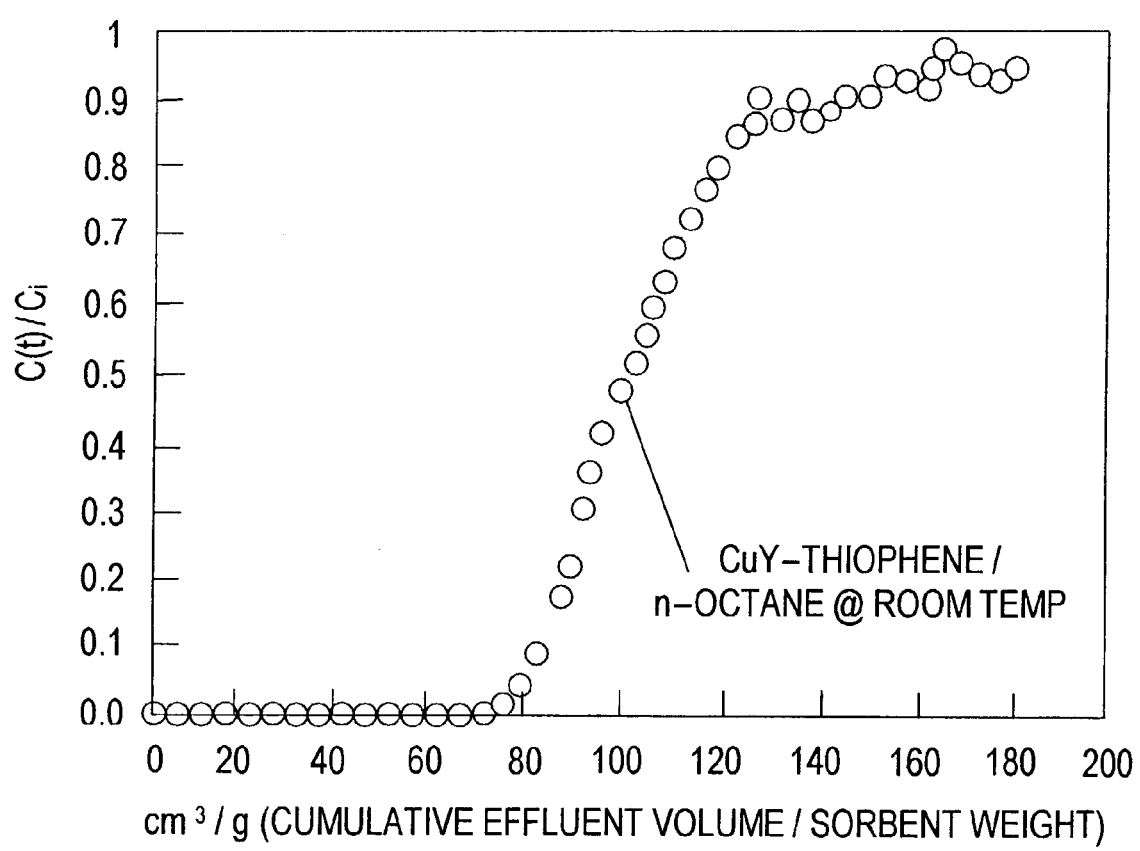
FIG. 30 is a graph depicting thiophene breakthrough curve in reduced Cu—Y zeolite at room temperature ($C_i$=2000 ppmw thiophene; solvent: n-octane)
Figure 31:
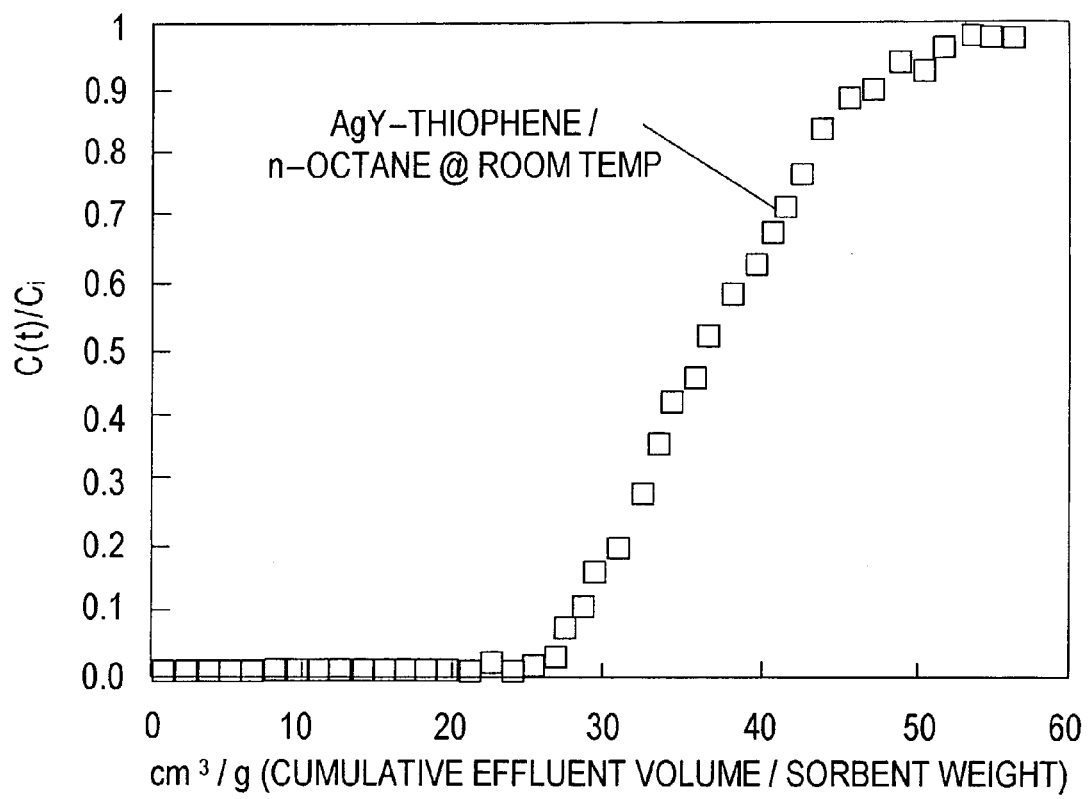
FIG. 31 is a graph depicting thiophene breakthrough curve in Ag—Y zeolite at room temperature ($C_i$=2000 ppmw thiophene; solvent: n-octane)
Figure 32:
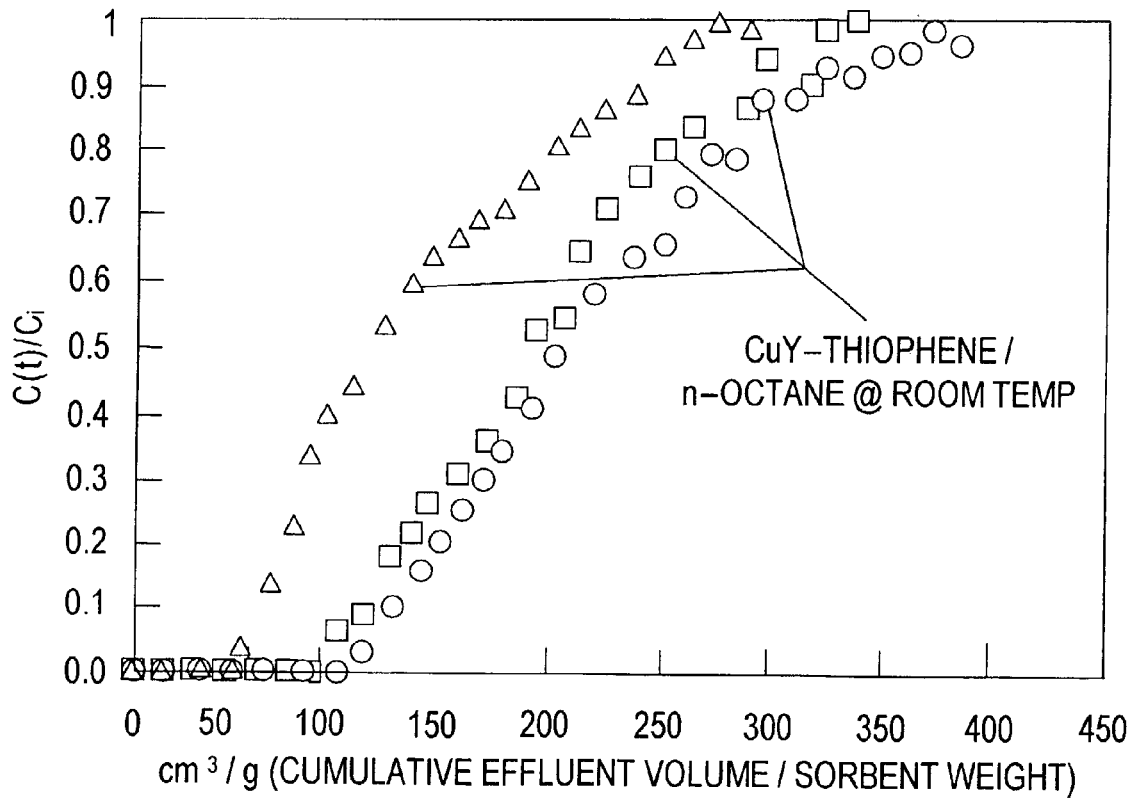
FIG. 32 is a graph depicting thiophene breakthrough curves in reduced Cu—Y zeolite at room temperature (($C_i$=500 ppmw thiophene; solvent: n-octane)

Notation
 A=repulsive parameter for Buckingham potential
 B=repulsive parameter for Buckingham potential or Langmuir constant
 C=dispersive parameter for Buckingham potential or constant for D-A equation
 D=diffusivity
 E=energy
 n=constant
 P=pressure
 q=point charge or molar adsorbed amount
 R=van der Waals radii or gas constant
 r=distance or radius
 T=temperature
 U=potential energy
 V=volumetric adsorbed amount
 X=equilibrium mole fraction in adsorbed phase
 Y=equilibrium mole fraction in gas phase Greek Letters
 α=polarizability or separation factor
 β=adjustable parameter
 ε=well depth parameter for Lennard-Jones potential
 σ=distance parameter for Lennard-Jones potential Subscript
 i=atom site or component
 j=atom site or component
 s=saturation FIGS. 30–32 are graphs depicting further breakthrough curves.

Experiment E

Adsorbent Preparation. The adsorbents used in this study were copper cation forms of Y Zeolite and also type PCB Activated Carbon (PCB-AC). The former were prepared initially using conventional liquid phase ion exchange techniques. The starting material, sodium type (Na) Y Zeolite (Strem Chemicals, Si/Al=2.43), was used as received and in powder form. The activated carbon samples were obtained from Calgon Corporation also in powder form and used without further purification.

Cu(I)—Y (or reduced Cu(II)—Y) was prepared by first ion exchanging Na—Y with a Cu(NO$_3$)$_2$ aqueous solution (0.5 M) for 48 hours followed by reduction of Cu$^{2+}$ to Cu$^+$. The amount of copper in the ion exchange solution was equivalent to a 5-fold cation exchange capacity. The adsorbent was recovered by filtration and washed with copious amounts of deionized water, followed by drying at 100° C. for at least 24 hours. Activation was performed at 450° C. in pure helium to promote auto-reduction of Cu$^{2+}$ species to Cu$^+$, which is desired for π-complexation (Cu(I)—Y). Auto-reduction of cupric ions to cuprous ions in synthetic zeolites has been reported by several groups (Larsen, S. C.; Aylor, A.; Bell, A. T.; Reimer, J. A. Electron Paramagnetic Resonance Studies of Copper Ion-Exchanged ZSM-5. *J. Phys. Chem.* (1994), 98, 11533; Parrillo, D. J.; Dolenec, D.; Gorte, R. J.; McCabe, R. W. Adsorption Studies on CuZSM-5: Characterization of the Unique Properties of Ion-Exchanged Cu. *J. Catal.* (1993), 142, 708 and Iwamoto, M.; Yahiro, H.; Tanda, K.; Mizuno, N.; Mine, Y.; Kagawa, S. Removal of Nitrogen Monoxide through a Novel Catalytic Process: 1. Decomposition on Excessively Copper Ion-Exchanged ZSM-5 Zeolites. *J. Phys. Chem.* (1991), 95, 3727) and a more detailed discussion about the Cu—Y auto-reduction process is discussed earlier.

Reagents and Standards: Gasoline and diesel samples were obtained from British-Petroleum (BP) gas stations located in the Michigan area. Gasoline was unleaded regular type, while diesel is type #2 according to BP's specifications. The average total sulfur concentration for these fuels was reported to be 335 and 430 ppmw, respectively (data available from BP). Thiophene, benzothiophenes (BT), and dibenzothiophene (DBT) standards were purchased from Sigma-Aldrich.

Elemental Analysis. Cu(II)—Y and Na—Y adsorbents were characterized using neutron activation analysis (NAA) in the research nuclear reactor of the Phoenix memorial Laboratory at the University of Michigan. The data was obtained from a 1-minute core-face irradiation delivered via pneumatic tube to a location with an average thermal flux of $2.13 \times 10^{12}$ neutrons/cm$^2$/s. Following irradiation, two separate counts were made, one after a 13-minute decay (for Al and Cu) and a second count after a 1 hour and 56 minutes decay (for Na and K); both were for 500 seconds.

The concentrations of Al, Na, and K were determined based on comparison with three replicates of the standard reference material NIST1633A (coal fly ash); the determination of Cu content was evaluated relative to high-purity copper wire. Data reductions for NIST1633A were based on NIST certified values.

Fixed-Bed Adsorption/Breakthrough Experiments. All adsorption/breakthrough experiments were performed in vertical custom made quartz adsorbers equipped with a supporting glass frit. The setup consisted of a low-flow liquid pump equipped with a ceramic piston and cylinder liner, Kynar compression fittings, two Pyrex feed tanks, and a heating element. Initially, the adsorbents were loaded inside the adsorber (between 1 or 2 grams), and heated in situ (450° C.) while flowing helium. Temperatures were maintained at steady values using a PID temperature controller. The gases used for activation were pretreated inline prior to contacting the sorbent using a 3A-type zeolite. The latter allows removal of trace water from the gases, which may adsorb in the adsorbents that are being tested. After activation treatment, the adsorbent under study was allowed to cool down to room temperature under helium and then tapped to ensure proper packing. Next, a sulfur-free hydrocarbon was allowed to flow downwards through the sorbent at a rate of 0.5 cm$^3$/min. After wetting the adsorbent for about 10 minutes, the feed was changed to either commercial grade gasoline or diesel at a 0.5 cm$^3$/min rate. Samples were collected at regular intervals until saturation was achieved, which depended on the adsorption dynamics and amount of adsorbent.

Gas Chromatography Analysis. All the samples collected during the breakthrough experiments were analyzed using a Shimadzu GC-17A v3 unit equipped with an EC-5 capillary column (L=30 m; ID=0.32 mm) and a flame photometric detector (FPD). The column temperature program was set to increase from 50° C. to a set value at a 5° C./min rate. For gasoline and diesel sulfur analysis, the column final temperature values were 250° C. and 330° C., respectively. In addition, a split mode injection was used for all samples at a 100:1 ratio. About 4 mL of sample volume was injected for each GC-FPD run. The injection port temperature was set to either 250° C. or 330° C., this depending on the nature of the samples under analysis.

Figure 33:
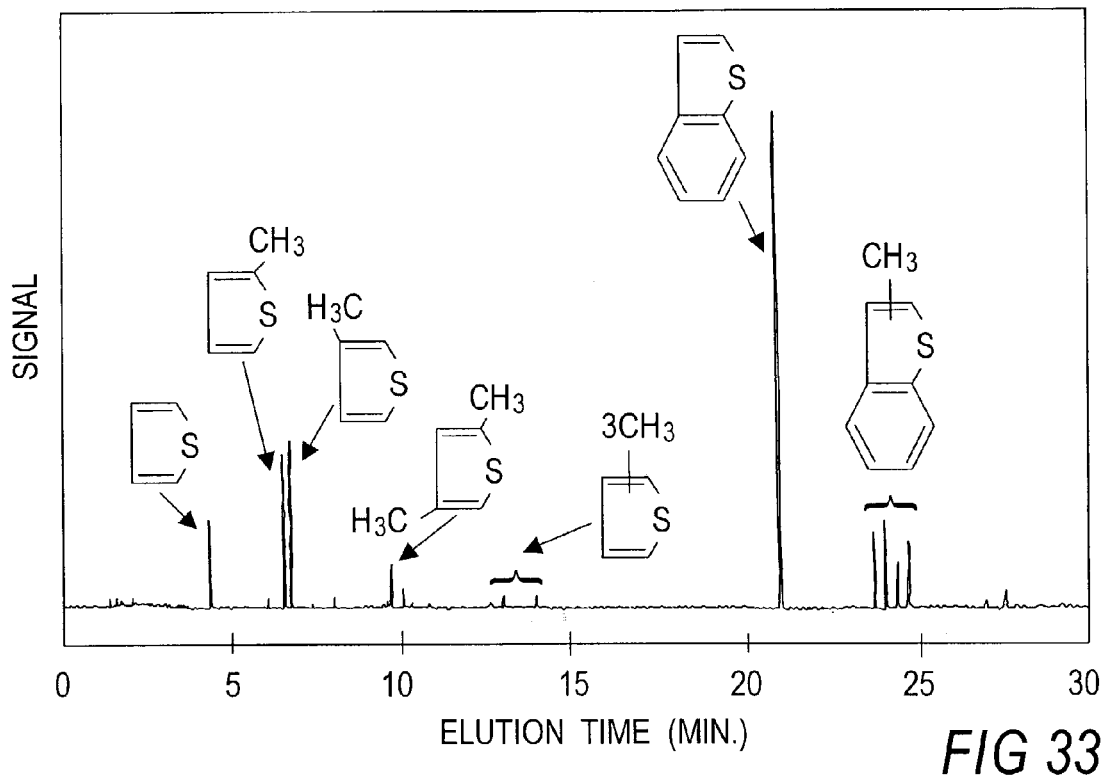
FIG. 33 is a graph depicting GC-FPD chromatogram of commercial unleaded regular gasoline.
Figure 34:
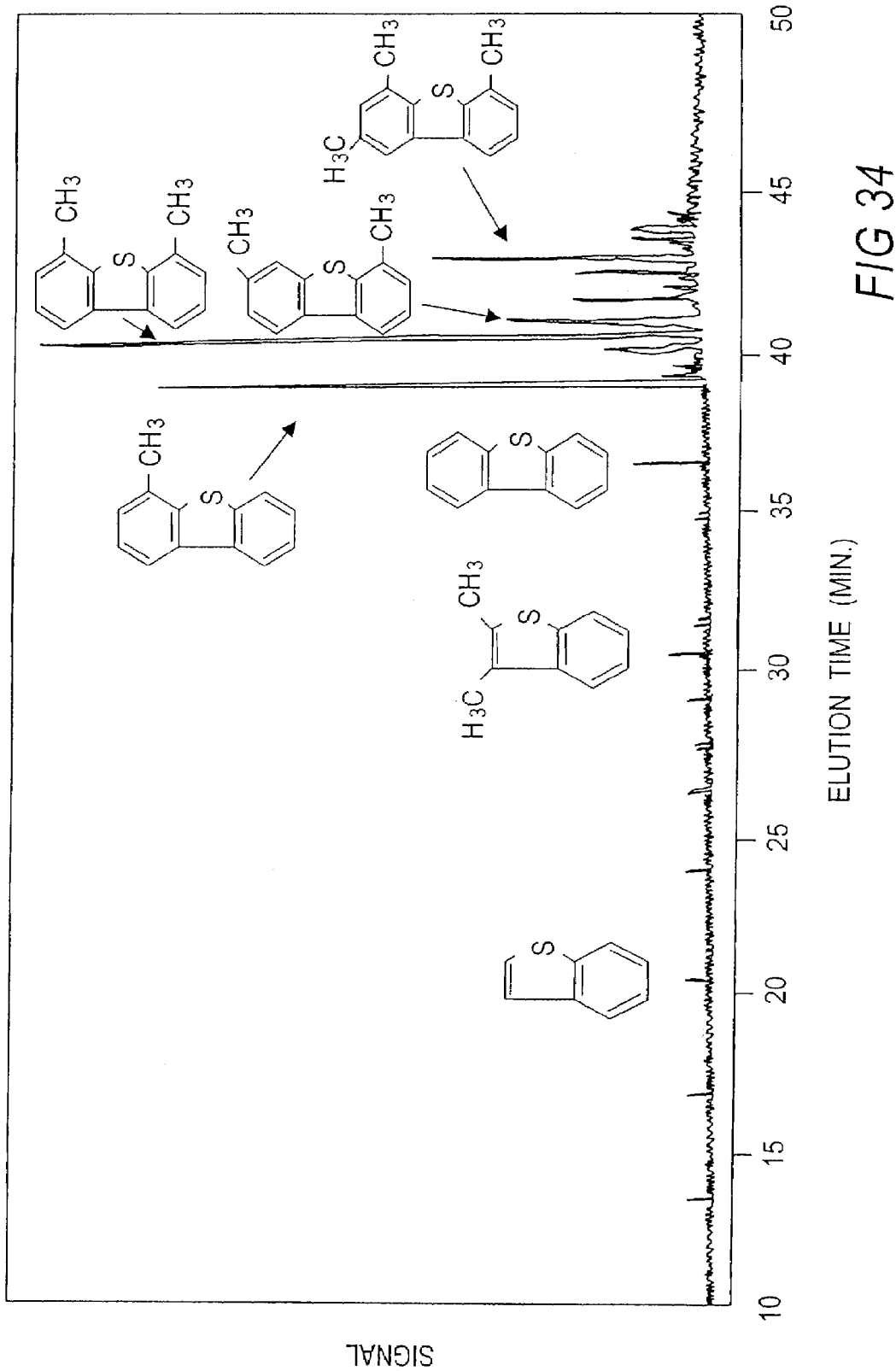
FIG. 34 is a graph depicting GC-FPD chromatogram of commercial diesel gasoline.

Peak identification information for sulfur compounds present in gasoline and diesel was gathered after using standards and by retention time comparison with data available in the literature.[5,6] Ma, X. et al., *Catal. Today.* (2002), 77, 107; Ma, X. et al.; *Am. Chem. Soc. Div. Pet. Chem. Prepr.* (2002), 47, 48; Gates, B. C.; Topsøe, H. Reactivities in Deep Catalytic Hydrodesulfurization Challenges, Opportunities and the Importance of 4-Methyldibenzothiophene and 4,6-Dimethyldibenzothiophene. *Polyhedron* (1997), 16, 3213; Bacaud, R.; Cebolla, V. L.; Membrado, L.; Matt, M.; Pessayre, S.; Galvez, E. M. Evolution of Sulfur Compounds and Hydrocarbons Classes in Diesel Fuels during Hydrodesulfurization. Combined Use of Thin-Layer Chromatography and GC-Selective Chemiluminescence Detection. *Ind. Eng. Chem. Res.* (2002), 41, 6005 and Ma, X.; Sakanishi, K.; Isoda, T.; Mochida, I. Determination of Sulfur Compounds in Non-Polar Fraction of Vacuum Gas Oil. *Fuel.* (1997), 76, 329. For standards, thiophene, BT and DBT solutions were diluted in sulfur free n-octane to a known concentration and then injected for retention time determination. The total sulfur concentration during breakthrough adsorption experiments for either gasoline or diesel was estimated after integrating the entire GC chromatogram region. It was assumed the total concentration is proportional to the collective areas under the peaks and that it follows a linear fashion. This is believed to be acceptable for conditions where complete sample elution after injection is achieved and after correction for noise data. The total elution times for gasoline and diesel for the GC conditions described above were 30 and 50 minutes, respectively. A similar procedure was used to calculate individual sulfur components concentration during adsorption experiments. For this purpose, only the specific compound unique peak area was used. FIGS. 33 and 34 show GC-FPD chromatograms for as-received gasoline and diesel fuels. The results are similar to those found in literature for similar analysis conditions and set-up.

FTIR Spectroscopy Analysis. Fuels were analyzed for aromatic/aliphatic C—H bond stretching using FTIR spectroscopy on a Nicolet Impact 400 FTIR spectrometer equipped with a TGS detector. The samples were loaded into a liquid IR cell fitted with ZnSe windows prior each analysis following standard procedures. The spectra were then taken at room temperature using 100 scans per run and a resolution of 4 cm$^{-1}$. Background spectra were collected using the liquid IR cell without any sample inside.

Results and Discussion

Adsorbent Characterization. Characterization for the adsorbents used in this study was achieved by NAA. All the zeolites were in hydrated conditions before testing. As seen in Table 21, ion-exchanging Na—Y with $Cu^{2+}$ results in an incomplete ion exchange. If it is assumed that one $CU^{2+}$ cation compensates for two aluminum tetrahedra, then in the prsent case, the ion exchange resulted in only 70% substitution of the original sodium ions (i.e., 2Cu/Al=0.72). The remaining sodium species were then compensating for the other aluminum tetrahedra; in other words, the (2Cu+Na)/Al ratio should be unity, which is observed here. This scheme is the simplest one used to describe such behavior. More elaborated schemes can be found elsewhere.[25,30] Parrillo, et al., *J. Catal.* 1993, 142, 708 and Baes, C. F.; Mesmer, R. E. The Hydrolysis of Cations; Wiley; New York, 1976.

Adsorbent Activation, Copper Auto-reduction and Migration. Since Y zeolite is known to be highly hydrophilic (uptake>20 wt % water at ambient conditions), all the gases used for activation of the adsorbents were pretreated with 3A-Type zeolites prior to entering the fixed-bed unit. For Cu(II)—Y, the activation was performed at 450° C. in helium to promote auto-reduction of $Cu^{2+}$ species to $Cu^{+}$, which is desired for π-complexation (Cu(I)—Y). Larsen et al. reported that about 40% of the cupric ions in CuZSM-5 are reduced under helium at 410° C. Larsen, S. C. et al., *J. Phys. Chem.* 1994, 98, 11533. Also, EPR studies done by Takahashi et al. showed that 50% of $Cu^{2+}$ in Cu(II)—Y zeolite is reduced under vacuum or helium at 450° C., (Takahashi, A.; Yang, R. T.; Munson, C. L.; Chinn, D. Cu(I)—Y-Zeolite as a Superior Adsorbent for Diene/Olefin Separation., Langmuir (2001), 17, 8405) which is in good agreement with the findings of Larsen et al. It should be mentioned that after 18 hours of auto-reduction, the color of Cu(I)—Y was pale green, compared to a bluish green typically observed in Cu(II)—Y. This was sure evidence of auto-reduction, as $Cu^{+}$ should result in a white color (like in CuCl). In the present invention, successful liquid phase thiophene adsorption experiments as described hereinabove with Cu(I)—Y zeolites provide further evidence of reduction of $Cu^{2+}$.

The adsorption capacity of auto-reduced Cu—Y observed for simple liquid hydrocarbon mixtures is believed to be due not only to the reduction of the copper ions, but also because of the final position of the cations after activation and/or during adsorption. $Cu^{+}$ cations occupy exposed sites in the Y zeolite framework, such as sites II and III according to the nomenclature of Smith, (Smith, J. V. Faujasite-Type Structures. Aluminosilicate Framework. Positions of Cations and Molecules. Nomenclature. *Adv. Chem. Ser.* (1971), 101, 171) in order to interact with the sulfur molecules. Recent studies by Fowkes et al. have shown that, upon reduction of Cu(II)—Y, there was a redistribution of cation positions and most of the reduced species ($Cu^{+}$) occupied sites I* and II. Fowkes, A. J.; Ibberson, R. M.; Rossensky, M. J. Structural Characterization of the Redox Behavior in Copper-Exchanged Sodium Zeolite Y by High Resolution Powder Neutron Diffraction. *Chem. Mater.* (2002), 14, 590. Lamberti et al. showed similar results for both reduced Cu(II)—Y and Cu(I)—Y prepared by ion exchange and gas phase reaction with CuCl, respectively. Lamberti, C.; Spoto, G.; Scarano, D.; Pazé, C.; Salvalaggio, M.; Bordiga, S.; Zecchina, A.; Tumes Palomino, G.; D'Acapito, F. $Cu^{I}$-Y and $Cu^{II}$-Y Zeolites: a XANES, EXAFS and visible-NIT Study. *Chem. Phys. Lett.* (1997), 269, 500. In addition, some $Cu^{+}$ ions could be induced to migrate to more exposed sites under the presence of guess molecules. Tumes-Palomino et al. found, based on IR data, that this happens when CO molecules are adsorbed in Cu(I)—Y. Tumes Palomino, G.; Bordiga, S.; Zecchina, A.; Marra, G. L.; Lamberti, C. XRD, XAS, and IR Characterization of Copper-Exchanged Y Zeolite. *J. Phys. Chem. B* (2000), 104, 8641. Their zeolite was also prepared by vapor-phase exchange of H—Y with CuCl. Thus, based on Tumes-Palomino's findings, there could also be some synergy that contributes for the observed adsorption capacity of this adsorbent.

Figure 35:
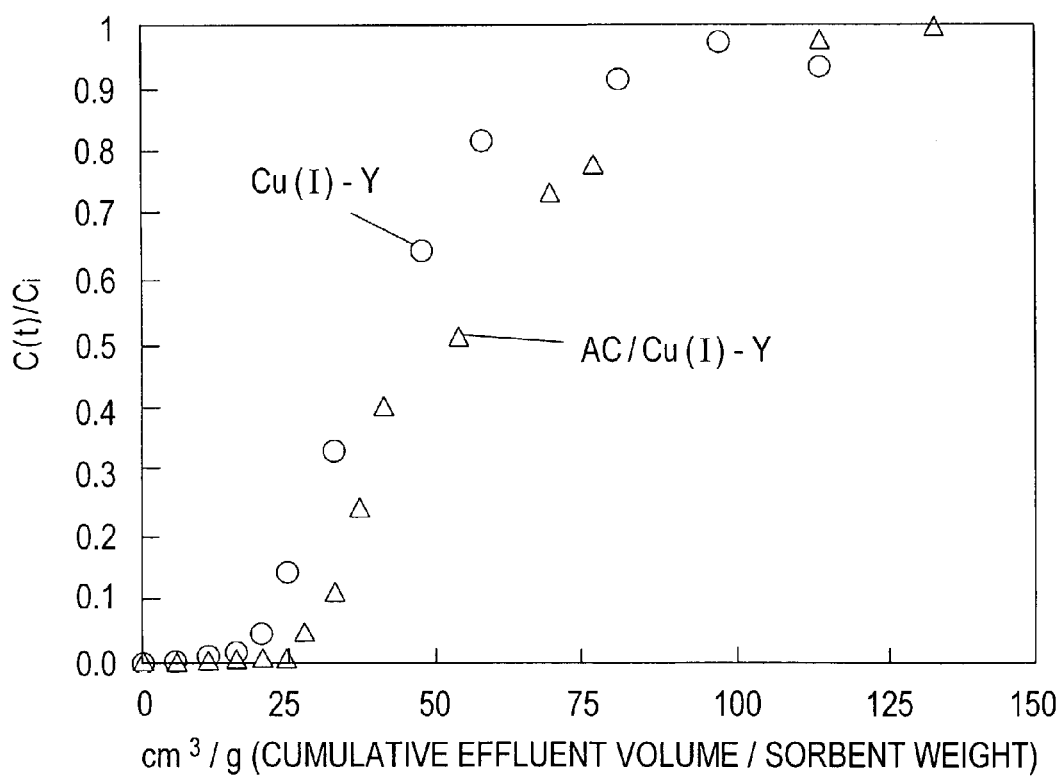
FIG. 35 is a graph depicting breakthrough of total sulfur in a fixed-bed adsorber with Cu(I)—Y or AC/Cu(I)—Y adsorbents, during gasoline treatment at room temperature. $C_i$ is the total sulfur concentration at saturation conditions.

Fixed-Bed Adsorption Tests. After activating the adsorbents in-situ, a solution of either commercial regular gasoline or diesel was passed through the fixed-bed and the downstream sulfur concentration monitored as a function of time. FIG. 35 shows a breakthrough/adsorption profile obtained during desulfurization of gasoline with a Cu(I)—Y adsorbent. Adsorption capacities at both breakthrough and saturation were obtained after integrating for the area above the breakthrough curves. For gasoline treatment with Cu(I)—Y the loadings at breakthrough and saturation were 0.14 and 0.39 mmol/g, respectively (Table 22). In the present invention, breakthrough loadings were observed of 1.82 and 0.22 mmol/g after thiophene (2,000 ppmw) removal from n-octane and benzene/n-octane (20 wt % $C_6H_6$), respectively. These results indicate that the adsorbent performance for sulfur removal is greatly affected by the presence of aromatics, which should occur during gasoline treatment. Moreover, since other aromatic species besides benzene can still interact with π-complexation adsorbents, it is important to consider the whole composition spectrum for gasoline. Table 23 shows typical aromatic composition for both the commercial gasoline and diesel. Gasoline has a considerable amount of aromatic molecules larger than benzene (because of additional functional groups), and they should compete for void space during adsorption. It should be mentioned that King et al. found a similar result for vapor phase sulfur removal from toluene mixtures with ZSM-5 zeolites. King, D. L.; Faz, C.; Flynn, T. Desulfurization of Gasoline Feedstocks for Application in Fuel Reforming. SAE Paper 2000–01–0002; Society of Automotive Engineers: Detroit, Mich., 2000. They concluded the aromatics entities were responsible for a diminishing in adsorbent uptake capacity.

Tournier at al. studied the adsorption of xylene isomers in liquid phase on a K,Ba—Y zeolite. Tournier, H.; Barreau, A.; Tavitan, B.; LeRoux, D.; Sulzer, C.; Beaumont, V. Two Experimental Methods to Study Adsorption Equilibria of Xylene Isomers in the Liquid Phase on a Y Zeolite. *Micropor. Mesopor. Mat.* 2000, 39, 537. For a mixture of m-xylene and p-xylene, K,Ba—Y adsorbs 0.13 mmol/g of the latter for an equilibrium concentration (liquid phase) is 2.4 mole %. This provides additional evidence that aromatics will compete for adsorption sites, even within themselves. However, even in the presence of compounds such as xylenes, Cu(I)—Y still offers considerable selectivity towards the sulfur in gasoline and this has to be due to π-complexation. One gram of adsorbent is capable of producing 14 $cm^3$ of sulfur free gasoline (<1 ppmw S), removing not only thiophenes and benzothiophenes (BTs), but also their substituted counterparts.

Figure 36:
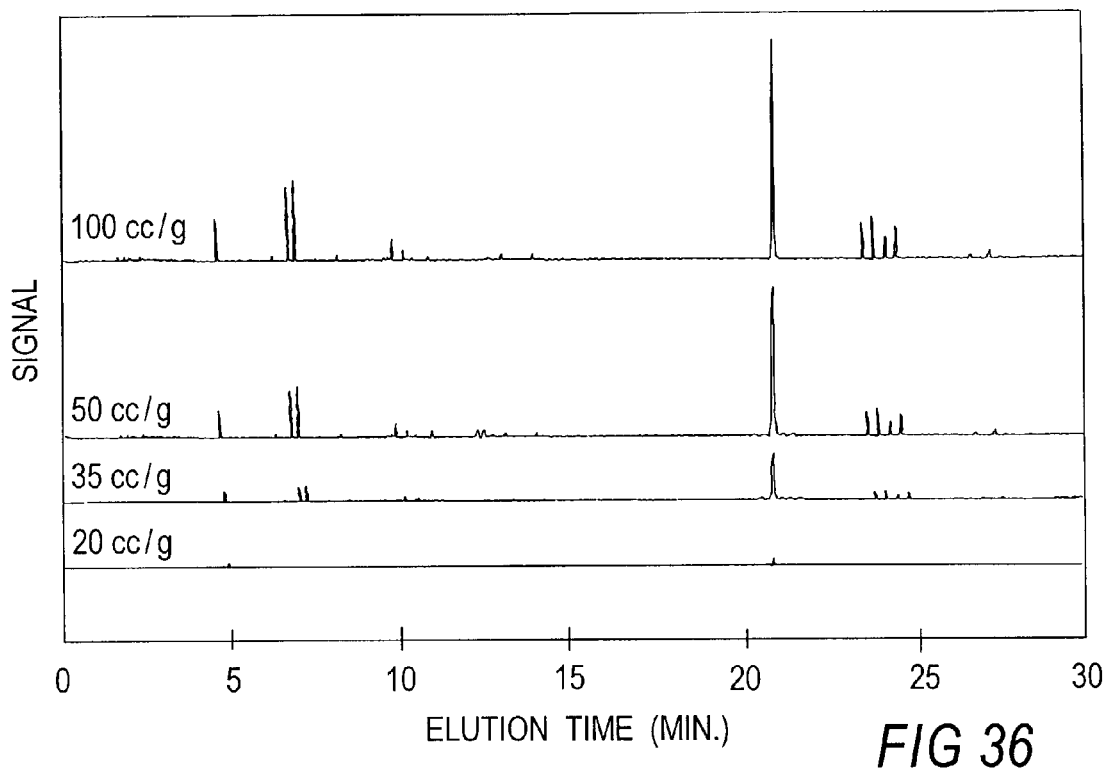
FIG. 36 is a graph depicting progression GC-FPD chromatograms of sulfur compounds during gasoline treatment with Cu(I)—Y. Also shown is processed fuel volume values normalized by weight of adsorbent.
Figure 37:
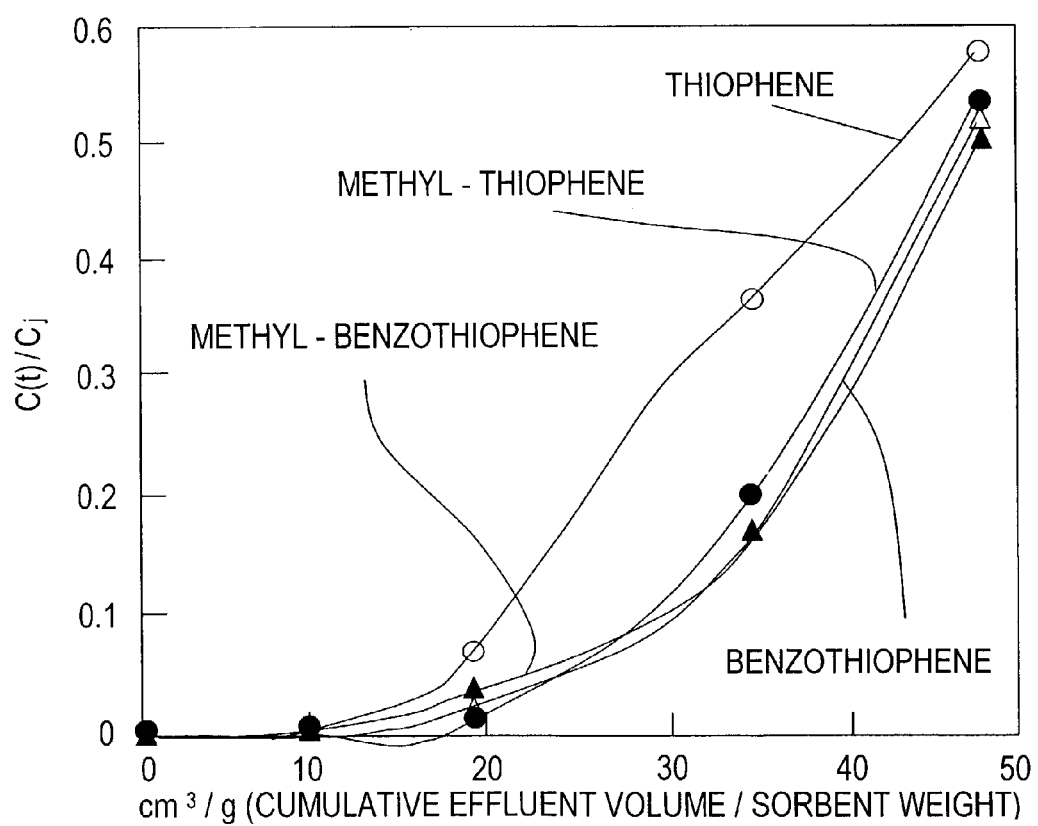
FIG. 37 is a graph depicting breakthrough of thiophene or methyl-thiophene or benzothiophene or methyl-benzothiophene in a fixed-bed adsorber with Cu(I)—Y adsorbent, throughout gasoline treatment at room temperature. $C_j$ is the sulfur concentration for each species at saturation conditions.

FIG. 36 depicts the evolution of each sulfur species downstream Cu(I)—Y as determined by GC-FPD analyses. Breakthrough curves for selected gasoline sulfur compounds (FIG. 37) were obtained also from the GC-FPD data. The chromatograms show the adsorbent has selectivity towards substituted thiophenes and heavier molecules over non-substituted molecule. This can be observed in the relative intensities of the peaks in the 4 minutes (elution time) region (please refer to FIG. 33 for peaks reference). It should be mentioned most substituted thiophenes and BTs remain highly unreacted during conventional HDS processes, which is clearly not the case when using π-complexation zeolites.

One alternative to increase both breakthrough and saturation capacities is to provide a guard bed to take care of the aromatics during the π-complexation process with Cu(I)—Y. PCB type activated carbon (AC) was chosen to accomplish this. PCB-AC is used commercially for both liquid- and vapor-phase applications including recovery of alcohols, hydrocarbons and aromatics. The present inventors performed vapor-phase single component equilibrium adsorption experiments for thiophene and diesel in PCB-AC. More beuzene than thiophene was adsorbed even at pressures below $1 \times 10_2$ atm, which indicates polarizability plays an important role in the performance of this adsorbent. A similar behavior should be observed also in liquid-phase adsorption. Choma et al. studied how to predict solute adsorption behavior from liquid-phase adsorption on carbons based on the corresponding gas/solid adsorption parameter, and vice-versa. Choma, J. Burakiewicz,-Mortka, W.; Jaroniec, M.; Gilpin, R.K. Studies of the Structural Heterogeneity of Microporous Carbons Using Liquid/Solid Adsorption Isotherms. *Langmuir* 2000, 39, 537. They demonstrated, for both types of interfaces, that similar information about the structural heterogeneity of the adsorbent can be gathered. It should be mentioned that their results were obtained for benzene as solute.

For the experiments involving activated carbon, the guard bed was loaded on top of the Cu(I)—Y bed after making sure the latter was packed uniformly. The adsorbent activation procedure was identical to the one described in the experimental section. FIG. 35 shows the resulting sulfur breakthrough curve for gasoline treatment after adding an activated carbon (type PCB) guard bed on top of Cu(I)—Y. The guard bed accounted for 15 wt % of the total adsorbent bed. For this experiment, the new adsorbent combination proves to enhance the sulfur removal process, indicating this the activated carbon probably offers less mass transfer resistance towards aromatics allowing for an apparent sulfur concentration wave front to move ahead faster and reach Cu(I)—Y first. During the momentary absence of aromatics, the sulfur compounds should take advantage of the π-complexation process since the competitive adsorption process observed for "unprotected" Cu(I)—Y is delayed. Breakthrough and saturation capacities (from FIG. 35) were 0.18 and 0.50 mmol/g, respectively (Table 22). This is a 28% increase in capacity over the one offered by Cu(I)—Y without a guard bed.

It is to be understood that the guard bed may be located in any suitable position. In a non-limitative embodiment, the guard bed is located adjacent the inlet of the main bed. It is to be further understood that the guard bed may be formed from any suitable sorbent, including but not limited to activated carbon, activated alumina, silica gel, zeolites, clays or pillared clays, diatomaceous earth, any of the porous sorbents, and/or mixtures thereof.

Figure 38:
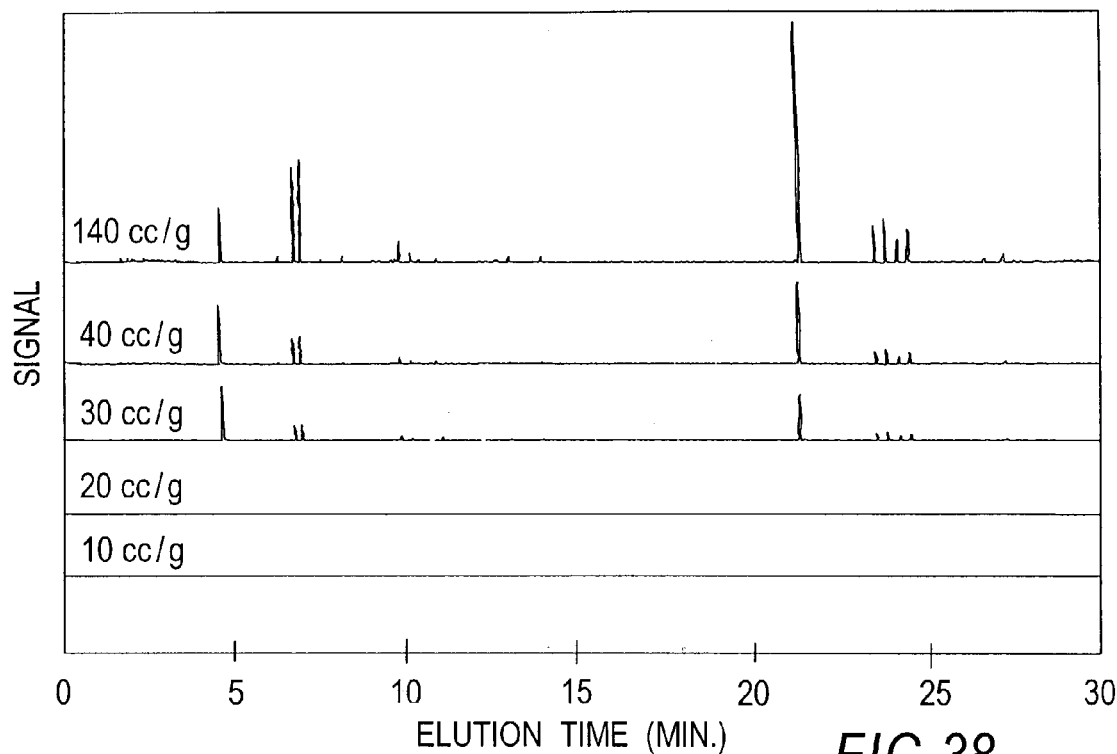
FIG. 38 is a graph depicting progression GC-FPD chromatograms of sulfur compounds during gasoline treatment with AC/Cu(I)—Y. Also shown is processed fuel volume values normalized by weight of adsorbent.
Figure 39:
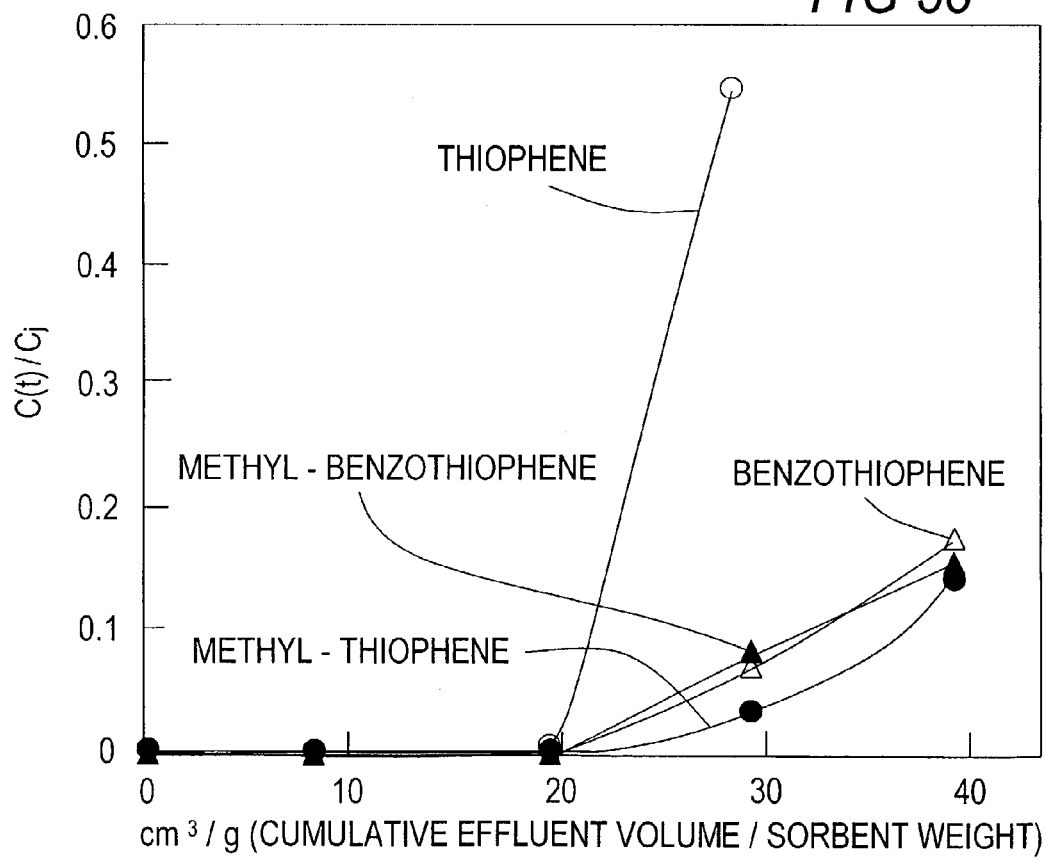
FIG. 39 is a graph depicting breakthrough of thiophene or methyl-thiophene or benzothiophene or methyl-benzothiophene in a fixed-bed adsorber with AC/Cu(I)—Y adsorbent, throughout gasoline treatment at room temperature. $C_j$ is the sulfur concentration for each species at saturation conditions.

GC-FPD analysis (FIG. 38) shows that thiophene molecules breakthrough faster, possibly indicating that competitive adsorption now lies (at least for some time) within the sulfur compounds (substitutes and non-substituted) themselves. This can be seen also in FIG. 39, where thiophene concentration has reached almost 60% of the corresponding saturation value after processing about 30 $cm^3$ of gasoline per gram of adsorbent. The methyl-substituted BTs have reached only 10% on their respective concentration saturation values at similar conditions.

Figure 40:
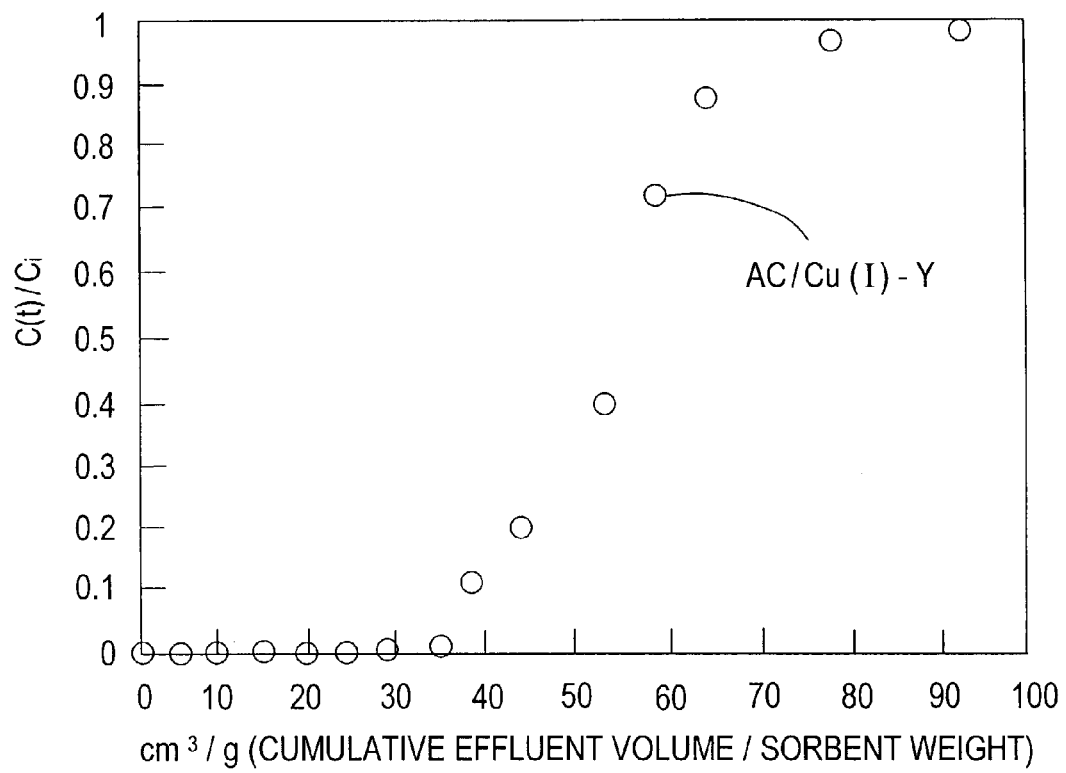
FIG. 40 is a graph depicting breakthrough of total sulfur in a fixed-bed adsorber with AC/Cu(I)—Y adsorbent, during diesel treatment at room temperature. $C_i$ is the total sulfur concentration at saturation conditions.
Figure 41:
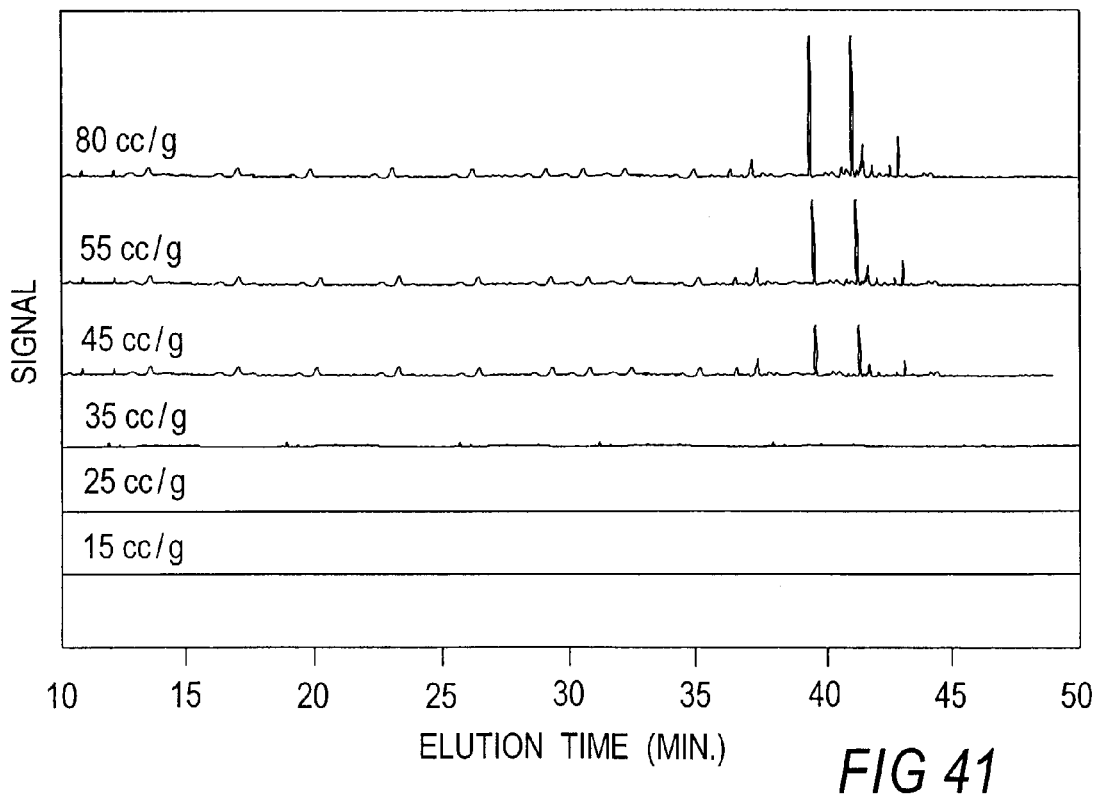
FIG. 41 is a graph depicting progression GC-FPD chromatograms of sulfur compounds during diesel treatment with AC/Cu(I)—Y. Also shown is processed fuel volume values normalized by weight of adsorbent.
Figure 42:
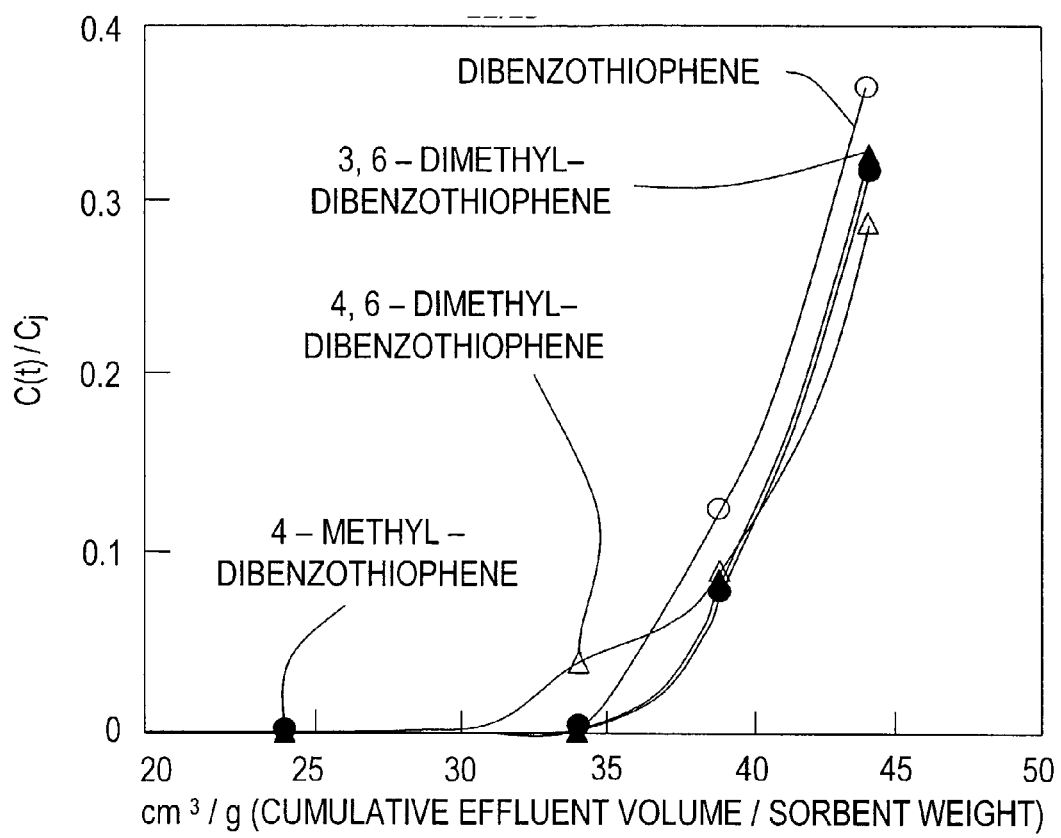
FIG. 42 is a graph depicting breakthrough of dibenzothiophene (i) or 4-methyl-dibenzothiophene or 4,6-dimethyl-dibenzothiophene or 3,6-dimethyl-dibenzothiophene in a fixed-bed adsorber with AC/Cu(I)—Y adsorbent, throughout diesel treatment at room temperature. $C_j$ is the sulfur concentration for each species at saturation conditions.

The same adsorbent combination (AC/Cu(I)—Y) was also tested for diesel desulfurization. FIGS. 40, 41, and 42 show total sulfur breakthrough curves, GC-FPD chromatograms, and selected sulfur containing molecules breakthrough curves, respectively. For total sulfur removal from diesel, the breakthrough and saturation loadings are 0.32 and 0.59 mmol/g, respectively. This translates to a saturation capacity of about 1.85 wt % sulfur. The GC-FPD data and individual component breakthrough curves show the adsorbent combination has some selectivity towards specific molecules. FIG. 42 shows 4,6-dimethyldibenzothiophene molecules leaving the bed early, but not in considerable fashion. This behavior could be due to pore clogging with some substituted dibenzothiophenes. However, this is not expected since Y zeolite is known to adsorb substituted aromatics molecules in considerable quantities. For example, at $P/P_o$=0.5, X zeolite (FAU, Si/Al=1.33) adsorbs 43.3 benzene molecules and about 37 toluene molecules per unit cell, respectively. Na—X (Si/Al=1.25) also adsorbs larger molecules such as $(C_4H_9)_3N$ (~16 molecules per unit cell), which has a kinetic diameter of σ=8.1 Å. Breck, D. W. Zeolite Molecular Sieves, Wiley: New York, 1973, reprinted by Krieger, Malabar, Fla., 1984. Thus, pore clogging in Cu(I)—Y sure occur only for heavily substituted dibenzothiophenes and in the presence of framework faults, specially those affecting pore window locations.

When comparing treatment results for both gasoline and diesel and the same adsorbent combination (i.e. Cu(I)—Y with a guard bed) it is believed that the fuel composition (other than the sulfur content) plays an important role in the adsorbent performance. Since, as discussed above, the amount of aromatics is believed to play an important role in diminishing the sulfur removal capacity (i.e. aromatics will also do π-complexation with copper cations), differences in aromatic content between different fuels should be taken into consideration. Although Table 23 shows some aromatics such as benzene as not as abundant in diesel than in gasoline, an estimate of total aromatic content is in place.

Figure 43:
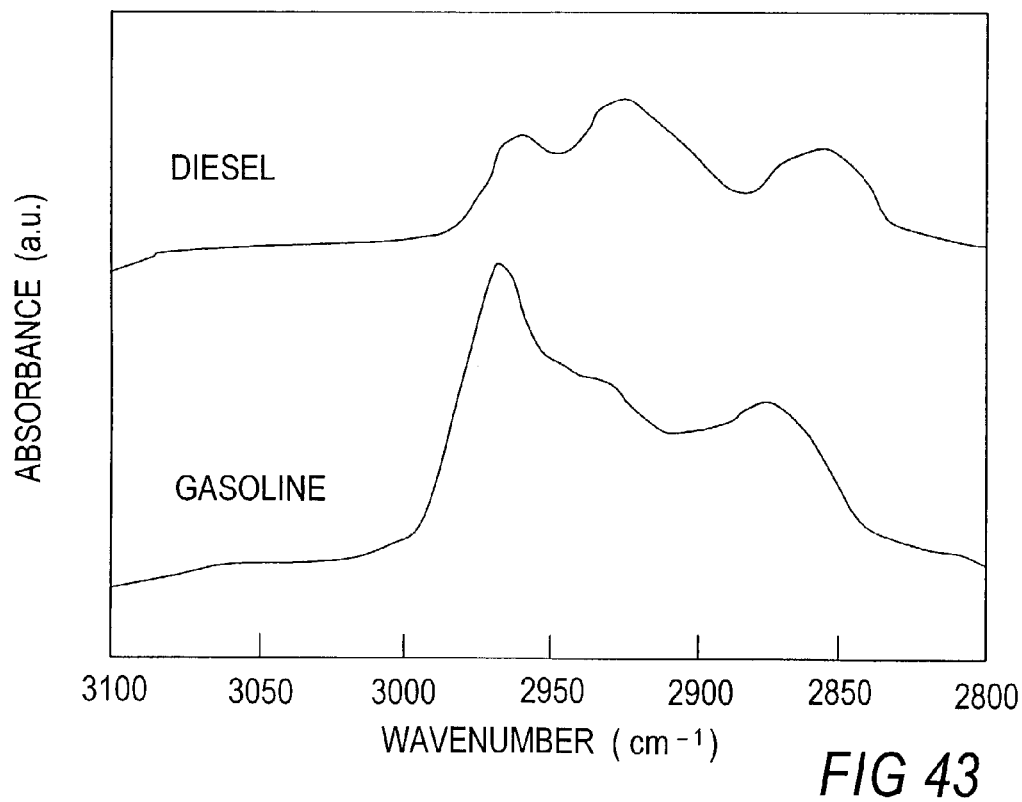
FIG. 43 is a graph depicting FTIR spectra of gasoline or diesel for the C—H stretching region.

C—H bond stretching for both aromatics and aliphatics is sometimes straightforward to identify from FTIR spectroscopy. C—H stretching for alkyl, alkenyl, and aromatics shows intensities in the 2853–2962, 3010–3095, and 3030 $cm^{-1}$ regions, respectively. Graham-Solomons, T. W. *Fundamentals of Organic Chemistry*, 2nd ed.; Wiley: New York, 1986. IR intensities are usually strong for the first and third regions, while for the second case these are of a moderate type. FIG. 43 presents FTIR spectra for the gasoline and diesel used during this study. Stahl and Tilotta got similar results for gasoline and a lighter fuel. Stahl, D. C.; Tilotta, D. C. Partition Infrared Method for Total Gasoline Range Organics in Water Based on Solid Phase Microextraction. *Environ. Sci. Technol.* (1999), 33, 814. From a qualitative perspective, it is clear the C—H bond stretching relative intensities are stronger near the aromatic range for gasoline, while diesel shows a stronger signal in the aliphatic region. An estimate of the aromatic/aliphatic composition was obtained after integrating the spectra for the regions just mentioned. The total aromatic content for gasoline and diesel was estimated to be 33.7 and 24.7%, respectively. Thus, since linear molecules (such as alkanes) are not expected to compete during adsorption, less aromatics should favor sulfur removal with Cu(I)—Y or AC/Cu(I)—Y.

The present inventors were able to completely regenerate Cu(I)—Y zeolites after saturating them with thiophene molecules removed from liquid hydrocarbons. They found that using air at 350° C. provides a suitable way to completely remove the sulfur containing molecules completely. After this treatment, the adsorbent needs to be auto-reduced in an inert atmosphere to recover its activated form. It is believed the same regeneration scheme may be used after treating gasoline or diesel, but the adsorbent adsorption capacity is enough to consider the use of disposable units for on-board applications.

CONCLUSION

Results have demonstrated that copper (auto-reduced) Y-type zeolites are excellent adsorbents for removal of all sulfur compounds from commercial liquid fuels, based on fixed-bed adsorption experiments. Adsorbents were capable of reducing sulfur content to values less than about 1 ppmw sulfur for long periods of time. When used with a guard bed, Cu(I)—Y provides the best adsorption capacity both at breakthrough point and at saturation. It is believed the guard bed delays the aromatics concentration wave front and this allows for exclusive adsorption of sulfur entities with Cu(I)—Y zeolites.

TABLE 21

Composition data for Cu(II)—Y and Na—Y zeolites obtained from neutron activation analysis (NAA).

| | Molar Ratios | | |
|---|---|---|---|
| Adsorbent | Na/Al | Cu/Al | Si/Al |
| Na—Y | 0.94 | — | 2.43 |
| Cu(II—Y) | 0.28 | 0.36 | 2.43 |

TABLE 22

Breakthrough and saturation loadings for gasoline or diesel total sulfur in Cu(I)—Y zeolites.

| Fuel Type | Average Sulfur Content (wt %) | Adsorbent | Breakthrough Loading (mmol/g) | Saturation Loading (mmol/g) |
|---|---|---|---|---|
| Gasoline | 335 | Cu(I)—Y | 0.14 | 0.39 |
| | | AC/Cu(I)—Y** | 0.18 | 0.50 |
| Diesel | 430 | AC/Cu(I)—Y** | 0.34 | 0.59 |

**Adsorbent bed made of two layers: top is PCB type activated carbon (AC) and bottom is Cu(I)—Y zeolite. AC accounts for 15 wt % of the bed weight.

TABLE 23

Typical aromatic composition of some commercial fuels. Average values are shown in parentheses.

| | Typical Composition (vol %) | | | | | |
|---|---|---|---|---|---|---|
| Fuel Type | Total Aromatics | Benzene | Toluene | Xylene | Ethylbenzene | Cumene |
| Gasoline | 12.8–56.7 | 0.4–3.48 | 1.5–16.8 | 0.8–8.4 | 0.36–2.63 | 0.04–0.17 |
| | (30.7) | (1.16) | (7.0) | (4.0) | (1.36) | (0.08) |
| Diesel | 15.7–47.2 | 0–0.02 | 0–0.18 | 0.04–0.71 | 0.02–0.7 | 0.01–0.06 |
| | (31.8) | (0.01) | (0.05) | (0.15) | (0.04) | (0.02) |

Note:
Data available from British Petroleum (BP), 2001 TRW Summer Motor Gasoline Survey Report, and AAM Diesel Fuel Surveys.

Experiment F

Figure 44:
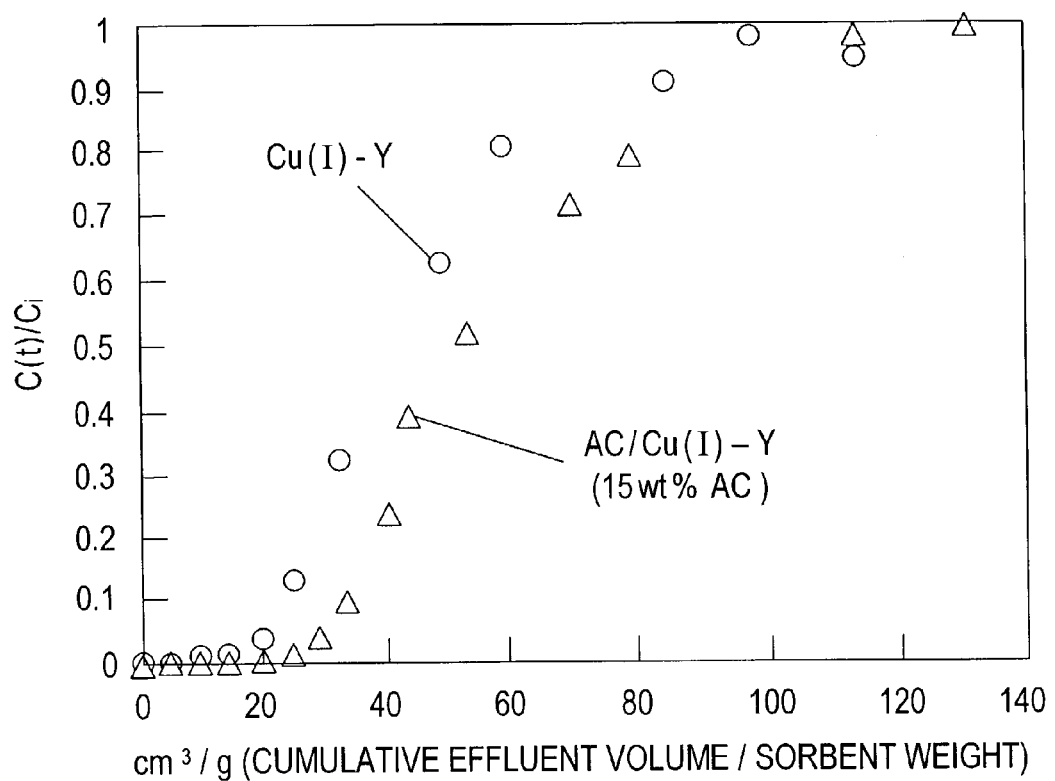
FIG. 44 is graph depicting gasoline sulfur breakthrough in CuY zeolite at room temperature (flow rate=0.5 ml/min)

After activating the adsorbents in-situ, gasoline was passed through the fixed-bed, and the sulfur concentration in the effluent was monitored as a function of time. FIG. 44 shows the breakthrough curve obtained during desulfurization of gasoline with a Cu(I)—Y adsorbent. Adsorption capacities at both breakthrough (i.e., the break point, or the first point with detectable sulfur) and saturation were obtained upon integration of the area above the breakthrough curve. For gasoline treatment with Cu(I)—Y, the loadings at breakthrough and saturation were 0.14 and 0.39 mmol/g, respectively (Table 24). From FIG. 44, one gram of Cu(I)Y was capable of producing 14 $cm^3$ of sulfur free gasoline (<0.28 ppmw S), removing not only thiophenes and benzothiophenes (BTs), but also their substituted counterparts. FIG. 44 also shows the resulting sulfur breakthrough curve for gasoline after adding an activated carbon (type PCB) guard bed on top of Cu(I)—Y. The guard bed accounted for 15 wt % of the total adsorbent bed. For this run, the new adsorbent combination proved to significantly enhance the sulfur removal capacity. The breakthrough and saturation capacities (from FIG. 44) were 0.18 and 0.50 mmol/g, respectively (Table 24).

Figure 45:
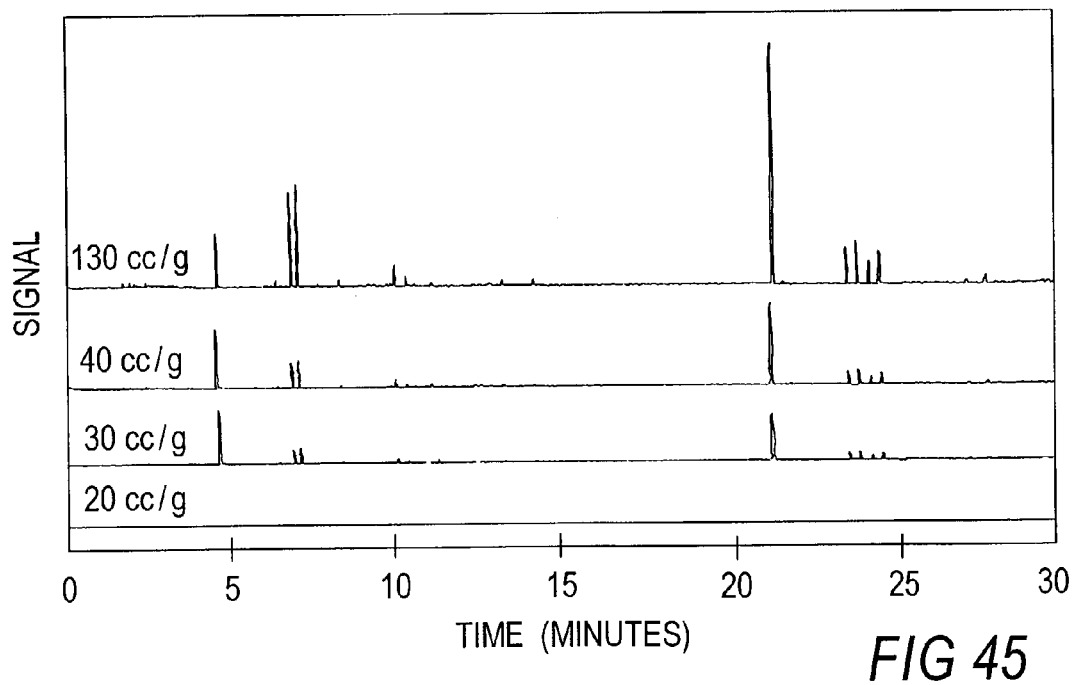
FIG. 45 is a graph depicting GC-FPD for desulfurization of gasoline with AC/Cu(I)—Y.

FIG. 45 depicts the evolution of each sulfur species in the adsorber effluent as determined by GC-FPD analyses. The chromatograms show the adsorbent has selectivity towards substituted thiophenes and heavier molecules over non-substituted molecules (i.e., thiophene). This can be observed from the relative intensities of the peaks in the 4-minute (elution time) region.

TABLE 24

Adsorption Capacity for Desulfurization of Commercial Gasoline

|  | mmol/g | wt % S |
| --- | --- | --- |
| Cu(I)—Y |  |  |
| Breakthrough Capacity | 0.21 | 0.67 |
| Saturation Capacity | 0.59 | 1.85 |
| Activated Carbon (15%)/Cu(I)—Y |  |  |
| Breakthrough Capacity | 0.27 | 0.87 |
| Saturation Capacity | 0.74 | 2.31 |

Note:
A total initial sulfur concentration of 500 ppmw was assumed for the above quantities

EXAMPLES OF SOME SUITABLE ADSORBENTS

A brief description of some non-limitative examples of adsorbents which may successfully be used in the present invention follows. Detailed descriptions may be found in U.S. Pat. No. 6,423,881, and in U.S. Pat. No. 6,215,037, each of which patents is incorporated herein by reference in its entirety.

The adsorbent comprises a carrier having a surface area, the carrier having dispersed thereon a monolayer of a d-block transition metal compound, eg., a silver compound. The silver compound releasably retains the thiophenes; and the carrier comprises a plurality of pores having a pore size greater than the effective molecular diameter of the thiophenes.

It is to be understood that any suitable carrier may be used. However, in a preferred embodiment, the carrier has a BET surface area greater than about 50 square meters per gram and up to about 2,000 square meters per gram, and comprises a plurality of pores having a pore size greater than about 3 angstroms and up to about 10 microns. In a more preferred embodiment, the carrier is a high surface area support selected from the group consisting of refractory inorganic oxide, molecular sieve, activated carbon, and mixtures thereof. Still more preferred, the carrier is a refractory inorganic oxide selected from the group consisting of pillared clay, alumina and silica.

It is also to be understood that any suitable silver compound may be used. However, in a preferred embodiment, the silver compound is a silver (I) halide. In a more preferred embodiment, the silver compound is a silver salt, and the salt is selected from the group consisting of acetate, benzoate, bromate, chlorate, perchlorate, chlorite, citrate, fluoride, nitrate, nitrite, sulfate, and mixtures thereof.

In one exemplary embodiment of this embodiment of the present invention, the silver compound is silver nitrate ($AgNO_3$) and the carrier is silica ($SiO_2$).

The method of the present invention may further comprise the step of changing at least one of the pressure and temperature to thereby release the thiophenes-rich component from the adsorbent. It is to be understood that the pressures and temperatures used may be within a suitable range. However, in the preferred embodiment, the selected pressure of preferential adsorption is a first pressure, and the pressure of release is a second pressure less than the first pressure. In a more preferred embodiment, the first pressure is in a range of about 1 atmosphere to about 35 atmospheres, and the second pressure is in a range of about 0.01 atm to about 5 atm.

In the preferred embodiment, the selected temperature of preferential adsorption is a first temperature, and the temperature of release is a second temperature greater than the first temperature. In a more preferred embodiment, the first temperature is in a range of about 0° C. to about 50° C., and the second temperature is in a range of about 70° C. to about 200° C.

Without being bound to any theory, it is believed that the retaining of the thiophenes is accomplished by formation of π-complexation bonds between the silver compound and the thiophenes. Separation by π-complexation is a subgroup of chemical complexation where the mixture is contacted with a second phase, which contains a complexing agent. The advantage of chemical complexation is that the bonds formed are stronger than those by van der Waals forces alone, so it is possible to achieve high selectivity and high capacity for the component to be bound. At the same time, the bonds are still weak enough to be broken by using simple engineering operations such as raising the temperature or decreasing the pressure.

The π-complexation generally pertains to the main group (or d-block) transition metals, that is, from Sc to Cu, Y to Ag, and La to Au in the periodic table. These metals or their ions can form the normal σ bond to carbon and, in addition, the unique characteristics of the d orbitals in these metals or ions can form bonds with the unsaturated hydrocarbons (olefins) in a nonclassic manner. This type of bonding is broadly referred to as π-complexation, and has been considered for gaseous hydrocarbon separation and purification using cumbersome liquid solutions.

A further example of an adsorbent comprises an ion-exchanged zeolite selected from the group consisting of zeolite X, zeolite Y, zeolite LSX, and mixtures thereof, the zeolite having exchangeable cationic sites, and at least some of the sites have a d-block transition metal cation, eg., silver cation or copper cation, present. In the more preferred embodiment, the cationic sites of the ion-exchanged zeolite contain silver cation. In a further preferred embodiment, essentially all cationic sites of the ion-exchanged zeolite contain the silver cation.

Without being bound to any theory, it is believed that the preferential adsorption occurs by π-complexation.

In an embodiment of the present invention, gasoline has been desulfurized at about 24 cc/g sorbent. Using a standard cartridge size that contains 5 kg of an embodiment of the present inventive sorbent, approximately 120 liters of gasoline may be desulfurized. For a fuel cell automobile, this advantageously translates into a driving range of about 7200 miles (or about 120 hours). The sorbent of embodiments of the present invention may also be regenerated for reuse, although this is not necessary, as the inventive sorbent is relatively inexpensive. For a conventional internal combustion engine automobile, the resultant driving range is approximately 3600 miles.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A process for removing at least one of thiophene and thiophene compounds from liquid fuel, the process comprising:

contacting the liquid fuel with a dehydrated adsorbent which is dehydrated via heating and which preferentially adsorbs the at least one of thiophene and thiophene compounds, at a selected temperature and pressure, thereby producing a non-adsorbed component and a thiophene/thiophene compound-rich adsorbed component, wherein the dehydrated adsorbent comprises at least one of a metal and a metal ion, the at least one of metal and metal ion adapted to form π-complexation bonds with the at least one of thiophene and thiophene compounds, and wherein the preferential adsorption occurs by π-complexation;

wherein the liquid fuel is at least one of unleaded gasoline and diesel fuel; and wherein at ambient temperature and $10^{-5}$ atm vapor pressure, the dehydrated adsorbent adsorbs more than about 1 mmol/gram of the at least one of thiophene and thiophene compounds; and adding a guard bed adjacent an inlet to the dehydrated adsorbent such that the liquid fuel contacts the guard bed prior to contacting the dehydrated adsorbent.

2. The process as defined in claim 1 wherein, prior to contacting the liquid fuel with the dehydrated adsorbent, the process comprises pretreating an adsorbent to form the dehydrated adsorbent, the pretreatment process comprising the steps of:

calcining the adsorbent between about 350° C. and about 450° C. in an inert, dry atmosphere; and then cooling the adsorbent.

3. The process as defined in claim 1 wherein the selected temperature and pressure is ambient temperature and ambient pressure.

4. The process as defined in claim 1 wherein the guard bed has as a main component thereof at least one of activated carbon, activated alumina, silica gel, zeolites, clays, pillared clays, diatomaceous earth, porous sorbents, and mixtures thereof.

5. The process as defined in claim 1 wherein the thiophene compounds include at least one of thiophene, methyl-thiophene, benzothiophene, methyl-benzothiophene, dibenzothiophene, 4-methyl-dibenzothiophene, 4,6-dimethyl-dibenzothiophene, 3,6-dimethyl-dibenzothiophene, and mixtures thereof.

6. The process as defined in claim 1 wherein the dehydrated adsorbent comprises a carrier having a surface area, the carrier having a monolayer of a d-block transition metal compound dispersed on at least some of the surface area, the metal compound releasably retaining the thiophene/thiophene compounds; and the carrier comprising a plurality of pores having a pore size greater than the effective molecular diameter of the at least one of thiophene and thiophene compounds; and wherein the process further comprises the step of changing at least one of the pressure and temperature to thereby release the thiophene/thiophene compound-rich component from the dehydrated adsorbent.

7. The process as defined in claim 6 wherein, prior to contacting the liquid fuel with the dehydrated adsorbent, the process comprises pretreating an adsorbent to form the dehydrated adsorbent, the pretreatment process comprising the steps of:

calcining the adsorbent between about 350° C. and about 450° C. in an inert, dry atmosphere; and then cooling the adsorbent.

8. The process as defined in claim 6 wherein the dehydrated adsorbent carrier is silica and wherein the metal compound is silver nitrate.

9. The process as defined in claim 1 wherein the dehydrated adsorbent comprises an ion-exchanged zeolite selected from the group consisting of zeolite X, zeolite Y, zeolite LSX, and mixtures thereof, the zeolite having exchangeable cationic sites, wherein the at least one met and metal ion is a d-block transition metal cation and wherein at least one of the sites has the d-block transition metal cation present.

10. The process as defined in claim 9 wherein, prior to contacting the liquid fuel with the dehydrated adsorbent, the process comprises pretreating an adsorbent to form the dehydrated adsorbent, the pretreatment process comprising the steps of:

calcining the adsorbent between about 350° C. and about 450° C. in an inert, dry atmosphere; and then cooling the adsorbent.

11. The process as defined in claim 9 wherein the dehydrated adsorbent is at least one of Cu(I)Y zeolite and Ag(I)Y zeolite.

12. The process as defined in claim 9 wherein the process further comprises the step of changing at least one of the pressure and temperature to thereby release the thiophene/thiophene compound-rich component from the dehydrated adsorbent.

13. The process as defined in claim 1 wherein, before contact with the dehydrated adsorbent, the liquid fuel has a high concentration of aromatic compounds, and a low concentration of thiophene/thiophene compounds.

* * * * *